(12) United States Patent
Nozaki et al.

(10) Patent No.: US 7,513,079 B2
(45) Date of Patent: Apr. 7, 2009

(54) GLASS RUN AND METHOD FOR MANUFACTURING THE SAME

(75) Inventors: Masahiro Nozaki, Aichi-ken (JP); Yoshihisa Kubo, Aichi-ken (JP); Satoshi Inagaki, Aichi-ken (JP); Hiromitsu Yamada, Aichi-pref. (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 625 days.

(21) Appl. No.: 11/091,953

(22) Filed: Mar. 29, 2005

(65) Prior Publication Data

US 2006/0026903 A1    Feb. 9, 2006

(30) Foreign Application Priority Data

| Mar. 29, 2004 | (JP) | ............................. P2004-095077 |
| Mar. 29, 2004 | (JP) | ............................. P2004-095078 |
| Mar. 29, 2004 | (JP) | ............................. P2004-095079 |
| Mar. 29, 2004 | (JP) | ............................. P2004-095080 |
| Jun. 18, 2004 | (JP) | ............................. P2004-181113 |
| Jun. 18, 2004 | (JP) | ............................. P2004-181114 |

(51) Int. Cl.
*E05F 15/00* (2006.01)

(52) U.S. Cl. ....................... 49/506; 264/45.9

(58) Field of Classification Search ................. 49/440, 49/441, 475.1, 482.1, 506; 428/122; 277/628, 277/644, 648, 649; 264/45.9, 46.1
See application file for complete search history.

(56) References Cited

U.S. PATENT DOCUMENTS 6,185,869 B1    2/2001   Kawai

2002/0001696 A1    1/2002   Kozawa et al.
2008/0084088 A1*   4/2008   Kubo et al. .............. 296/146.9

FOREIGN PATENT DOCUMENTS

| JP | A-58-50272 | 3/1983 |
| JP | U-S62-137117 | 8/1987 |
| JP | U-H1-133012 | 9/1989 |
| JP | A-H07-186304 | 7/1995 |
| JP | A-H08-118961 | 5/1996 |
| JP | A-H09-263138 | 10/1997 |
| JP | A-9-315161 | 12/1997 |
| JP | A-H10-129271 | 5/1998 |
| JP | A-2000-016089 | 1/2000 |

OTHER PUBLICATIONS

Office Action dated Jun. 19, 2008 in corresponding Japanese patent application No. 2004-095080 (and English translation).
Office Action dated Jun. 26, 2008 in corresponding Japanese patent application No. 2004-095078 (and English translation).

* cited by examiner

*Primary Examiner*—Jerry Redman
(74) *Attorney, Agent, or Firm*—Posz Law Group, PLC

(57) ABSTRACT

A glass run is provided with extruded portions and a molded portion. The extruded portions and molded portion each have an extension portion provided in the base portion so as to extend and contract in a direction toward the inside and outside of a vehicle. The extension portion is provided at a position which deviates from a position of the base portion which constitutes a section defined as extending from a position which intersects with an extension along an interior side of the door window glass to a position which intersects with an extension along an exterior side of the door window glass and to which an end face of the door window glass is opposed.

4 Claims, 28 Drawing Sheets

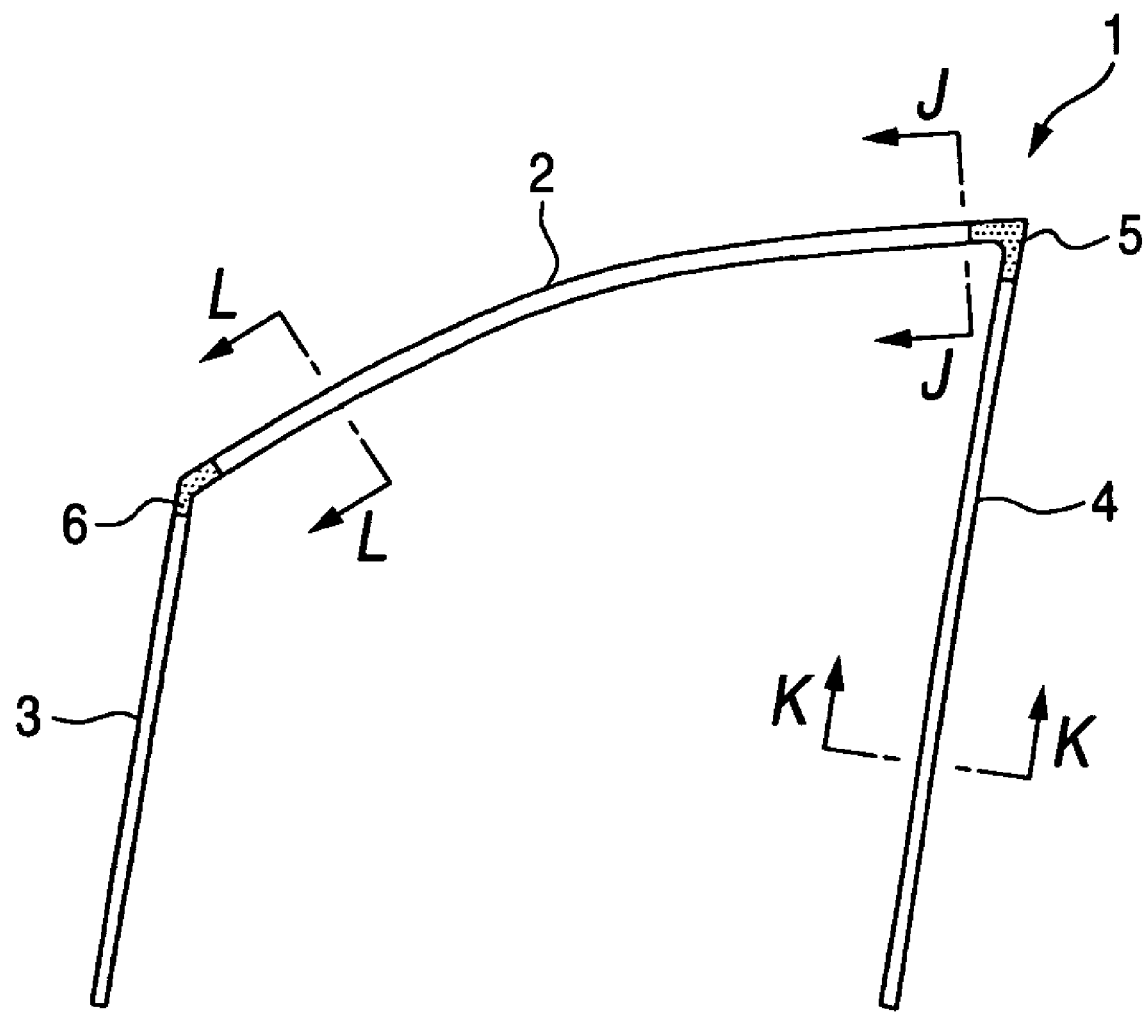

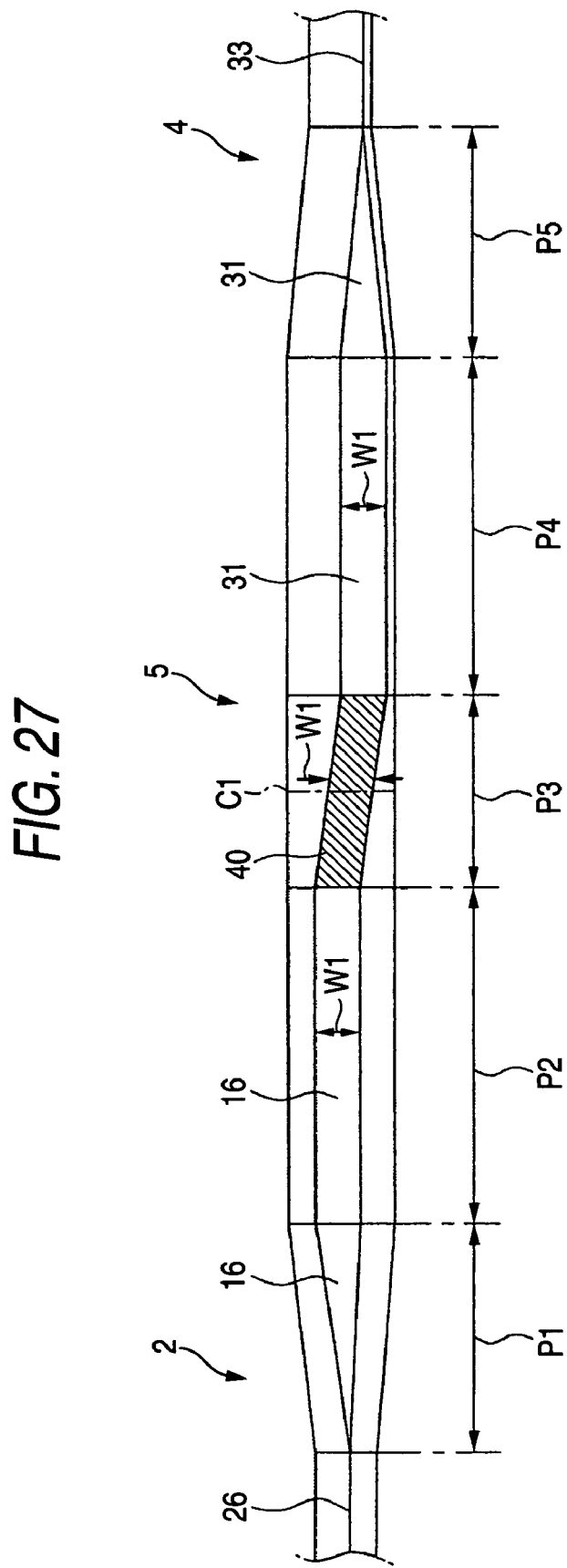

GLASS RUN AND METHOD FOR MANUFACTURING THE SAME

BACKGROUND OF THE INVENTION

1. Field of the Invention

The present invention relates to a glass run adapted to be mounted in a sash provided on a body or door of a vehicle.

2. Description of the Related Art

As shown in FIG. 29A, a glass run 61 has a main body portion 65 provided with a base portion 62 and a pair of side wall portions 63, 64 which extend from the base portion 62 and a pair of seal lips 66, 67 which extend from substantially distal ends of both the side wall portions 63, 64 toward an interior space of the main body portion 65. Then, as shown in FIG. 29B, the main body portion 65 is mounted in a sash S provided on a body or door of a vehicle, whereby an interior side or passenger compartment side and an exterior side of a door window glass G are sealed by the seal lips 66, 67, respectively.

In general, in the manufacture of glass runs 61, extruded portions are formed continuously by a known extrusion. Then, with distal end portions of extruded portions being set in a metal mold for molding a molded portion, a molded portion is molded so as to be continuously connected to end faces of the extruded portions. The molded portion corresponds mainly to a corner portion, where two extruded portions are connected to each other in such a state that a predetermined angle (for example, 90 degrees) is formed therebetween.

As shown in FIG. 29C, a mold unit 70 used for the connection molding of the molded portion is provided with a stationary mold 71, a plurality of movable molds 72 to 75 and a core mold 76. The core mold 76 is made up, in turn, of a core main body 77 for defining inner circumferential surfaces of the main body portion 65 and the seal lips 66, 67 of the glass run 61 and a holding portion 78 which protrudes from the core main body 77. In molding a molded portion, firstly, the core main body 77 is set in the mold unit 70 so as to be fitted therein in such a state that the respective molds 71 to 76 are opened, and extruded portions are mounted in the mold unit 70. Then, the respective molds 71 to 76 are disposed at predetermined positions and are then clamped together. At this point, a cavity 80 for molding a molded portion is defined by the respective molds 71 to 76. Then, unvulcanized rubber is injected and compacted into the cavity 80 via a gate or the like. Thereafter, the unvulcanized rubber is vulcanized, and the respective molds 71 to 76 are opened, whereby the core mold 76 and the vulcanized rubber are integrally removed from the mold unit 70. Then, the resulting molded portion is removed from the core mold 76, whereby a glass run 61 is obtained in which the molded portion and the extruded portions are made integral with each other.

Conventionally, as shown in FIG. 29A, both the extruded portions and the molded portion are molded in a state such that the pair of side wall portions 63, 64 are spread relative to the base portion 62 or are opened out outwardly around root portions thereof which are joined to the base portion 62 as base points. This is because in molding the molded portion, although the core main body 77 needs to be set in the mold unit 70 in order to define the inner circumferential surfaces of the main body portion 65 and the seal lips 66, 67, in the case of the mold unit 70 having the cavity 80 in which the seal lips 66, 67 are located close to each other, unless the molded portion is molded with the side wall portions 63, 64 being so opened out, a sufficient thickness W3 cannot be given to the holding portion 78 for holding the core main body 77.

As shown in FIG. 29B, in mounting the glass run 61 so molded with the side wall portions 63, 64 being opened out in the sash S, the side wall portions 63, 64 are both contracted from the opened-out state to a non-opened-out state. Namely, in a mounting state, the side wall portions 63, 64 are both moved inwardly, so that the main body portion 65 is shaped so as to have substantially a U-shaped cross section. As this occurs, without the door window glass G, distal end portions of both the seal lips 66, 67 are brought into abutment with each other.

In the aforesaid related art, when the molded portion is contracted so as to be mounted in the sash S, respective portions of the molded portion (the corner portion) do not deform uniformly, and the bending angle (and the radius of curvature and length of circumference) of the molded portion may be caused to change due to stress produced therein then. As this occurs, the whole shape of the glass run 61 is not allowed to follow the shape of the sash, leading to a risk that there occurs a mounting failure.

On the other hand, while it is considered possible to design the glass run 61 with the opened out side wall portions in the light of the change in the bending angle or the like, since it is not possible, in reality, to estimate what type of change occurs to what extent, a number of tries and errors have to be carried out repeatedly, thereby calling, as a result, for a remarkably large increase in man hours for design of such a glass run.

In addition to the aforesaid type of glass run, there is proposed a glass run in which a bellows-like extension portion is formed in a base portion of a molded portion so as to extend and contract in a direction traversing the interior and exterior of the vehicle, so that the extension portion, which is in an extended state before it is mounted in a sash, is contracted at the time of mounting so as to be fitted in the sash (for example, refer to Japanese Patent Publication No. JP-A-9-315161).

In the invention described in JP-A-9-315161, however, the extension portion is provided at a portion of the base portion which faces a door window glass, and there may be caused a risk that an end face of the door window glass is brought into abutment with the extension portion. Due to this, the door window glass is swung transversely inwards or outwards, leading a risk that the sliding positions of end faces of the door window glass along vertical side portions of the glass run become unstable and the abutment position of an end face of the glass run along an upper side portion of the glass run also becomes unstable, thereby calling, as a result, for a decrease in the sealing properties of the glass run. Furthermore, in the event that the end face of the door window glass is brought into abutment with the extension portion repeatedly, there may be caused a problem that the durability of the extension portion and hence the glass run is deteriorated.

In addition, when working to mount the glass run provided with the extension portions in the sash, an assembly worker has to sequentially fit respective portions of the glass run along the full length thereof in the sash while maintaining the extension portions in the contracted state, this eventually requiring lots of labor hours.

On top of this, from the viewpoint of improving the functionality of glass runs, in recent years, more functions are desired to be added thereto. In the event that the extension portion is provided, however, it has been difficult to provide additional functions such as a lip for reducing the collision noise produced when the door window glass is closed.

In addition, in molding the molded portion, in consideration of the injection pressure at which the unvulcanized rubber is injected into the cavity 80 via the gate or the like, not only the thickness W3 of the holding portion 78 described in the related art but also the holding portion of a core mold used for molding the molded portion of the glass run described in JP-A-9-315161 cannot be ensured as sufficient. For example, in the event that an injection pressure exceeding an estimated injection pressure is applied to the holding portion 78 from a side thereof, there may be caused a risk that the holding portion 78 is bent, whereby the shape of the cavity 80 is distorted. As a result, a glass run 61 of proper shape cannot be obtained, leading to a risk that the aforesaid various types of drawbacks are caused including the mounting failure and deterioration in the sealing properties of the glass run 61.

SUMMARY OF THE INVENTION

The invention was made with a view to solving the problems and an object thereof is to provide a glass run which can realize the improvement in positional stability of a door window glass.

Another object of the invention is to provide a glass run which can realize a remarkable improvement in workability and can suppress the increase in design man hours by suppressing the irregular deformation of a molded portion and a method for manufacturing the same glass run.

A further object of the invention is to provide a glass run which can realize a remarkable improvement in workability when worked to be mounted in a sash and can suppress the increase in design man hours by suppressing the irregular deformation of a molded portion and a method for manufacturing the same glass run.

An object of the invention is to provide a glass run which has other additional functions than an extendable and contractible function.

Hereinafter, the features of the invention suited to attaining the objects will be described item by item. Note that functions and advantages inherent in the corresponding feature will be added as required.

(1) A glass run having extruded portions formed by extrusion and a molded portion molded by molding so as to connect to end portions of the extruded portions and having:

a main body portion having substantially a U-shaped cross section which is adapted to be mounted in a sash provided on a body or door of a vehicle and is provided with a base portion, as well as an interior side wall portion and an exterior side wall portion which extend, respectively, from both ends of the base portion;

a pair of seal lips which extend, respectively, from distal ends of the interior side wall portion and the exterior side wall portion toward an inside of the main body portion so as to be joined to a door window glass to thereby effect a seal therebetween; and an extension portion formed in the base portion so as to extend and contract in a direction traversing the interior and exterior of the vehicle, wherein the extension portion is formed in the base portion at a position which deviates from a position of the base portion to which an end face of the door window glass is opposed.

According to (1), even when the glass run is molded with the main body portion being in the non-opened-out state to thereby have substantially the U-shaped cross section, in the event that the extension portion is molded in such a state that the same portion extends in a direction traversing the interior and exterior of the vehicle, the glass run can be obtained in which the seal lips are separated from each other so as to provide an opening therebetween. By adopting this construction, when attempted to be applied, a predetermined lubricant can be applied to the inner circumferential surface of the base portion and the sliding surfaces of the seal lips over which the door window glass is allowed to slide, and a risk can be reduced that the seal lips are joined together immediately after the molding of the glass run. In addition, as to the molded portion, a sufficient thickness can be given to a holding plate for holding the core of the mold unit. Furthermore, in performing a mounting operation, since there is no need to rotate the side wall portions of the molded portion from the opened-out state so as to contract them, there occurs no case where the bending angle, radius of curvature and length of circumference of the molded portion are caused to change between before and after the mounting. Consequently, the risk can be eliminated that the molded portion cannot be mounted in the sash while following the shape of the sash. In addition, in designing glass runs, since there is no need to repeat tries and errors with a view to eliminating the aforesaid change in the structural factors of the molded portion which would otherwise occur, a reduction in the number of design man hours can be realized.

In addition, in the invention, since the extension portion is formed in the base portion at the position which deviates from the position of the base portion to which the end face of the door window glass is opposed, the risk is reduced that the end face of the door window glass is brought into abutment with the extension portion so formed. By adopting this construction, the sliding positions and abutment position of the end faces of the door window glass become stable, whereby the improvement in sealing properties at the molded portion can be realized. Furthermore, the improvement in durability of the extension portion and hence the glass run can be realized. Note that the description that the extension portion is formed in the base portion includes, of course, a case in which the extension portion is formed in a connecting portion between the base portion and the interior side wall portion or the exterior side wall portion.

(2) A glass run having extruded portions formed by extrusion and a molded portion formed by molding so as to connect to end portions of the extruded portions and having:

a main body portion having substantially a U-shaped cross section which is adapted to be mounted in a sash provided on a body or door of a vehicle and is provided with a base portion, as well as an interior side wall portion and an exterior side wall portion which substantially intersect with the base portion at right angles; and a pair of seal lips which extend, respectively, from the interior side wall portion and the exterior side wall portion toward an inside of the main body portion so as to be joined to a door window glass to thereby effect a seal therebetween; the glass run comprising:

an extension portion formed in the base portion or so as to join the base portion to the interior side wall portion or the exterior side wall portion so as to extend and contract the main body portion in a direction traversing the interior and exterior of the vehicle wherein an additional function is imparted to the extension portion.

According to (2), even when the glass run is molded with the main body portion being in the non-opened-out state to thereby have substantially the U-shaped cross section, in the event that the extension portion is molded in such a state that the same portion extends in a direction traversing the interior and exterior of the vehicle, the glass run can be obtained in which the seal lips are separated from each other so as to provide an opening therebetween. By adopting this construction, when attempted to be applied, a predetermined lubricant can be applied to the inner circumferential surface of the base portion and the sliding surfaces of the seal lips over which the door window glass is allowed to slide, and a risk can be reduced that the seal lips are joined together immediately after the molding of the glass run. In addition, as to the molded portion, a sufficient thickness can be given to a holding plate for holding the core of the mold unit. Furthermore, in performing a mounting operation, since there is no need to rotate the side wall portions of the molded portion from the opened-out state so as to contract them, there occurs no case where the bending angle, radius of curvature and length of circumference of the molded portion are caused to change between before and after the mounting. Consequently, the risk can be eliminated that the molded portion cannot be mounted in the sash while following the shape of the sash. In addition, in designing glass runs, since there is no need to repeat tries and errors with a view to eliminating the aforesaid change in the structural factors of the molded portion which would otherwise occur, a reduction in the number of design man hours can be realized.

Furthermore, by imparting an additional function to the extension portion in addition to the extendable and contractible function, the remarkable improvement in the functionality of the glass run can be realized relatively easily.

(3) In a glass run of the invention, a vibration control function is provided as the additional function for restricting a transverse movement caused by the vibration of the door window glass.

According to (3), the transverse movement caused by the vibration of the door window glass is restricted, whereby the improvement in the functionality of the glass run is realized including the enhancement in stability of the sliding or abutment positions of the door window glass.

(4) In a glass run of the invention, a damper function is provided as the additional function for reducing an impact generated between an end face of the door window glass and a bottom surface of the sash when the door window glass is closed.

According to (4), an impact generated between the end face of the door window glass and the bottom surface of the sash when the door window glass is closed is absorbed, whereby it is possible to realize the improvement in the functionality of the glass run that an impact noise based on the impact is reduced.

(5) In a glass run of the invention, a wind noise suppressing function is provided as the additional function for suppressing a wind noise generated in a gap between the sash and the glass run.

According to (5), the improvement in the functionality of the glass run that the wind noise generated while the vehicle is running can be realized.

(6) A glass run having extruded portions formed by extrusion and a molded portion molded by molding so as to connect to end portions of the extruded portions and having:

a main body portion having substantially a U-shaped cross section which is adapted to be mounted in a sash provided on a body or door of a vehicle and is provided with a base portion, as well as an interior side wall portion and an exterior side wall portion which extend, respectively, from both ends of the base portion; and a pair of seal lips which extend, respectively, from the interior side wall portion and the exterior side wall portion toward an inside of the main body portion so as to be joined to a door window glass adapted to ascend and descend to thereby effect a seal therebetween; the glass run comprising:

an extension portion formed at at least a position on the base portion on an upper side portion of the glass run to which an end face of the door window glass is opposed so as to extend and contract the main body portion in a direction traversing the interior and exterior of the vehicle ; wherein when the extension portion is contracted, portions of the base portion which face each other across the extension portion so formed are brought into abutment with each other so that a hollow portion is formed by the extension portion on a side of the base portion which faces an end face of the door window glass, whereby when the door window glass is closed, the end face of the door window glass is brought into abutment with the hollow portion formed by the extension portion.

According to (6), while a function and advantage similar to those realized by (1) can be realized, an impact generated when the door window glass is closed can be absorbed by virtue of the elastic force of the extension portion having the hollow portion, thereby making it possible to reduce the impact noise based on the impact that would otherwise be caused. Namely, the extension portion has an additional function as a damper unit, and this improves the functionality of the glass run. In addition, in the event that the aforesaid contraction is adopted, air trapped in the hollow portion can be vented through a minute gap between the portions of the base portion which are then in abutment with each other. This serves to reduce a drawback that the extension portion does not take an expected deformed form when the end face of the door window glass is brought into abutment therewith as in the case happening with an extension portion having a hollow portion which is closed airtight so that no air is vented therefrom, whereby the extension portion deforms into a distorted shape, and hence a drawback can be reduced that the door window glass is received in the glass run at a position which deviates from the predetermined position. As a result, the abutment position where the door window glass is brought into abutment is stabilized, thereby making it possible to realize the enhancement in sealing properties of the glass run. Furthermore, it is also made possible to omit a process that would otherwise be carried out after an extrusion of an extruded portion with a perfect hollow portion formed therein for specially making an air vent hole in the perfect hollow portion.

(7) In a glass run of the invention, the extension portion is provided with a pair of support portions extending, respectively, from surfaces facing the end face of the door window glass of the portions of the base portion which face each other across the extension portion and a receiving portion which joins distal end portions of the support portions to each other.

According to (7), the end face of the door window glass abuts with the receiving portion when the end face of the door window glass is brought into abutment with the extension portion. Namely, a distal end portion of the door window glass is held so as to be encapsulated in the receiving portion while being supported by the pair of support portion. Consequently, a drawback is made difficult to happen that the position of the door window glass is caused to deviate due to an impact generated when the door window glass is closed as is happening in a case where the extension portion is formed in substantially a circular cross section, thereby making it possible to allow the door window glass to be received in the predetermined position. As a result, a remarkable improvement can be realized in stabilization of the door window glass when it is closed.

(8) In a glass run of the invention, the receiving portion is bent so as to become concave relative to the end face of the door window glass.

According to (8), the stability is increased in which the end face of the door window glass is brought into abutment with the extension portion, whereby the function and advantage provided by (7) can be enhanced further.

(9) A glass run having extruded portions formed by extrusion and a molded portion formed by molding so as to connect to end portions of the extruded portions and having:

a main body portion having substantially a U-shaped cross section which is adapted to be mounted in a sash provided on a body or door of a vehicle and is provided with a base portion, as well as an interior side wall portion and an exterior side wall portion which substantially intersect with the base portion at right angles; and a pair of seal lips which extend, respectively, from the interior side wall portion and the exterior side wall portion toward an inside of the main body portion so as to be joined to a door window glass to thereby effect a seal therebetween; the glass run comprising:

an extension portion formed in at least the base portion on an upper side portion of the glass run or so as to continuously join the base portion to the interior side wall portion or the exterior side wall portion so as to extend and contract the main body portion in a direction traversing the interior and exterior of the vehicle, wherein the extension portion protrudes toward the inside of the main body portion at least when in a contracted state so as to be interposed between an end face of the door window glass and the base portion which faces the end face of the door window glass, whereby when the door window glass is closed, the end face of the door window glass is brought into abutment with the extension portion.

According to (9), while a function and advantage similar to those realized by (1) can be realized, an impact generated when the door window glass is closed can be absorbed by the extension portion which protrudes in a lip-like fashion, thereby making it possible to reduce the impact noise based on the impact that would otherwise be caused. Namely, the extension portion has an additional function as a damper unit, and the improvement in the functionality of the glass run can thereby be realized.

(10) In a glass run of the invention, the extension portion is formed in substantially a V-shaped cross section when in an extended state, whereas when in a contracted state, the extension portion is put in a folded state.

According to (10), the extension portion is formed into the lip-like shape when contracted, whereby the advantage obtained by (9) can be provided in a more ensured fashion. In addition, the thickness of one side portion of the extension portion which faces the inside and outside of the vehicle may be thinner than the thickness of the other side portion. By adopting the construction, since the thinner side portion elastically deforms prior to the thicker one when the extension portion contracts due to a difference in thickness between the relevant side portions, the extension portion can easily be induced into the predetermined contracted state.

(11) A glass run having extruded portions formed by extrusion and a molded portion formed by molding so as to connect to end portions of the extruded portions and having:

a main body portion having substantially a U-shaped cross section which is adapted to be mounted in a sash provided on a body or door of a vehicle and is provided with a base portion, as well as an interior side wall portion and an exterior side wall portion which substantially intersect with the base portion at right angles; and a pair of seal lips which extend, respectively, from the interior side wall portion and the exterior side wall portion toward an inside of the main body portion so as to be joined to a door window glass to thereby effect a seal therebetween; the glass run comprising:

an extension portion formed so as to continuously join the interior side wall portion and the base portion together and adapted to extend and contract; wherein the extension portion is constructed so as to extend and contract in a direction traversing the interior and exterior of the vehicle in such a manner that the interior side wall portion and the base portion are spaced apart from each other when the extension portion is in an extended state and are brought into abutment with each other when in a contracted state, whereby when the extension portion is in the contracted state, a hollow portion is formed inside the main body portion by the extension portion in such a manner that the hollow portion is positioned inwardly of the door window glass.

According to (11), while a function and advantage similar to those obtained by (2) can be realized, even in the event that door window glass moves transversely due to vibrations, the positional deviation of the door window glass toward the inside of the vehicle can be restricted. As a result, it becomes possible to realize a flush surface which has been in demand in recent years or to make the exterior surface of the sash flush with the exterior surface of the door window glass from the viewpoint of improvement in the quality of external appearance.

(12) In a glass run of the invention, the hollow portion of the extension portion abuts with a rear surface of the seal lip situated inside the vehicle, whereby the transverse movement of the door window glass toward the inside of the vehicle is restricted together with the seal lip situated inside the vehicle.

According to (12), the function and advantage obtained by (10) can be enhanced further.

(13): In a glass run of the invention, the extension portion is brought into elastic abutment with the seal lip situated inside the vehicle so as to apply thereto a stress directed toward the outside of the vehicle.

According to (13), the advantage obtained by (12) can remarkably be enhanced by virtue of the elastic stress of the extension portion.

(14) A glass run having extruded portions formed by extrusion and a molded portion formed by molding so as to connect to end portions of the extruded portions and having:

a main body portion having substantially a U-shaped cross section which is adapted to be mounted in a sash provided on a body or door of a vehicle and is provided with a base portion, as well as an interior side wall portion and an exterior side wall portion which substantially intersect with the base portion at right angles; and a pair of seal lips which extend, respectively, from the interior side wall portion and the exterior side wall portion toward an inside of the main body portion so as to be joined to a door window glass to thereby effect a seal therebetween; the glass run comprising:

an extension portion formed so as to continuously join the interior side wall portion and the base portion together and adapted to extend and contract; wherein the extension portion is constructed so as to extend and contract in a direction traversing the interior and exterior of the vehicle in such a manner that the interior side wall portion and the base portion are spaced apart from each other when the extension portion is in an extended state and are brought into abutment with each other when in a contracted state, whereby when the extension portion is in the contracted state, a hollow portion is formed inside the main body portion by the extension portion in such a manner that the hollow portion in the hollow portion is brought into abutment with an interior side of the door window glass when the door window glass is closed.

According to (14), while a function and advantage similar to those obtained by (2) can be realized, the positional deviation of the door window glass toward the inside of the vehicle can be restricted. As a result, it becomes possible to realize a flush surface which has been in demand in recent years or to make the exterior surface of the sash flush with the exterior surface of the door window glass from the viewpoint of improvement in the quality of external appearance. Furthermore, when the door window glass is closed, the hollow portion in the extension portion on an upper side portion of the glass run is intentionally brought into contact with the interior side of the door window glass so as to restrict the movement of the door window glass, whereby the improvement in the functionality of the glass run that the sliding or abutment position of the door window glass is highly stabilized can be realized. As this occurs, a lubricant may be applied to the extension portion so as to increase the sliding properties of the door window glass.

(15) In a glass run of the invention, the extension portion is brought into elastic abutment with the door window glass so as to apply thereto a stress directed toward the outside of the vehicle.

According to (15), the advantage obtained by (14) can remarkably be enhanced by virtue of the elastic stress of the extension portion.

(16) In a glass run of the invention, one end portion of the extension portion is continuously joined to a surface of the base portion which faces the end face of the door window glass, whereas the other end portion thereof is continuously joined to a wall surface of the interior side wall portion.

According to (16), when compared with a case where the extension portion is continuously joined to end portions of the base portion and the side wall portion, the hollow portion can relatively be enlarged, and the continuously joined portion between the extension portion and the base portion can be positioned closer to the outside of the vehicle, thereby making it possible to ensure the position of the door window glass toward the outside of the vehicle. As a result, a further improvement in the restriction effect can be realized.

(17) A glass run having extruded portions formed by extrusion and a molded portion formed by molding so as to connect to end portions of the extruded portions and having:

a main body portion having substantially a U-shaped cross section which is adapted to be mounted in a sash provided on a body or door of a vehicle and is provided with a base portion, as well as an interior side wall portion and an exterior side wall portion which substantially intersect with the base portion at right angles; and a pair of seal lips which extend, respectively, from the interior side wall portion and the exterior side wall portion toward an inside of the main body portion so as to be joined to a door window glass to thereby effect a seal therebetween; the glass run comprising:

an extension portion formed in the base portion or so as to continuously join the base portion to the interior side wall portion or the exterior side wall portion so as to extend and contract the main body portion in a direction traversing the interior and exterior of the vehicle, wherein the extension portion is constructed so as to protrude toward the outside of the main body portion at least when in a contracted state, whereby the extension portion is brought into abutment with the sash when the glass run is mounted in the sash.

According to (17), while a function and advantage similar to those obtained by (2) can be realized, wind noise generated in a gap between the sash and the glass run can be suppressed.

(18) A glass run having extruded portions formed by extrusion and a molded portion formed by molding so as to connect to end portions of the extruded portions and having:

a main body portion having substantially a U-shaped cross section which is adapted to be mounted in a sash provided on a body or door of a vehicle and is provided with a base portion, as well as an interior side wall portion and an exterior side wall portion which substantially intersect with the base portion at right angles; and a pair of seal lips which extend, respectively, from the interior side wall portion and the exterior side wall portion toward an inside of the main body portion so as to be joined to a door window glass adapted to ascend and descend to thereby effect a seal therebetween; the glass run comprising:

an extension portion formed in the base portion or so as to continuously join the base portion to the interior side wall portion or the exterior side wall portion so as to extend and contract the main body portion in a direction traversing the interior and exterior of the vehicle, wherein the extension portion is provided with at least an internal constituent portion which protrudes toward the inside of the main body portion at least when in a contracted state and an external constituent portion which protrudes toward the outside of the main body portion, whereby the external constituent portion is constructed so as to be brought into abutment with the sash when the glass run is mounted in the sash, whereas the internal constituent portion is interposed between an end face of the door window glass and the base portion which faces the end face so as to be brought into abutment with the end face of the door window glass when the door window glass is closed.

According to (18), while a function and advantage similar to those obtained by (2) can be realized, an impact generated when the door window glass is closed can be absorbed by the internal constituent portion, whereby impact noise based on the impact can be reduced. In addition, wind noise generated in a gap between the sash and the glass run can be suppressed by the external constituent portion.

(19) In a glass run of the invention, the internal constituent portion and the external constituent portion are formed into shapes having substantially V-shaped cross sections, respectively, when in an extended state, whereby the extension portion is constructed so as to be formed, as a whole, into substantially a pantograph-like shape (substantially a quadrangular shape).

(20) In a glass run of the invention, the internal constituent portion and the external constituent portion are constructed, respectively, such that the thickness of one side portion which is situated in the inside and outside of the vehicle is thinner than the thickness of the other side portion.

According to (20), since the thinner side portion elastically deforms prior to the thicker one when the extension portion contracts due to a difference in thickness between the relevant side portions, the extension portion can easily be induced into the predetermined contracted state.

(21) In a glass run of the invention, the extension portion is formed thinner than the base portion.

According to (21), the contraction of the extension portions is facilitated, and when in a contracted state, the shape of the extension portion and hence the main body portion can easily be maintained in a proper shape. As a result, the position of the door window glass is stabilized, thereby making it possible to ensure that the advantages of the aforesaid respective features can be provided as intended.

(22) A glass run of the invention, the extension portion is formed in such a state that the extension portion is extended in a direction traversing the interior and exterior of the vehicle and the main body portion is formed in a non-opened-out state in which the main body portion is formed in substantially a U-shaped cross section, whereby the extension portion and the main body portion are mounted in the sash in such states that the extension portion is contracted in a direction traversing the interior and exterior of the vehicle and that the main body portion is not opened out and hence is formed in substantially the U-shaped cross section.

According to (22), when molding the glass run, an opening is formed between the seal lips in such states that the extension portion is extended in a direction traversing the interior and exterior of the vehicle and that the main body portion is not opened out and hence is formed in substantially the u-shaped cross section. By adopting this construction, as has been described as to the advantage obtained by (2), when attempted to be applied, a predetermined lubricant can be applied to the inner circumferential surface of the base portion and the sliding surfaces of the seal lips over which the door window glass is allowed to slide, and a risk can be reduced that the seal lips are joined together immediately after the molding of the glass run. In addition, as to the molded portion, a sufficient thickness can be given to a holding plate for holding the core of the mold unit. Furthermore, in performing a mounting operation, since there is no need to rotate the side wall portions of the molded portion from the opened-out state so as to contract them, there occurs no case where the bending angle, radius of curvature and length of circumference of the molded portion are caused to change between before and after the mounting. Consequently, the risk can be eliminated that the molded portion cannot be mounted in the sash while following the shape of the sash. In addition, in designing glass runs, since there is no need to repeat tries and errors with a view to eliminating the aforesaid change in the structural factors of the molded portion which would otherwise occur, a reduction in the number of design man hours can be realized.

(23) In a glass run of the invention, the molded portion constitutes a corner portion of the glass run which is to be disposed at a corner portion of the sash.

According to (23), in the case of a molded portion which constitutes a corner portion, although the angle, radius of curvature and circumferential length thereof tend to change by contracting the side wall portions which are opened out, according to this feature, since the side wall portions do not have to be contracted, the aforesaid concern can be discarded from the beginning.

BRIEF DESCRIPTION OF THE DRAWINGS

FIG. 1 is a drawing showing the overall construction of a glass run to which respective embodiments of the invention are applied.

FIGS. 2A, 2B are sectional views taken along the line K-K in FIG. 1, in which FIG. 2A is a sectional view showing a glass run according to a first embodiment, which is in a state resulting before mounting and FIG. 2B is a sectional view of the glass run, which is in a state resulting after mounting.

FIGS. 6A, 6B are sectional views taken along the line K-K in FIG. 1, in which FIG. 6A is a sectional view showing a glass run according to a fifth embodiment, which is in a state resulting before mounting and FIG. 6B is a sectional view of the glass run, which is in a state resulting after mounting.

FIGS. 11A, 11B are sectional views taken along the line K-K in FIG. 1, in which FIG. 11A is a sectional view showing a glass run according to a ninth embodiment, which is in a state resulting before mounting and FIG. 11B is a sectional view of the glass run, which is in a state resulting after mounting.

FIGS. 15A, 15B are sectional views taken along the line K-K in FIG. 1, in which FIG. 15A is a sectional view showing a glass run according to a thirteenth embodiment, which is in a state resulting before mounting and FIG. 15B is a sectional view of the glass run, which is in a state resulting after mounting.

FIG. 27 is a drawing showing an exemplary construction of a molded portion and the vicinity thereof with a base portion being developed as viewed from the top.

DETAILED DESCRIPTION OF THE PREFERRED EMBODIMENTS

First Embodiment

Figure 2A:
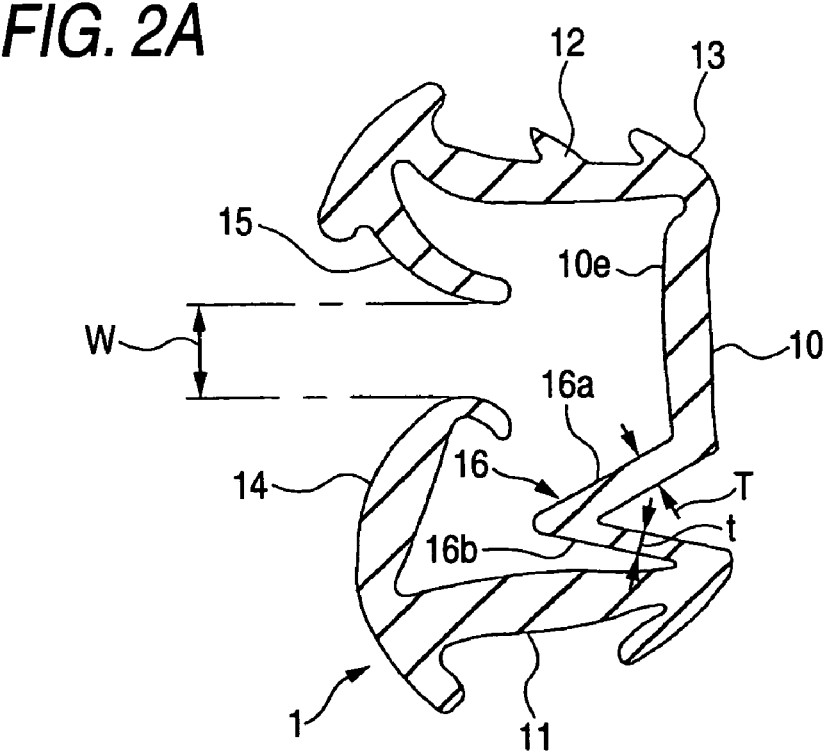

Firstly, a first embodiment will be described by reference to the accompanying drawings. In a vehicle having door window glasses adapted to ascend and descend, as shown in FIG. 1, a glass run 1 formed from EPDM (ethylene-propylene-diene copolymer rubber) is mounted on the door window glass so as to correspond to an outer circumferential shape of the door window glass. To be specific, a sash having substantially a U-shaped cross section (refer to FIG. 2B) is provided on the door so as to follow the outer circumferential shape of the door window glass, and the glass run 1 according to the embodiment of the invention is mounted in the sash S.

The glass run 1 is provided with, as viewed in a longitudinal direction thereof, an extruded portion 2 corresponding to an upper side portion, extruded portions 3, 4 corresponding, respectively, to front and rear vertical side portions, and molded portions 5, 6 (portions shown as shaded with scattered dots in FIG. 1) which join end portions of the extruded portion 2, respectively, to end portions of the respective extruded portions 3, 4. The respective extruded portions 2, 3, 4 are formed in substantially a rectilinear fashion (into an elongated shape) by means of an extruder, not shown. In addition, the molded portions 5, 6 are molded by a mold unit, not shown, as continuously joined to the two extruded portions 3, 4 in such a manner that the two extruded portions 2, 3 and the two extruded portions 2, 4 are, respectively, joined to each other at predetermined angles. Namely, the molded portions 5, 6 correspond to corner portions.

Figure 2B:
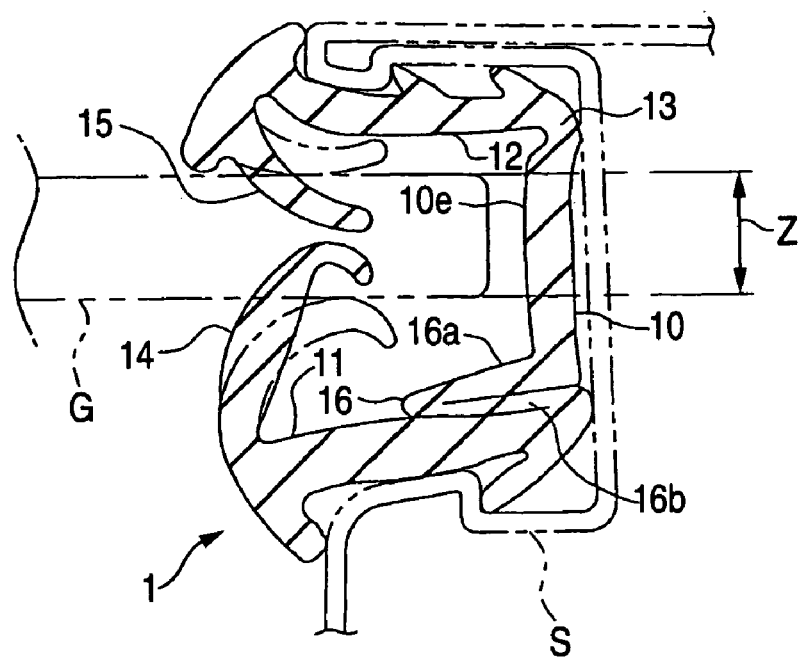

As shown in FIGS. 2A, 2B, the extruded portions 2 to 4 and the molded portions 5, 6 each have a main body portion 13 having substantially a U-shaped cross section which is adapted to be mounted in the sash S and is provided with a base portion 10, as well as an interior side wall portion 11 and an exterior side wall portion 12 which extend, respectively, from both ends of the base portion 10 and a pair of seal lips 14, 15 which extend, respectively, from distal ends of the interior side wall portion 11 and the exterior side wall portion 12 toward the inside of the main body portion 13 so as to be joined to a door window glass G to thereby effect a seal therebetween.

An extension portion 16 is formed in the base portion 10 so as to extend and contract in a direction traversing the interior and exterior of the vehicle. To be specific, the extension portion 16 is provided at a position in the base portion 10 which is made to deviate from a position of the base portion 10 to which an end face of the door window glass G is opposed and corresponds to a section Z defined by a position which intersects with an extension along an interior side of the door window glass G and a position which intersects with an extension along an exterior side of the door window glass G. In this embodiment, the extension portion 16 is provided inwards of the position facing the end face of the door window glass G as viewed in the direction traversing the interior and exterior of the vehicle (in a vertical direction as viewed in FIG. 2A) so as to be close to the vicinity of a portion where the interior side wall portion 11 is joined to the base portion 10. Namely, the extension portion 16 is provided at the position which does not disturb the abutment or slide of the end face of the door window glass.

The extension portion 16 is provided with an inner movable portion 16a positioned near to the position facing the end face of the door window glass G and a outer movable portion 16b positioned far apart from the same position, is formed in substantially a V-shaped cross section which takes a convex shape toward the inside of the main body portion 13 when in an extended state and protrudes toward the inside of the main body 13 from a surface 10e of the base portion 10 which faces the end face of the door window glass G. In addition, the extension portion 16 is made thinner than the thickness of a body of the base portion 10, and the outer movable portion 16b is made thinner than the inner movable portion 16a.

As shown in FIG. 2A, the glass run 1 is molded in such a state that both the extruded portions 2 to 4 and the molded portions 5, 6 are extended in a direction traversing the interior and exterior of the vehicle. Consequently, before the glass run 1 is mounted into the sash S, a predetermined opening W is secured between the seal lips 14, 15 in such a state that while the main body portion 13 is maintaining substantially the U-shaped cross section which represents a non-opened-out state, the interior side wall portion 11 and the exterior side wall portion 12 are shifted apart in parallel to both sides by a dimension corresponding to the extension of the extension portion 16.

Then, when mounting the glass run 1 into the sash S, the extension portion 16 is contracted so that the interior side wall portion 11 and the exterior side wall portion 12 are shifted nearer in parallel, whereby the main body portion 13 can easily be fitted into the sash S in a state such that the main body portion 13 maintains substantially the U-shaped cross section representing the non-opened-out state.

When the extension portion 16 contracts, due to a difference in thickness between the respective movable portions 16a, 16b, the outer movable portion 16b elastically deforms prior to the inner one, whereby the extension portion 16 inclines toward the inside of the vehicle (toward the descending direction as viewed in FIG. 2B and the like) or toward a direction to be separated apart from the position facing the end face of the door window glass G. Consequently, the extension portion 16 is offset to the position which does not disturb the slide and abutment of the end face of the door window glass G in such a state that the glass run 1 is mounted in the sash S.

Thus, as has been described in detail, the glass run 1 is molded in such a state that the extension portion 16 is extended in a direction traversing the interior and exterior of the vehicle and that the main body portion 13 maintains substantially the U-shaped cross section representing the non-opened-out state and is then mounted in the sash S in such a state that the extension portion 16 is contracted in a direction traversing the interior and exterior of the vehicle and that the main body portion 13 maintains substantially the U-shaped cross section representing the non-opened-out state. Consequently, at the time of molding the glass run 1, the two seal lips 14, 15 are spaced apart from each other so as to secure the predetermined opening W therebetween, whereby when attempted to be applied, a predetermined lubricant can easily be applied to an inner circumferential surface of the base portion 10 and sliding surfaces of the seal lips 14, 15, thereby making it possible to reduce a risk that the two seal lips 14, 15 are joined together immediately after the molding. In addition, as to the molded portions 5, 6, a sufficient thickness can be imparted to a holding plate for holding a core in the mold unit. Furthermore, when working to mount the glass run 1 in the sash S, since there is no need to rotate the side wall portions 11, 12 of the molded portions 5, 6 from the opened-out position for contraction, there is no case where the angle, radius of curvature, circumferential length of the molded portions 5, 6 change between before and after the mounting. Consequently, it is possible to eliminate the drawback that the glass run 1 cannot be mounted in the sash S so as to follow the shape of the sash S. In addition, in designing glass runs, since there is no need to repeat tries and errors with a view to eliminating the aforesaid change in the structural factors of the molded portion which would otherwise occur, a reduction in the number of design man hours can be realized.

In addition, since the extension portion 16 is provided at the position which is caused to deviate from the position on the base portion 10 to which the end face of the door window glass G is opposed, the risk is reduced that the end face of the door window glass G is brought into abutment with the extension portion 16, whereby the sliding position and the abutment position of the end face of the door window glass G are stabilized, thereby making it possible to realize the enhancement of the sealing properties of the glass run 1. Furthermore, the improvement in the durability of the extension portion 16 and hence the glass run 1 can be realized.

In addition, in the embodiment, the extension portion 16 is provided inwards of the position on the base portion 10 to which the end face of the door window glass G is opposed. Due to this, when compared with a case where the extension portion 16 is provided outwards of the position on the base portion 10 to which the end face of the door window glass G is opposed, a risk is reduced that the door window glass G is caused to deviate in position toward the inside of the vehicle by the extension portion 16. Consequently, the glass run 1 according to the embodiment can exhibit an effective advantage in realizing a flush surface which has been in demand in recent years or an attempt to make the exterior surface of the sash flush with the exterior surface of the door window glass from the viewpoint of improvement in the quality of external appearance.

In addition, since the extension portion 16 is made to protrude toward the inside of the main body portion 13 with respect to the opposed surface 10e to the end face of the door glass G to thereby prevent the protrusion of the extension portion 16 toward the outside of the main body portion 13, the glass run 1 can be mounted in the sash S properly, and the movement of the door window glass G toward the inside of the vehicle can be restricted by the extension portion 16, thereby making it possible to stabilize further the position of the door window glass G.

Second Embodiment

Next, a second embodiment will be described below by reference to the accompanying drawings. However, omitting the detailed description of constituent portions similar to those of the first embodiment, only an extension portion, which constitutes a specific feature of the second embodiment, and portions associated therewith will be described.

Figure 3A:
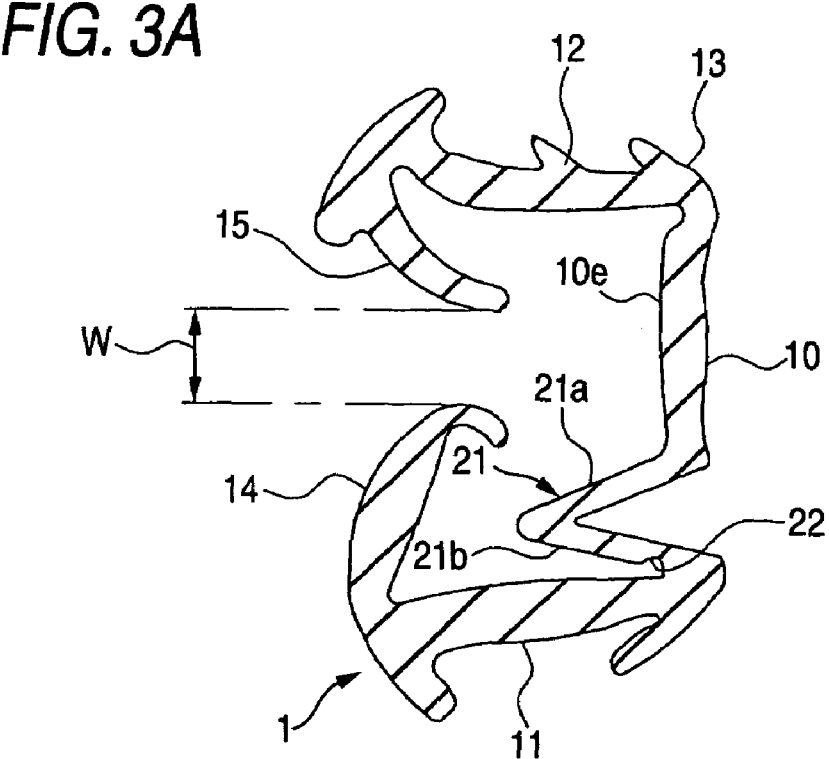
FIG. 3A is a sectional view showing a glass run according to a second embodiment, which is in a state resulting before mounting
Figure 3B:
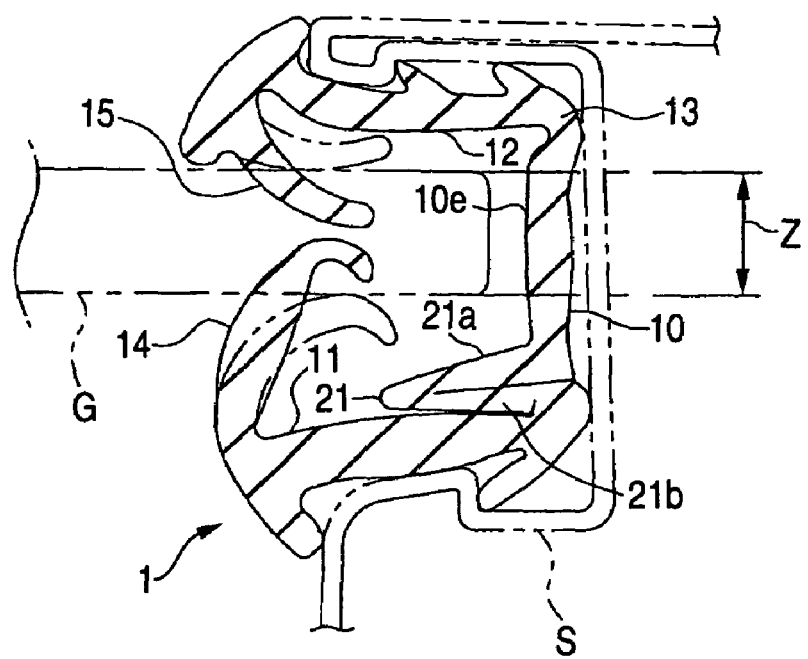
FIG. 3B is a sectional view of the glass run, which is in a state resulting after mounting.

As shown in FIGS. 3A, 3B, an extension portion 21 is formed in a base portion 10 at a position inwards of a position (a section Z) to which an end face of a door window glass G is opposed so as to extend and contract in a direction traversing the interior and exterior of the vehicle.

The extension portion 21 is provided with an inner movable portion 21a positioned near to the position facing the end face of the door window glass G and a outer movable portion 21b positioned far apart from the same position, is formed in substantially a V-shaped cross section which takes a convex shape toward the inside of a main body portion 13 when in an extended state and protrudes toward the inside of the main body 13 from a surface 10e of the base portion 10 which faces the end face of the door window glass G. In addition, the extension portion 21 is made thinner than the thickness of a body of the base portion 10, and the outer movable portion 21b and the inner movable portion 21a are made substantially the same in thickness. Of course, instead of this, the outer movable portion 21b may be made thinner than the inner movable portion 21a. Furthermore, a notch 22 having substantially a U-shaped cross section is provided in the vicinity of a root portion of the outer movable portion 21b as a notch. Note that while, in this embodiment, the notch 22 is provided in an interior side of the main body portion 13, it goes without saying that the notch 22 may be provided in an exterior side thereof.

Then, due to the provision of the notch 22, the deformation of the outer movable portion 21b is promoted when the extension portion 21 contracts, whereby the extension portion 21 inclines toward the inside of the vehicle (toward a descending direction as viewed in FIG. 3A and the like), that is, toward a direction to be separated apart from the position to which the end face of the door window glass G is opposed. Consequently, the extension portion 21 is offset to the position which does not disturb the slide and abutment of the end face of the door window glass G in such a state that the glass run 1 is mounted in the sash S.

As a result, an advantage similar to that of the first embodiment is provided.

Third Embodiment

Next, a third embodiment will be described below by reference to the accompanying drawings.

Figure 4A:
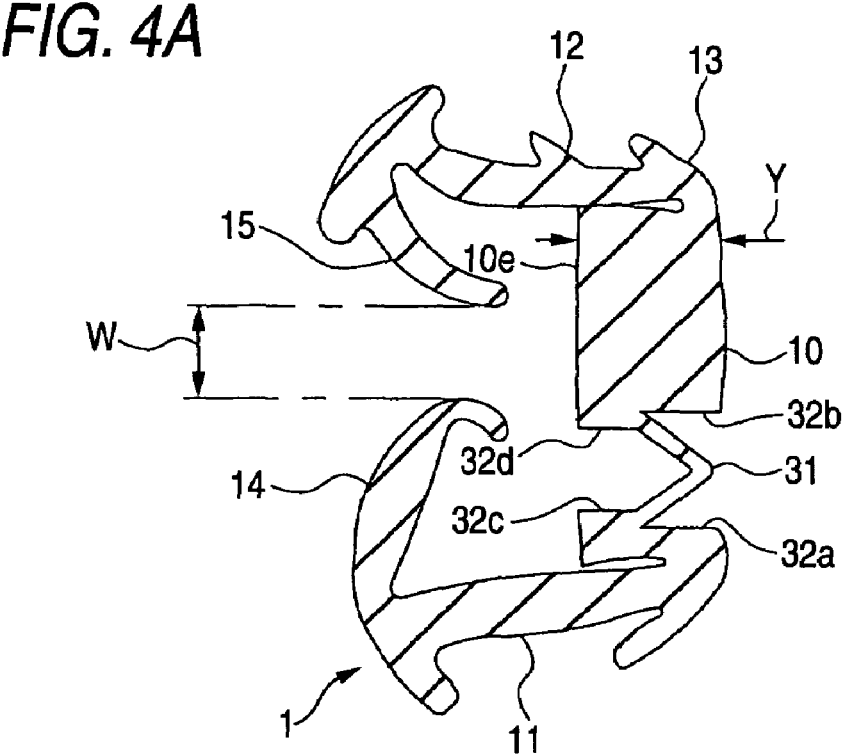
FIG. 4A is a sectional view showing a glass run according to a third embodiment, which is in a state resulting before mounting
Figure 4B:
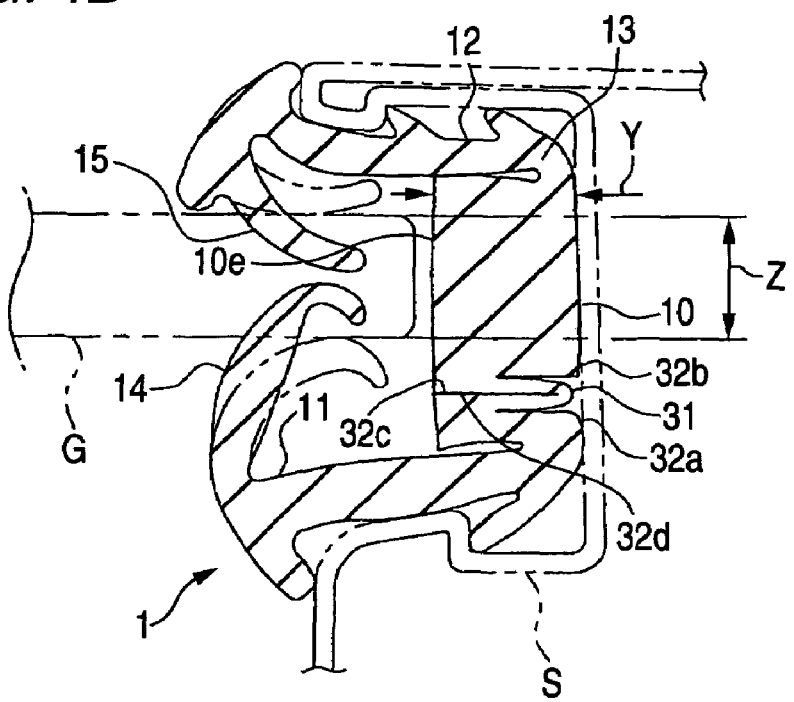
FIG. 4B is a sectional view of the glass run, which is in a state resulting after mounting.

As shown in FIGS. 4A, 4B, an extension portion 31 is formed in a base portion 10 at a position inwards of a position (a section Z) to which an end face of a door window glass G is opposed so as to extend and contract in a direction traversing the interior and exterior of the vehicle.

The extension portion 31 is continuously joined to wall surfaces of two base portion main bodies 32a, 32b which faces each other across the extension portion 31 at end portions thereof and is formed in substantially an inverted V-shaped cross section which becomes concave toward the outside of a main body portion 13 when in an extended state. The extension portion 31 is made thinner than the thickness Y of a base portion 10. The end portions of the extension portion 31 are continuously joined to the wall surfaces of the base portion main bodies 32a, 32b at substantially central portions on the wall surfaces as viewed in a thickness-wise direction of the base portion 10 (a transverse direction in FIG. 4A) and an end portion of the extension portion 31, which constitutes a bend portion and which is situated closer to an external side of the main body portion 13, is situated inwards of an external surface of the base portion 10. Consequently, the extension portion 31 is constructed so as to remain accommodated in an area defined within the thickness Y of the base portion 10 both when in the extended and contracted states without protruding from the interior and exterior sides of the main body portion 13.

In the construction, abutment portions 32c, 32d of both the base portion main bodies 32a, 32b, which are brought into abutment with each other when the extension portion 31 is contracted, are situated on a side of the base portion 10 which is closer to a surface 10e thereof which faces the end face of the door window glass G (the interior side of the main body portion 13) than the extension portion 31.

Almost the whole surfaces of the abutment portions 32c, 32d are formed into substantially flat planes which intersect with the surface 10e which faces the end face of the door window glass G at substantially right angles so that the abutment portions are brought into a surface contact with each other when they are brought into abutment with each other.

Then, when a glass run 1 so formed is mounted in a sash S, as shown in FIG. 4B, the extension portion 31 is contracted so that an interior side wall portion 11 and an exterior side wall portion 12 are shifted nearer to each other in parallel, whereby the abutment portions 32c, 32d or the base portion main bodies 32a, 32b are brought into abutment with each other. In this state, the surface 10e of the base portion 10 which faces the end face of the door window glass G constitutes a smooth level surface over the whole area thereof in such a state that the extension portion 31 is not exposed toward the surface 10e which faces the end face of the door window glass G (toward the inside of the main body portion 13). Then, with the main body portion 13 being made to maintain substantially the U-shape cross section thereof which represents its non-opened-out state, the glass run 1 is fitted into the sash S. Consequently, the extension portion 31 does not face the door window glass G in the state in which the glass run 1 is mounted in the sash S.

As a result, an advantage similar to that of the first embodiment is provided. In addition, in the construction, with the extension portion 13 being contracted, since the surface 10e of the base portion 10 which faces the end face of the door window glass G constitutes substantially the smooth level surface, the risk is reduced that the door window glass G is, when sliding, brought into abutment with the extension portion 31, whereby the sliding position and abutment position of the door window glass G are made stable in an ensured fashion, thereby making it possible to realize the improvement in the sealing properties and durability of the glass run 1.

Fourth Embodiment

Next, a fourth embodiment will be described by reference to the accompanying drawings.

Figure 5A:
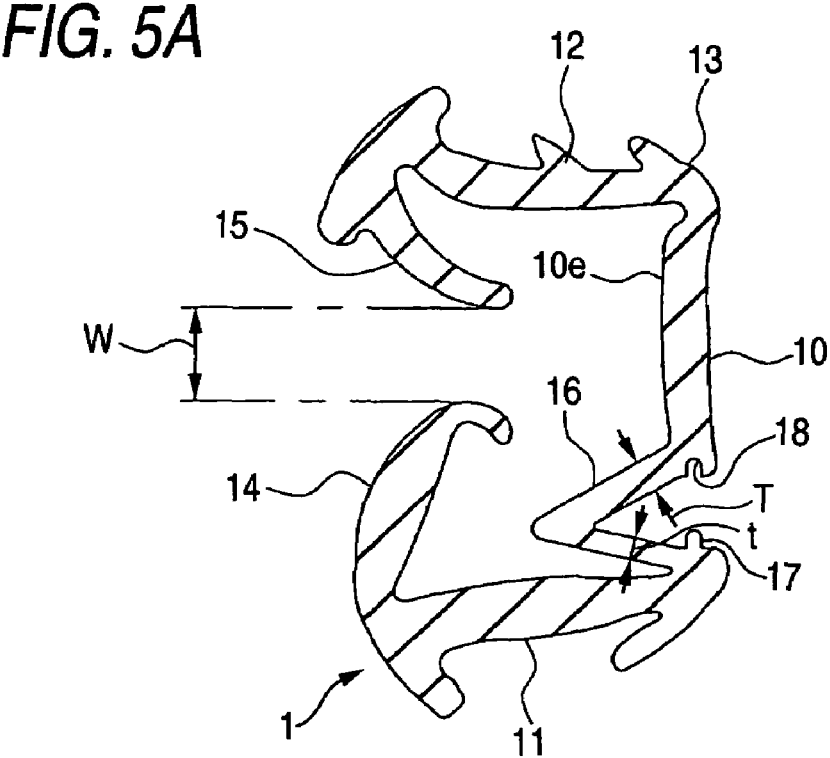
FIG. 5A is a sectional view showing a glass run according to a fourth embodiment, which is in a state resulting before mounting
Figure 5B:
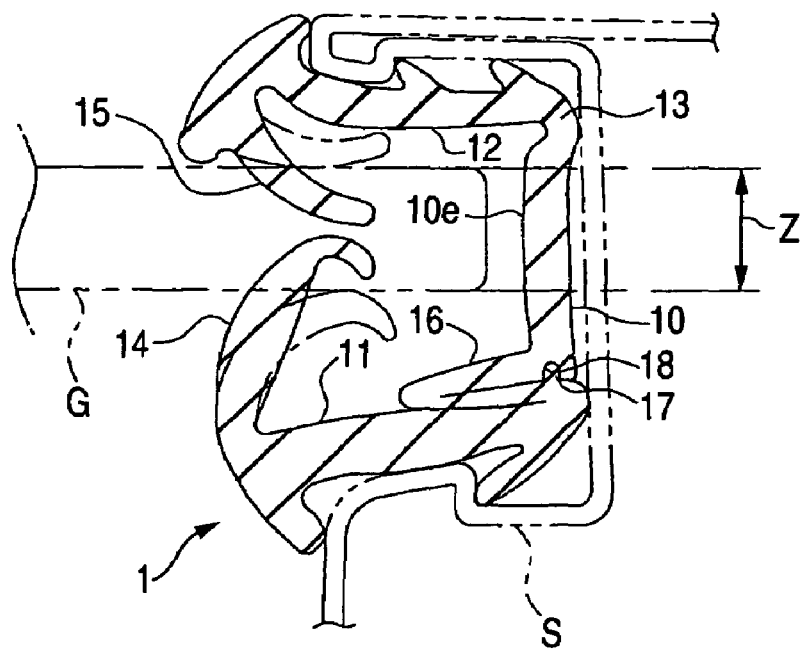
FIG. 5B is a sectional view of the glass run, which is in a state resulting after mounting.

As shown in FIGS. 5A, 5B, an engagement projection 17 is provided one of main bodies of a base portion 10 which are spaced apart to face each other when an extension portion 16 is in an extended state and are brought into abutment with each other when the extension portion 16 is in a contracted state, and an engagement recess 18, with which the engagement projection 17 is to be brought into engagement, is provided in the other main body. In this embodiment, the engagement projection 17 is provided on the internal main body of the base portion 10, whereas the engagement recess 18 is provided in the external main body of the base portion 10.

Then, when a glass run 1 so formed is mounted in a sash S, as shown in FIG. 5B, the extension portion 16 is contracted so that an interior side wall portion 11 and an exterior side wall portion 12 are shifted nearer to each other in parallel, and the main bodies of the base portion 10 are brought into abutment with each other while the engagement projection 17 is inserted into the engagement recess 18, so that the engagement projection 17 and the engagement recess 18 are brought into engagement with each other, whereby the movement of the base portion 10 is restricted in both directions along the thickness of the base portion 10, that is, in both directions toward the inside and outside of a main body portion 13. Then, with the main body portion 13 being made to maintain substantially the U-shape cross section thereof which represents its non-opened-out state, the glass run 1 is fitted into the sash S.

As a result, an advantage similar to that of the first embodiment is provided. In addition, according to the construction, when in a contracted state, the extension portion 16 and hence the main body portion 13 can be maintained in proper shapes and the relative positional relation between a door window glass G and the respective portions of the glass run 1 can be maintained properly, whereby the improvement in the shape holding properties of the glass run 1 is realized. As a result, the glass run 1 is made difficult to collapse at the time of mounting, thereby making it possible to realize a remarkable improvement in workability, and the sliding position and abutment position of the door window glass G are stabilized when mounted, thereby making it possible to realize the improvement in sealing properties of the glass run 1.

Note that the invention is not limited to the contents of the embodiments described above but may be embodied as follows. Of course, other applications and modifications than those that will be described below are, of course, possible.

(a) While, in the embodiment, the invention is embodied in the glass run 1 that is mounted in the sash S provided on a side door, the invention may be embodied in a glass run that is mounted on the body side of the vehicle.

(b) The shapes and constructions (such as orientation) of the extension portions 16 and the like in the respective embodiments are not limited to those described in the respective embodiments, but other shapes and constructions may be adopted. For example, a bellows-like extension portion may be adopted.

(c) The positions where the extension portions 16 and the like are disposed in a direction traversing the interior and exterior of the vehicle are also not limited to the position inwards of the position to which the end face of the door window glass G is opposed, but the extension portions 16 and the like may be disposed outwards of the position, for example.

Note that in the respective embodiments, while the section Z defined from the position in the base portion 10 which intersects with the extension along the interior side of the door glass G to the position in the base portion 10 which intersects with the extension along the exterior side of the same glass is somehow fixed, in a case where the sliding position of the end face of the door window glass G is designed to shift in a direction traversing the interior and exterior of the vehicle while sliding, a maximum section defined from a position in the base portion 10 which is able to intersect with the interior side of the sliding door window glass G within a predetermined range to the position in the base portion 10 which intersects with the extension along the exterior side of the same glass constitutes a position to which the end face of the door window glass G is opposed.

(d) In the respective embodiments, the provision and omission of the engagement projections and/or locking portions at the abutment portions are matters of design, and it is possible to devise various combinations. For example, in the third embodiment, an engagement projection may be provided on one of the abutment portions 32c, 32d of both the base portion main bodies 32a, 32b, whereas an engagement recess with which the engagement projection is brought into engagement may be provided in the other base portion main body. Alternatively, engagement projections may be provided on both the abutment portions 32c, 32d, so that the two engagement projections are brought into engagement with each other in the thickness direction of the base portion 10. Furthermore, a locking portion may be provided on one of those that are brought into engagement with each other, whereas a locking portion with which the locking portion is made to interlock is provided on the other.

(e) In the embodiments, while the glass run 1 is formed from EPDM, the glass run 1 may be formed from other materials such as thermoplastic elastomer olefin (TPO) or soft polyvinyl chloride.

Fifth Embodiment

A fifth embodiment will be described below by reference to FIGS. 6A, 6B.

Figure 6A:
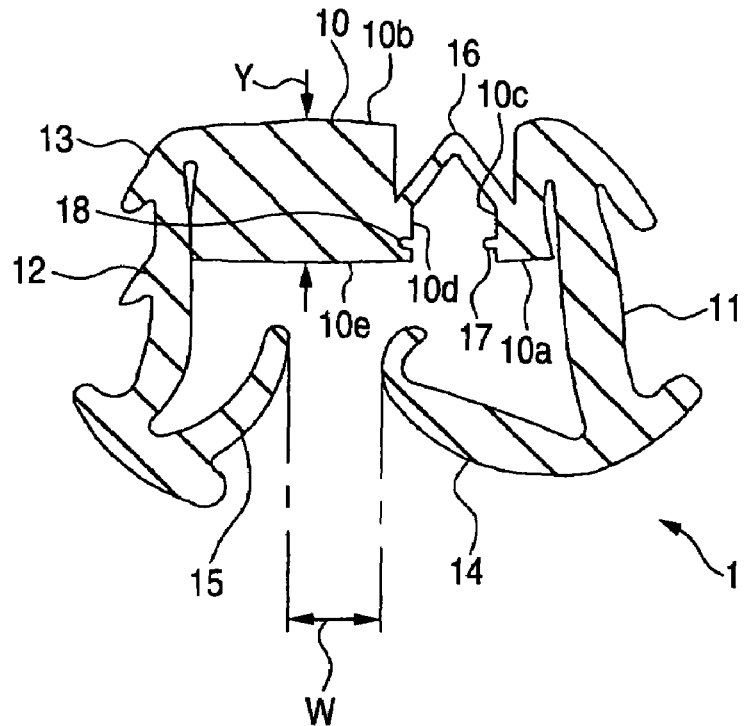
Figure 6B:
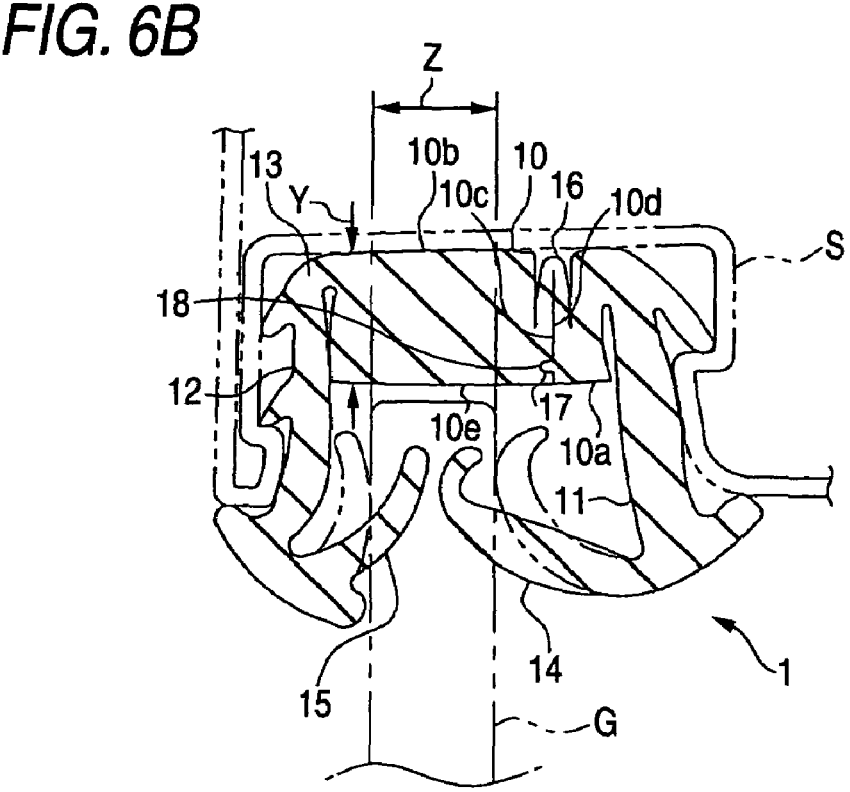

As shown in FIGS. 6A, 6B, the extruded portions 2 to 4 and the molded portions 5, 6 each have a main body portion 13 having substantially a U-shaped cross section which is adapted to be mounted in the sash S and is provided with a base portion 10, as well as an interior side wall portion 11 and an exterior side wall portion 12 which extend, respectively, from both ends of the base portion 10 and a pair of seal lips 14, 15 which extend, respectively, from distal ends of the interior side wall portion 11 and the exterior side wall portion 12 toward the inside of the main body portion 13 so as to be joined to a door window glass G to thereby effect a seal therebetween.

An extension portion 16 is formed in the base portion 10 so as to extend and contract in a direction traversing the interior and exterior of the vehicle. To be specific, the extension portion 16 is provided at a position in the base portion 10 which is made to deviate from a position on the base portion 10 to which an end face of the door window glass G is opposed and which constitutes a section Z defined by a position which intersects with an extension along an interior side of the door window glass G and a position which intersects with an extension along an exterior side of the door window glass G. In this embodiment, the extension portion 16 is provided inwards of the position facing the end face of the door window glass G as viewed in the direction traversing the interior and exterior of the vehicle (in a transverse direction as viewed in FIG. 6A) so as to be close to the vicinity of a portion where the interior side wall portion 11 is joined to the base portion 10.

The extension portion 16 is continuously joined to wall surfaces of two base portion main bodies 10a, 10b which faces each other across the extension portion 16 at end portions thereof and is formed in substantially an inverted V-shaped cross section which becomes concave toward the outside of a main body portion 13 when in an extended state. To be specific, the extension portion 16 is made thinner than the thickness Y of a base portion 10. The end portions of the extension portion 16 are continuously joined to the wall surfaces of the base portion main bodies 10a, 10b at substantially central portions on the wall surfaces as viewed in a thicknesswise direction of the base portion 10 (a vertical direction in FIG. 6A) and an end portion of the extension portion 16, which constitutes a bend portion and which is situated closer to an external side of the main body portion 13, is situated inwards of an external surface of the base portion 10. Consequently, the extension portion 16 is constructed so as to remain accommodated in an area defined within the thickness Y of the base portion 10 both when in the extended and contracted states without protruding from the interior and external sides of the main body portion 13.

In the construction, abutment portions 10c, 10d of both the base portion main bodies 10a, 10b, which are brought into abutment with each other when the extension portion 16 is contracted, are situated on a side of the base portion 10 which is closer to a surface 10e thereof which faces the end face of the door window glass G (the interior side of the main body portion 13) than the extension portion 16.

Most portions of the abutment portions 10c, 10d are formed into substantially planes which intersect with the surface 10e of the base portion main bodies 10a, 10b which faces the end face of the door window glass G at substantially right angles. Then, an engagement projection 17 is provided on the abutment portion 10c of the base portion main body 10a, which is situated inside the vehicle, so as to project toward the outside of the vehicle, whereas an engagement recess 18, into which the engagement projection 17 is inserted, is provided in the abutment portion 10d of the base portion main body 10b, which is situated outside the vehicle. Of course, the engagement projection 17 may be provided on the abutment portion 10d of the external base portion main body 10b, and the engagement recess 18 may be provided in the abutment portion 10c of the internal base portion main body 10a. In addition, in place of these constructions, the engagement projection 17 and the engagement recess 18 may be omitted, and almost the whole surfaces of both the abutment portions 10c, 10d are formed into substantially flat planes, so that the abutment portions are brought into a surface contact with each other when they are brought into abutment with each other.

As shown in FIG. 6A, the glass run 1 is molded in. such a state that both the extruded portions 2 to 4 and the molded portions 5, 6 are extended in a direction traversing the interior and exterior of the vehicle. Consequently, before the glass run 1 is mounted into a sash S, a predetermined opening W is secured between seal lips 14, 15 in such a state that while the main body portion 13 is maintaining substantially the U-shaped cross section which represents a non-opened-out state, the interior side wall portion 11 and the exterior side wall portion 12 are shifted apart in parallel to both sides by a dimension corresponding to the extension of the extension portion 16.

Then, when a glass run 1 so formed is mounted in a sash S, as shown in FIG. 6B, the extension portion 16 is contracted so that the interior side wall portion 11 and the exterior side wall portion 12 are shifted nearer to each other in parallel, and the abutment portions 10c, 10d of the base portion main bodies 10a, 10b are brought into abutment with each other while the engagement projection 17 is inserted into the engagement recess 18, so that the engagement projection 17 and the engagement recess 18 are brought into engagement with each other, whereby the movement of the base portion 10 is restricted in both directions along the thickness of the base portion 10, that is, in both directions toward the inside and outside of a main body portion 13. Furthermore, in this state, the surface 10e of the base portion 10 which faces the end face of the door window glass G constitutes a smooth level surface over the whole area thereof in such a state that the extension portion 16 is not exposed toward the surface 10e which faces the end face of the door window glass G (toward the inside of the main body portion 13). Then, with the main body portion 13 being made to maintain substantially the U-shape cross section thereof which represents its non-opened-out state, the glass run 1 is fitted into the sash S. Consequently, the extension portion 16 does not face the door window glass G in the state in which the glass run 1 is mounted in the sash S.

Thus, as has been described in detail, the glass run 1 is molded in such a state that the extension portion 16 is extended in a direction traversing the interior and exterior of the vehicle and that the main body portion 13 maintains substantially the U-shaped cross section representing the non-opened-out state and is then mounted in the sash S in such a state that the extension portion 16 is contracted in a direction traversing the interior and exterior of the vehicle and that the main body portion 13 maintains substantially the U-shaped cross section representing the non-opened-out state. Consequently, at the time of molding the glass run 1, the two seal lips 14, 15 are spaced apart from each other so as to secure the predetermined opening W therebetween, whereby when attempted to be applied, a predetermined lubricant can easily be applied to an inner circumferential surface of the base portion 10 and sliding surfaces of the seal lips 14, 15, thereby making it possible to reduce a risk that the two seal lips 14, 15 are joined together immediately after the molding. In addition, as to the molded portions 5, 6, a sufficient thickness can be imparted to a holding plate for holding a core in the mold unit. Furthermore, when working to mount the glass run 1 in the sash S, since there is no need to rotate the side wall portions 11, 12 of the molded portions 5, 6 from the opened-out position for contraction, there is no case where the angle, radius of curvature, circumferential length of the molded portions 5, 6 change between before and after the mounting. Consequently, it is possible to eliminate the drawback that the glass run 1 cannot be mounted in the sash S so as to follow the shape of the sash S. In addition, in designing glass runs, since there is no need to repeat tries and errors with a view to eliminating the aforesaid change in the structural factors of the molded portion which would otherwise occur, a reduction in the number of design man hours can be realized.

In addition, in the construction, with the extension portion 16 being contracted, since the surface 10e of the base portion 10 which faces the end face of the door window glass G constitutes substantially the smooth level surface, the risk is reduced that the door window glass G is, when sliding, brought into abutment with the extension portion 31, whereby the sliding position and abutment position of the door window glass G are made stable in an ensured fashion, thereby making it possible to realize the improvement in the sealing properties and durability of the glass run 1.

Additionally, since the extension portion 16 is provided at the position which is caused to deviate from the position on the base portion 10 to which the end face of the door window glass G is opposed, should the extension portion 16 elastically deform in an improper way to thereby protrude toward the inside of the main body portion 13, the risk is reduced that the door window glass G is brought into abutment with the extension portion 16.

Furthermore, due to the provision of the engagement projection 17 and the engagement recess 18, when in a contracted state, the extension portion 16 and hence the main body portion 13 can be maintained in proper shapes and the relative positional relation between a door window glass G and the respective portions of the glass run 1 can be maintained properly, whereby the improvement in the shape holding properties of the glass run 1 is realized. As a result, the flushness of the surface 10e of the base portion 10 which faces the end face of the door window glass G is maintained, thereby making it possible to ensure the aforesaid advantage. Moreover, the glass run 1 is made difficult to collapse at the time of mounting, thereby making it possible to realize a remarkable improvement in workability, and the sliding position and abutment position of the door window glass G are stabilized when mounted, thereby making it possible to realize the improvement in sealing properties of the glass run 1.

Sixth Embodiment

Next, a sixth embodiment will be described by reference to FIGS. 7A, 7B.

Figure 7A:
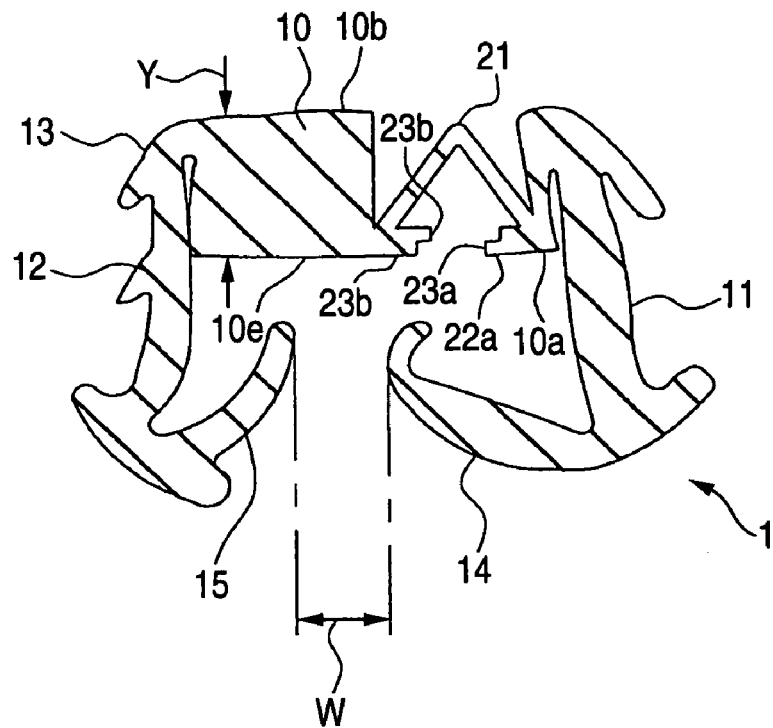
FIG. 7A is a sectional view showing a glass run according to a sixth embodiment, which is in a state resulting before mounting
Figure 7B:
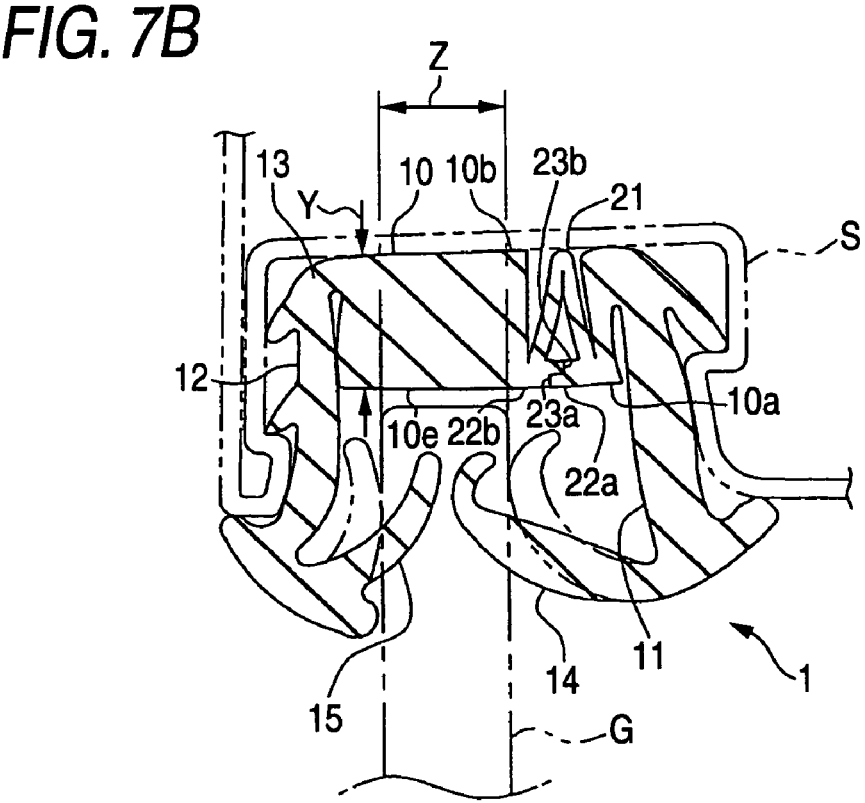
FIG. 7B is a sectional view of the glass run, which is in a state resulting after mounting.

As shown in FIGS. 7A, 7B, an extension portion 21 is formed in a base portion 10 at a position situated inwards of a position on the base portion 10 to which an end face of a door window glass G is opposed so as to extend and contract in a direction traversing the interior and exterior of the vehicle.

In addition, protruding portions 22a, 22b are provided, respectively, on wall surfaces of base portion main bodies 10a, 10b which face each other across the extension portion 21 so as to protrude along a surface 10e which faces the end face of the door window glass G, respectively, toward the facing base portion main bodies (the base portion main body 10a or the base portion main body 10b). Then, end portions of the extension portion 21 are continuously joined to the vicinities of root portions of the respective protruding portions 22a, 22b. Consequently, the protruding portions 22a, 22b protrude, respectively, outwards and inwards of the portions where the extension portion 21 is joined to the base portion main bodies 10a, 10b toward the corresponding base portion main bodies 10b, 10a, and distal end portions of both the protruding portions 22a, 22b constitute abutment portions at which both the base portion main bodies 10a, 10b are in abutment with each other when they are brought into abutment with each other. By adopting the construction, the abutment portions of both the base portion main bodies 10a, 10b, which are brought into abutment with each other when the extension portion 21 is in a contracted state, are situated closer to the surface 10e of the base portion 10 which faces the end face of the door window glass G (the inside of the main body portion 13) than the extension portion 21 as viewed in the thickness-wise direction of the base portion 10.

Furthermore, engagement projections 23a, 23b are provided, respectively, on the distal end portions of both the protruding portions 22a, 22b, and the engagement projections 23a, 23b are brought into engagement with each other in the thickness-wise direction of the base portion 10 when the extension portion 21 is contracted.

In addition, the extension portion 21 is formed in substantially an inverted V-shaped cross section which becomes concave toward the outside of the main body portion 13 when in an extended state and the thickness thereof is made thinner than the thickness Y of the base portion 10. Furthermore, an end portion of the extension portion 21, which constitutes a bend portion and which is situated closer to an external side of the main body portion 13, is situated inwards of an external surface of the base portion 10. Consequently, the extension portion 21 is constructed so as to remain accommodated in an area defined within the thickness Y of the base portion 10 both when in the extended and contracted states without protruding from the interior and external sides of the main body portion 13.

Then, when a glass run 1 so formed is mounted in a sash S, as shown in FIG. 7B, the extension portion 21 is contracted so that the interior side wall portion 11 and the exterior side wall portion 12 are shifted nearer to each other in parallel, and both the engagement projections 23a, 23b are brought into engagement with each other, whereby the movement of the base portion 10 is restricted in both directions along the thickness of the base portion 10, that is, in both directions toward the inside and outside of the main body portion 13. Furthermore, in this state, the surface 10e of the base portion 10 which faces the end face of the door window glass G constitutes a smooth level surface over the whole area thereof in such a state that the extension portion 21 is not exposed toward the side of the base portion 10 where the surface 10e is situated which faces the end face of the door window glass G (toward the inside of the main body portion 13). Then, with the main body portion 13 being made to maintain substantially the U-shape cross section thereof which represents its non-opened-out state, the glass run 1 is fitted into the sash S. Consequently, the extension portion 21 does not face the door window glass G in the state in which the glass run 1 is mounted in the sash S.

Consequently, a similar advantage to that of the first embodiment is provided. In addition, by adopting the construction, since the distal end portions of both the protruding portions 22a, 22b are brought into abutment with each other before the extension portion 21 has been completely contracted, a drawback can be suppressed that an extra load is applied to the extension portion 21 to thereby trigger an improper elastic deformation of the extension portion 21. As a result, the extension portion 21 and hence the main body portion 13 are maintained in proper shapes when the former is in an extended state.

Seventh Embodiment

Next, a seventh embodiment will be described by reference to FIGS. 8A, 8B.

Figure 8A:
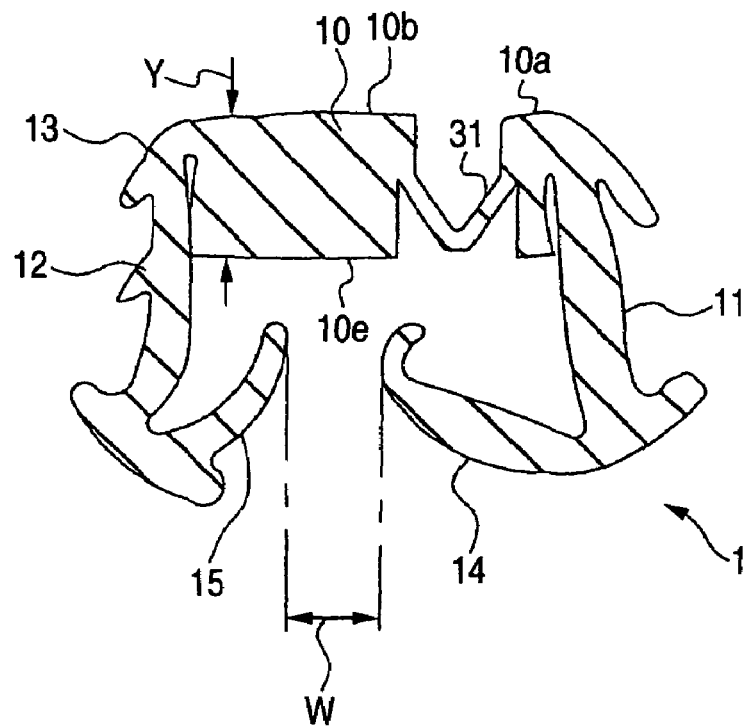
FIG. 8A is a sectional view showing a glass run according to a seventh embodiment, which is in a state resulting before mounting
Figure 8B:
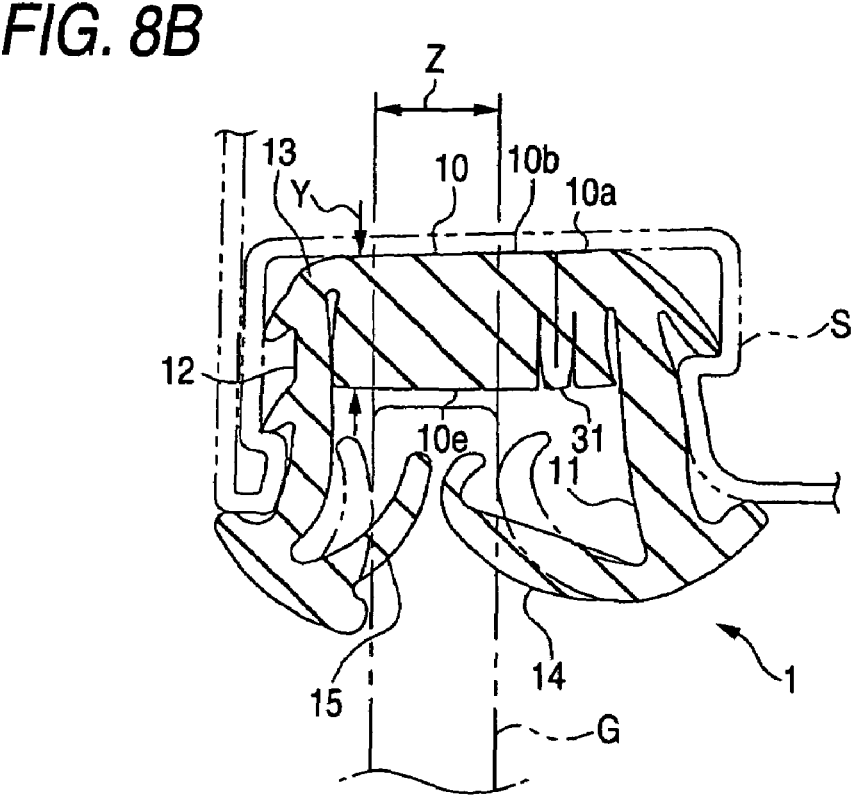
FIG. 8B is a sectional view of the glass run, which is in a state resulting after mounting.

As shown in FIGS. 8A, 8B, an extension portion 31 is formed in a base portion 10 so as to extend and contract in a direction traversing the interior and exterior of the vehicle.

The extension portion 31 is continuously joined to wall surfaces of base portion main bodies 10a, 10b which face each other across the extension portion 31 and is formed in substantially a V-shaped cross section which becomes concave toward the inside of a main body portion 13 when in an extended state. To be more specific, the thickness of the extension portion 31 is made thinner than the thickness Y of the base portion 10. End portions of the extension portion 31 are continuously joined to wall surfaces of the base portion main bodies 10a, 10b at substantially central portions as viewed in the thickness-wise direction of a base portion 10 (in a vertical direction as viewed in FIG. 8A), and a distal end portion of the extension portion 31, which constitutes a bend portion and which is situated closer to an interior side of the main body portion 13, is situated at substantially the same position as a surface 10e of the base portion 10 which faces an end face of a door window glass G as viewed in the thickness-wise direction of the base portion 10. Consequently, the extension portion 31 is constructed so as to remain accommodated in an area defined within the thickness Y of the base portion 10 both when in the extended and contracted states and to constitute part of the face 10e which faces the end face of the door window glass G when in the extended states without protruding toward the inside and outside of the main body portion 13.

Consequently, a similar advantage to that of the first embodiment is provided. In addition, by adopting the construction, even in the event that the extension portion 31 deforms elastically in an improper way, since the extension portion 31 is prevented from protruding toward the outside of the main body portion 13, a glass run so formed can be mounted in a sash S properly.

Eighth Embodiment

Next, an eighth embodiment will be described by reference to FIGS. 9A, 9B, 10A, 10B.

Figure 9A:
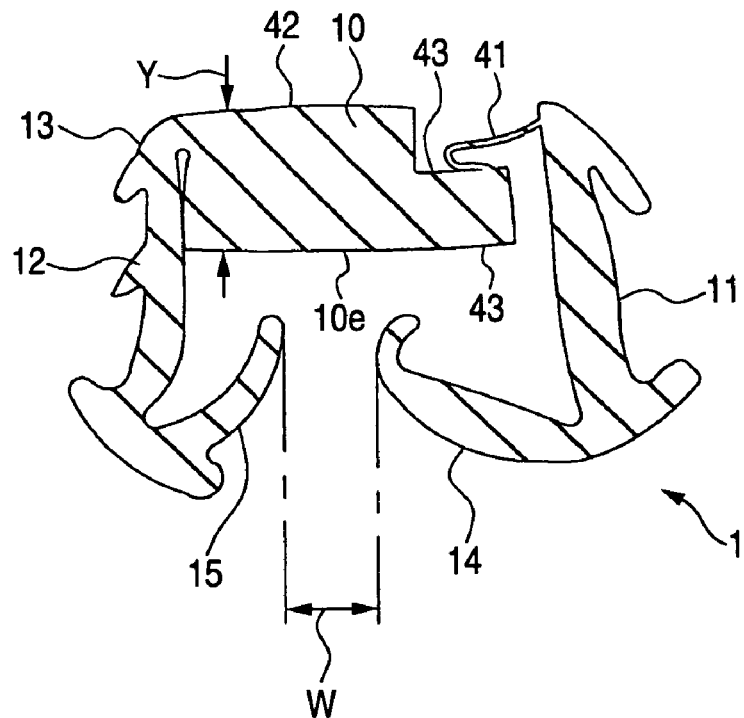
FIG. 9A is a sectional view showing a glass run according to an eighth embodiment, which is in a state resulting before mounting
Figure 9B:
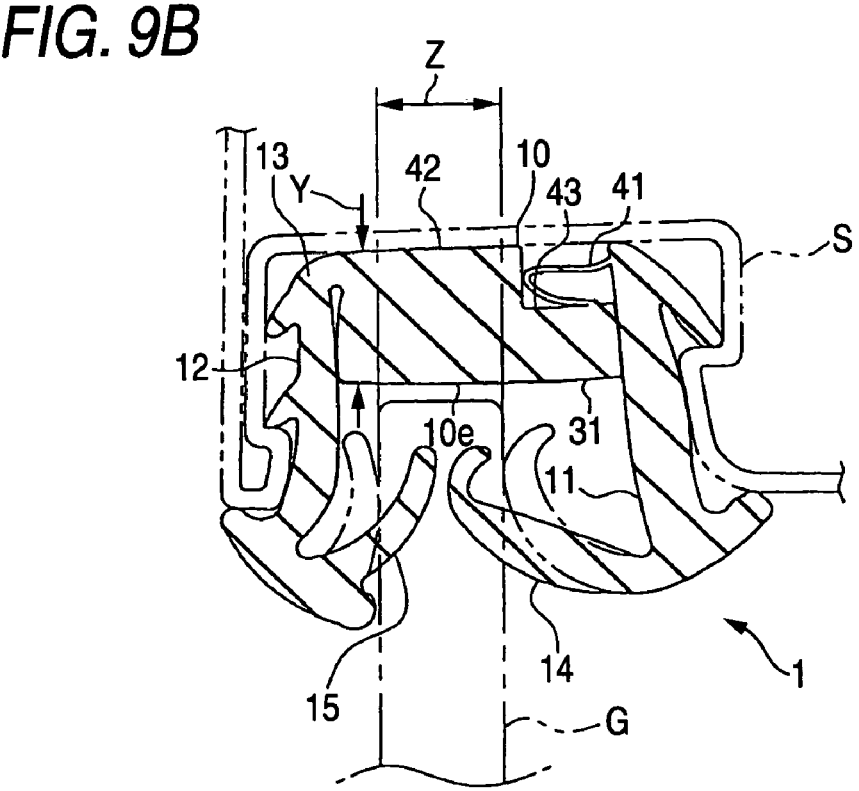
FIG. 9B is a sectional view of the glass run, which is in a state resulting after mounting.

As shown in FIGS. 9A, 9B, a glass run 1 includes a main body portion 13 having substantially a U-shaped cross section which is adapted to be mounted in a sash and which is provided with a base portion, as well as an interior side wall portion 11 and an exterior side wall portion 12 which intersect with the base portion 10 at substantially right angles and a pair of seal lips 14, 15 which extend, respectively, from distal ends of the interior side wall portion 11 and the exterior side wall portion 12 toward the inside of the main body portion 13 so as to be joined to a door window glass to thereby effect a seal therebetween.

In this embodiment, when molded, the interior side wall portion 11 and the base portion 10 are molded as being spaced apart from each other, and an extension portion 41 is provided which continuously joins the interior side wall portion 11 to the base portion 10 and which is able to extend and contract. Namely, when the extension portion 41 is in an extended state, the interior side wall portion 11 and the base portion 10 are space apart from each other, whereas when the extension portion 41 is in a contracted state, the interior side wall portion 11 and the base portion 10 are brought into abutment with each other, and the main body portion 13 is allowed to extend and contract toward at least the inside and outside of the main body portion 13.

The base portion 10 is provided with a base portion main body 42 which is situated inside the vehicle and a protruding portion 43 which protrudes from the base portion main body 42 toward the inside of the vehicle along a surface 10e which faces an end face of the door window glass G. The thickness of the protruding portion 43 is made thinner than the thickness Y of the base portion main body 42. Then, a distal end portion of the protruding portion 43 constitutes an abutment portion which functions when the distal end portion is brought into abutment with the interior side wall portion 11. In addition, the distal end portion of the protruding portion 43 is formed into substantially a flat plane which intersects with a surface 10e of the base portion 10 which faces the end face of the door window glass G at substantially right angles so as to be brought into surface contact with an internal wall surface of the interior side wall portion 11 when the relevant distal end portion comes into abutment with the interior side wall portion 11.

In addition, an end portion of the extension portion 41 is continuously joined to a surface of the protruding portion 43 which is opposite to the surface thereof which faces the end face of the door window glass G (an external surface of the main body portion 13). Note that a portion where the extension portion 41 is continuously joined to the interior side wall portion 11 is situated closer to the external side of the main body portion 13 than a portion on the interior side wall portion 11 where the distal end portion of the protruding portion 43 is brought into abutment. Namely, when the extension portion 41 is in the contracted state, the base portion 10 abuts with the interior side wall portion 11 at a portion thereof which is situated closer to the surface 10e which faces the end face of the door window glass G rather than a portion thereof where the extension portion 41 is provided, so that the exposure of the extension portion 41 toward the side of the base portion 10 where the surface 10e is situated which faces the end face of the door window glass G.

Then, when the glass run 1 so formed is mounted in the sash S, as shown in FIG. 9B, the extension portion 41 is contracted so that the interior side wall portion 11 and the exterior side wall portion 12 are shifted nearer to each other in parallel, and the distal end portion of the protruding portion 43 is brought into abutment with the interior side wall portion 11, whereby with the main body portion 13 being made to maintain substantially a U-shaped cross section thereof which represents its non-opened-out state, the surface 10e of the base portion 10 which faces the end face of the door window glass G constitutes a smooth level surface over the whole area thereof in such a state that the extension portion 41 is not exposed to the side of the base portion 10 where the surface 10e is situated which faces the end face of the door window glass G (toward the inside of the main body portion 13) Then, with this state 13 being maintained, the glass run 1 is fitted into the sash S. Consequently, the extension portion 41 does not face the door window glass G in the state in which the glass run 1 is mounted in the sash S.

Furthermore, when in the contracted state, the extension portion 41 is constructed so as to be folded double on the surface of the protruding portion 43 which is opposite to the side thereof where the surface 10e is situated which faces the end face of the door window glass G, as well as being accommodated within an area defined by the thickness Y of the base portion main body 42, whereby the extension portion 41 is prevented from being exposed to the outside of the main body portion 13, the glass run 1 being mounted in the sash S properly.

Consequently, a similar advantage to that of the first embodiment is provided. In addition, according to the construction, while the amount of protrusion of the extension portion 41 in the thickness-wise direction of the base portion 10 is suppressed, a relatively large extension amount of the extension portion 41 toward the inside or out side of the vehicle can be obtained when extended.

Note that the invention is not limited to the contents of the embodiments described above but may be embodied as follows. Of course, other applications and modifications than those that will be described below are, of course, possible.

(a) While, in the embodiment, the invention is embodied in the glass run 1 that is mounted in the sash S provided on a side door, the invention may be embodied in a glass run that is mounted on the body side of the vehicle.

(b) The shapes and constructions (such as orientation) of the extension portions 16 and the like in the respective embodiments are not limited to those described in the respective embodiments, but other shapes and constructions may be adopted. For example, a bellows-like extension portion may be adopted.

Figure 10A:
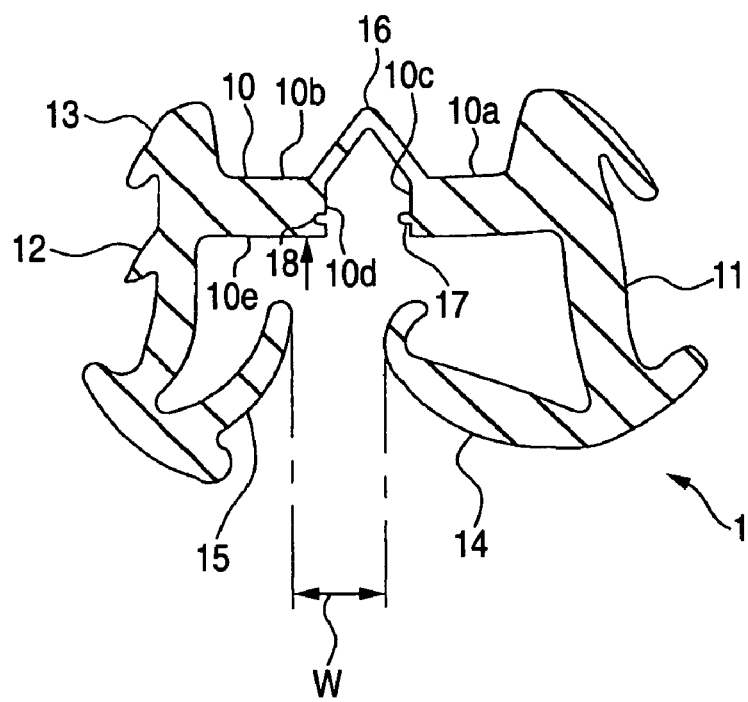
FIG. 10A is a sectional view showing a glass run according to the eighth embodiment, which is in a state resulting before mounting
Figure 10B:
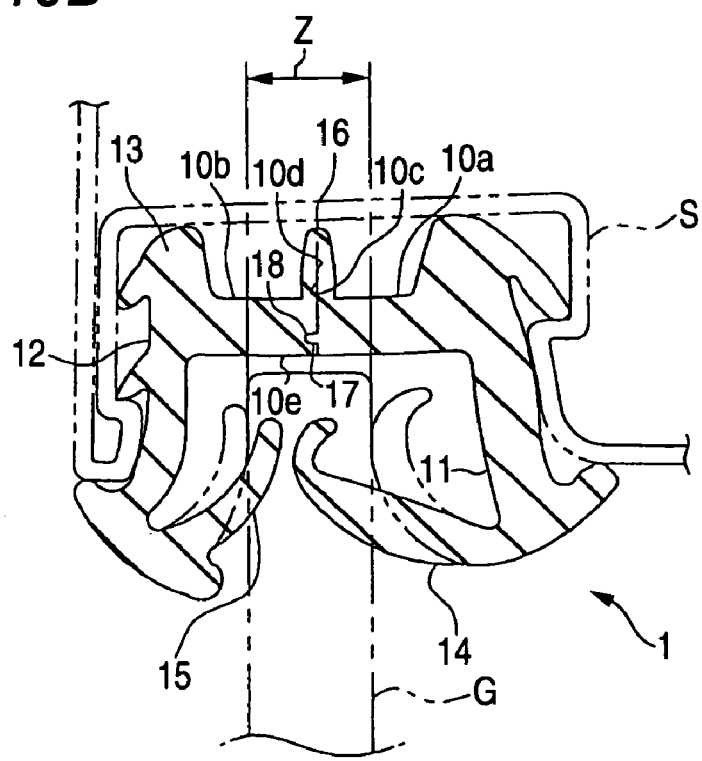
FIG. 10B is a sectional view of the glass run, which is in a state resulting after mounting.

(c) The positions where the extension portions 16 and the like are disposed in a direction traversing the interior and exterior of the vehicle are also not limited to the position inwards of the position which is opposed to the end face of the door window glass G, but the extension portions 16 and the like may be disposed anywhere, provided that the surface 10e becomes substantially flush which is opposed to the end face of the door window glass G, and the extension portions may be provided outwards of the vehicle or may be disposed so as to coincide with the position which is opposed to the end face of the door window glass G. For example, as shown in FIGS. 10A, 10B, the extension portion 16 may be provided at substantially a central portion of the base portion 10 as viewed in a transverse direction of the base portion 10 or a position of the base portion 10 which is opposed to the position (a section Z) thereof to which the end face of the door window glass G is opposed. In this case, too, when in the contracted state, the extension portion 16 is not exposed to the side of the base portion 10 where the surface 10e is situated which faces the end face of the door window glass G (toward the inside of the main body portion 13), and the surface 10e of the base portion 10 which faces the end face of the door window glass G constitutes a smooth level surface over the whole area thereof. Consequently, even in the event that the extension portion 16 is provided at the position which is opposed to the position (the Z section) of the base portion 10 to which the end face of the door window glass G is opposed, the aforesaid various drawbacks are suppressed. In addition, in the glass run 1 shown in FIGS. 10A, 10B, since the portions where the base portion 10 is joined to the side wall portions 11, 12 are formed into a shape in which the base portion 10 and the side wall portions 11, 12 intersect with each other at substantially right angles, the relative positional relation between the base portion 10 and the side wall portions 11, 12 can be maintained more properly, thereby making it possible to realize a further improvement in the shape holding properties of the glass run 1. In addition, since the extension portion 16 is constructed so as not to protrude from the end portions of the interior side wall portion 11 and the exterior side wall portion 12 toward the outside of the vehicle (not to protrude from the main body portion 13 toward the outside of the vehicle) when both extended and contracted, the glass run 1 can be mounted in the sash S properly.

(d) In the respective embodiments, the provision and omission of the engagement projections and/or locking portions at the abutment portions are matters of design, and it is possible to devise various combinations.

(e) In the eighth embodiment, the construction is not limited to the exterior side wall portion 11 but may be applied to the exterior side wall portion 12 in which the side wall portion 11 is continuously joined to the extension portion and is spaded apart from the base portion 10.

(f) In the embodiments, while the glass run 1 is formed from EPDM, the glass run 1 may be formed from other materials such as thermoplastic elastomer olefin (TPO) or soft polyvinyl chloride.

Ninth Embodiment

A ninth embodiment will be described by reference to FIGS. 11A, 11B.

Figure 11A:
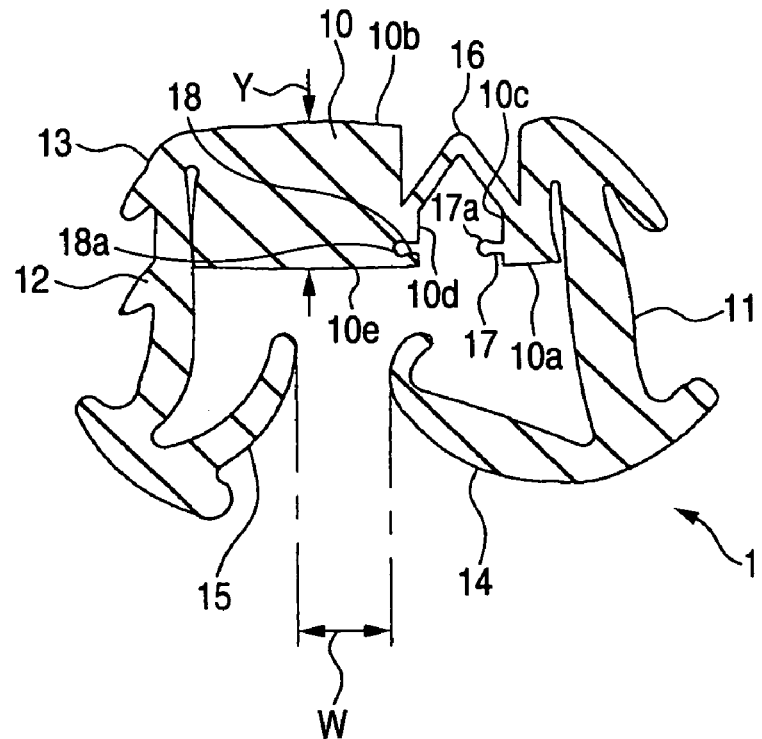
Figure 11B:
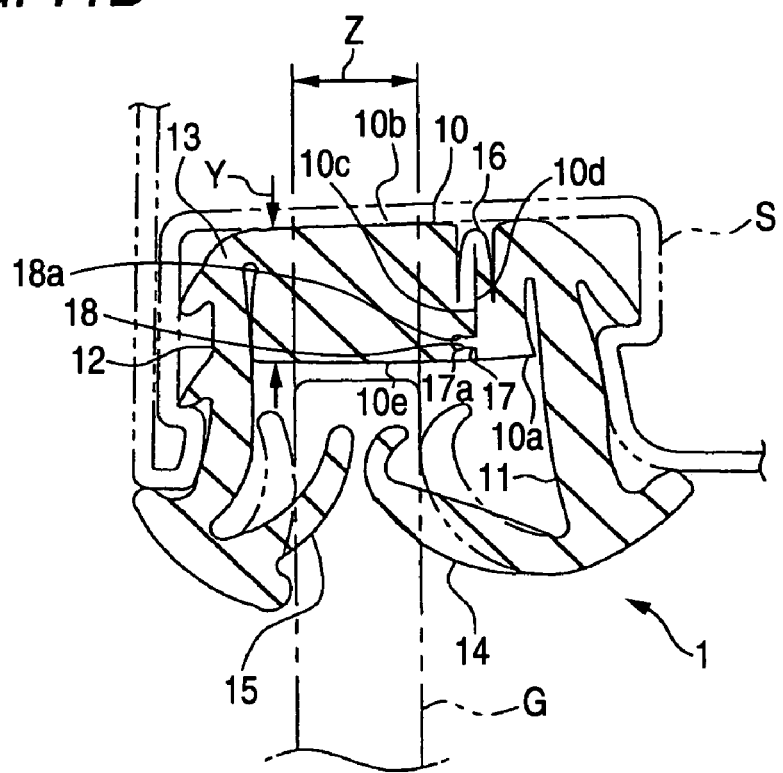

As shown in FIGS. 11A, 11B, the extruded portions 2 to 4 and the molded portions 5, 6 each have a main body portion 13 having substantially a U-shaped cross section which is adapted to be mounted in the sash S and is provided with a base portion 10, as well as an interior side wall portion 11 and an exterior side wall portion 12 which extend, respectively, from both ends of the base portion 10 and a pair of seal lips 14, 15 which extend, respectively, from distal ends of the interior side wall portion 11 and the exterior side wall portion 12 toward the inside of the main body portion 13 so as to be joined to a door window glass G to thereby effect a seal therebetween.

An extension portion 16 is formed in the base portion 10 so as to extend and contract in a direction traversing the interior and exterior of the vehicle. To be specific, the extension portion 16 is provided at a position in the base portion 10 which is made to deviate from a position on the base portion 10 to which an end face of the door window glass G is opposed and which constitutes a section Z defined by a position which intersects with an extension along an interior side of the door window glass G and a position which intersects with an extension along an exterior side of the door window glass G. In this embodiment, the extension portion 16 is provided inwards of the position facing the end face of the door window glass G as viewed in the direction traversing the interior and exterior of the vehicle (in a transverse direction as viewed in FIG. 11A) so as to be close to the vicinity of a portion where the interior side wall portion 11 is joined to the base portion 10.

The extension portion 16 is continuously joined to wall surfaces of two base portion main bodies 10a, 10b which faces each other across the extension portion 16 at end portions thereof and is formed in substantially an inverted V-shaped cross section which becomes concave toward the outside of a main body portion 13 when in an extended state. To be specific, the extension portion 16 is made thinner than the thickness Y of a base portion 10. The end portions of the extension portion 16 are continuously joined to the wall surfaces of the base portion main bodies 10a, 10b at substantially central portions on the wall surfaces as viewed in a thicknesswise direction of the base portion 10 (a vertical direction in FIG. 11A) and an end portion of the extension portion 16, which constitutes a bend portion and which is situated closer to an external side of the main body portion 13, is situated inwards of an external surface of the base portion 10. Consequently, the extension portion 16 is constructed so as to remain accommodated in an area defined within the thickness Y of the base portion 10 both when in the extended and contracted states without protruding from the interior and external sides of the main body portion 13.

In the construction, abutment portions 10c, 10d of both the base portion main bodies 10a, 10b, which are brought into abutment with each other when the extension portion 16 is contracted, are situated on a side of the base portion 10 which is closer to a surface 10e thereof which faces the end face of the door window glass G (the interior side of the main body portion 13) than the extension portion 16.

Most portions of the abutment portions 10c, 10d are formed into substantially planes which intersect with the surface 10e of the base portion main bodies 10a, 10b which faces the end face of the door window glass G at substantially right angles. Then, an engagement projection 17 is provided on the abutment portion 10c of the base portion main body 10a, which is situated inside the vehicle, so as to project toward the outside of the vehicle, whereas an engagement recess 18, into which the engagement projection 17 is inserted, is provided in the abutment portion 10d of the base portion main body 10b, which is situated outside the vehicle. Furthermore, a locking projection 17a is formed at a distal end portion of the engagement projection 17 as a locking portion, and a locking recess 18a is formed at a deeper portion in the engagement recess 18 as a locking portion in which the locking projection 17a is locked. Of course, the engagement projection 17 may be provided on the abutment portion 10d of the external base portion main body 10b, and the engagement recess 18 may be provided in the abutment portion 10c of the internal base portion main body 10a. In addition, in place of these constructions, the engagement projection 17 and the engagement recess 18 may be omitted.

As shown in FIG. 11A, the glass run 1 is molded in such a state that both the extruded portions 2 to 4 and the molded portions 5, 6 are extended in a direction traversing the interior and exterior of the vehicle Consequently, before the glass run 1 is mounted into a sash S, a predetermined opening W is secured between seal lips 14, 15 in such a state that while the main body portion 13 is maintaining substantially the U-shaped cross section which represents a non-opened-out state, the interior side wall portion 11 and the exterior side wall portion 12 are shifted apart in parallel to both sides by a dimension corresponding to the extension of the extension portion 16.

In addition, when a glass run 1 so formed is mounted in a sash S, as shown in FIG. 11B, the extension portion 16 is contracted so that the interior side wall portion 11 and the exterior side wall portion 12 are shifted nearer to each other in parallel, and the abutment portions 10c, 10d of the base portion main bodies 10a, 10b are brought into abutment with each other while the engagement projection 17 is inserted into the engagement recess 18, so that the engagement projection 17 and the engagement recess 18 are brought into engagement with each other, whereby the movement of the base portion 10 is restricted in both directions along the thickness of the base portion 10, that is, in both directions toward the inside and outside of a main body portion 13. Furthermore, since the locking projection 17a is locked in the locking recess 18a, whereby the dislocation of the engagement projection 17 from the engagement recess 18 is prevented, the movement of the interior side wall portion 11 and the exterior side wall portion 12 in a direction in which the side wall portions are separated apart from each other is restricted. Then, in this state, the surface 10e of the base portion 10 which faces the end face of the door window glass G constitutes a smooth level surface over the whole area thereof in such a state that the extension portion 16 is not exposed toward the surface 10e which faces the end face of the door window glass G (toward the inside of the main body portion 13). Then, with the main body portion 13 being made to maintain substantially the U-shape cross section thereof which represents its non-opened-out state, the glass run 1 is fitted into the sash S. Consequently, the extension portion 16 does not face the door window glass G in the state in which the glass run 1 is mounted in the sash S.

Thus, as has been described in detail, the glass run 1 is molded in such a state that the extension portion 16 is extended in a direction traversing the interior and exterior of the vehicle and that the main body portion 13 maintains substantially the U-shaped cross section representing the non-opened-out state and is then mounted in the sash S in such a state that the extension portion 16 is contracted in a direction traversing the interior and exterior of the vehicle and that the main body portion 13 maintains substantially the U-shaped cross section representing the non-opened-out state. Consequently, at the time of molding the glass run 1, the two seal lips 14, 15 are spaced apart from each other so as to secure the predetermined opening W therebetween, whereby when attempted to be applied, a predetermined lubricant can easily be applied to an inner circumferential surface of the base portion 10 and sliding surfaces of the seal lips 14, 15, thereby making it possible to reduce a risk that the two seal lips 14, 15 are joined together immediately after the molding. In addition, as to the molded portions 5, 6, a sufficient thickness can be imparted to a holding plate for holding a core in the mold unit. Furthermore, when working to mount the glass run 1 in the sash S, since there is no need to rotate the side wall portions 11, 12 of the molded portions 5, 6 from the opened-out position for contraction, there is no case where the angle, radius of curvature, circumferential length of the molded portions 5, 6 change between before and after the mounting. Consequently, it is possible to eliminate the drawback that the glass run 1 cannot be mounted in the sash S so as to follow the shape of the sash S. In addition, in designing glass runs, since there is no need to repeat tries and errors with a view to eliminating the aforesaid change in the structural factors of the molded portion which would otherwise occur, a reduction in the number of design man hours can be realized.

Furthermore, the engagement projection 17 and the engagement recess 18 are provided, and, furthermore, the dislocation of the engagement projection 17 from the engagement recess 18 is prevented by the locking projection 17a and the locking recess 18a. By adopting this construction, when in a contracted state, the extension portion 16 and hence the main body portion 13 can be maintained in proper shapes and the relative positional relation between a door window glass G and the respective portions of the glass run 1 can be maintained properly, whereby the improvement in the shape holding properties of the glass run 1 is realized. As a result, the glass run 1 is made difficult to collapse at the time of mounting, thereby making it possible to realize a remarkable improvement in workability, and when mounted, a risk is reduced that the sliding door window glass G is brought into abutment with the extension portion 16, whereby the sliding position and abutment position of the end face of the door window glass G are stabilized, thereby making it possible to realize the improvement in sealing properties of the glass run 1. Furthermore, the flushness of the surface 10e of the base portion 10a which faces the end face of the door window glass G is ensured.

Tenth Embodiment

Next, a tenth embodiment will be described by reference to FIGS. 12A and 12B. However, omitting the detailed description of constituent portions similar to those of the first embodiment, only an extension portion, which constitutes a specific feature of the second embodiment, and portions associated therewith will be described.

Figure 12A:
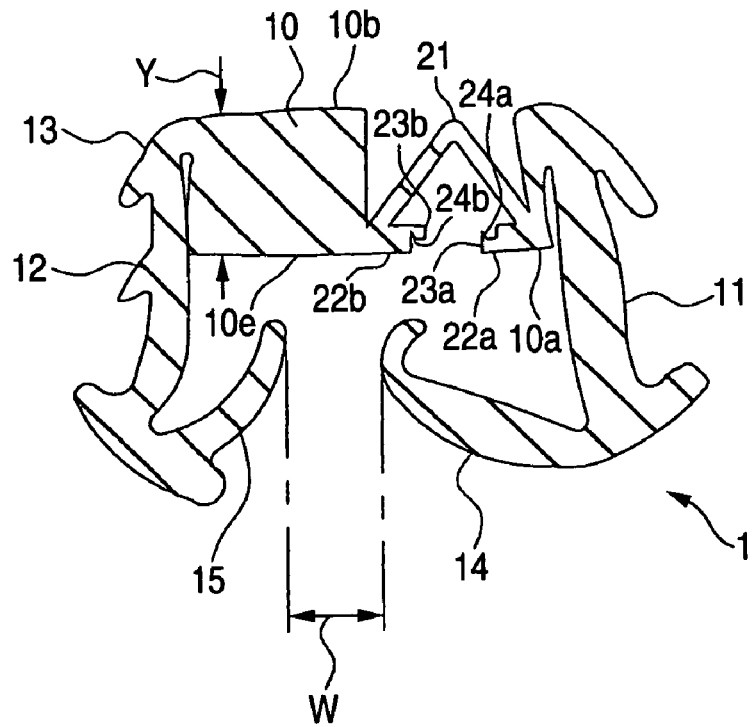
FIG. 12A is a sectional view showing a glass run according to a tenth embodiment, which is in a state resulting before mounting
Figure 12B:
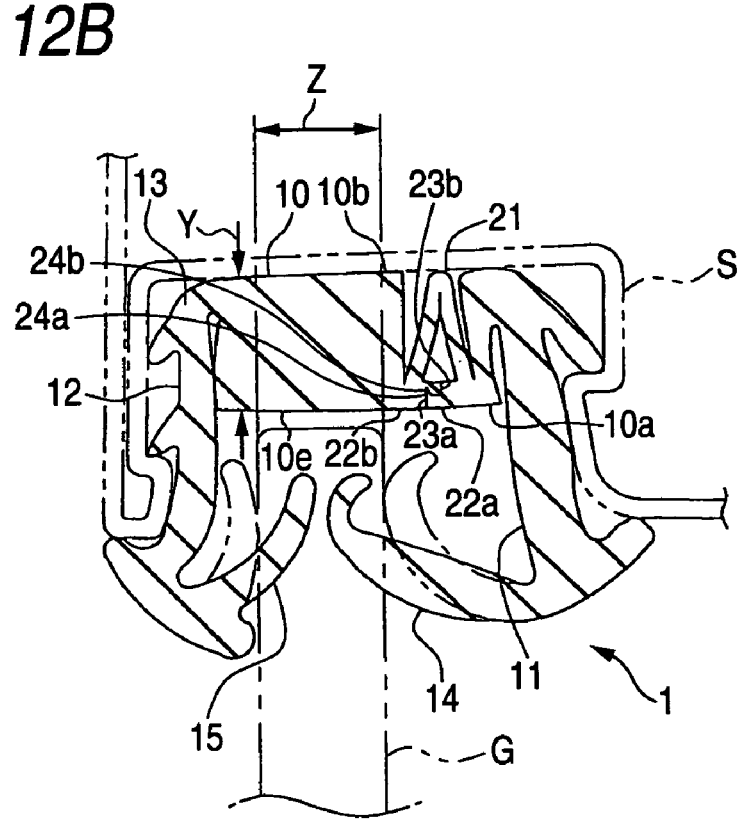
FIG. 12B is a sectional view of the glass run, which is in a state resulting after mounting.

As shown in FIGS. 12A, 12B, an extension portion 21 is formed in a base portion 10 at a position inwards of a position to which an end face of a door window glass G is opposed so as to extend and contract in a direction traversing the interior and exterior of the vehicle.

In addition, protruding portions 22a, 22b are provided, respectively, on wall surfaces of base portion main bodies 10a, 10b which face each other across the extension portion 21 so as to protrude along a surface 10e which faces the end face of the door window glass G, respectively, toward the facing base portion main bodies (the base portion main body 10a or the base portion main body 10b). Then, end portions of the extension portion 21 are continuously joined to the vicinities of root portions of the respective protruding portions 22a, 22b. Consequently, the protruding portions 22a, 22b protrude, respectively, outwards and inwards of the portions where the extension portion 21 is joined to the base portion main bodies 10a, 10b toward the corresponding base portion main bodies 10b, 10a, and distal end portions of both the protruding portions 22a, 22b constitute abutment portions at which both the base portion main bodies 10a, 10b are in abutment with each other when they are brought into abutment with each other. By adopting the construction, the abutment portions of both the base portion main bodies 10a, 10b which results when the extension portion 21 is in a contracted state are situated closer to the surface 10e of the base portion 10 which faces the end face of the door window glass G (the inside of the main body portion 13) than the extension portion 21 as viewed in the thickness-wise direction of the base portion 10.

Engagement projections 23a, 23b are provided, respectively, on the distal end portions of both the protruding portions 22a, 22b, and the engagement projections 23a, 23b are brought into engagement with each other in the thickness-wise direction of the base portion 10 when the extension portion 21 is contracted.

Furthermore, a locking projection 24a, which functions as a locking portion, is formed on a surface of the engagement projection 23a which faces the outside of a main body portion 13, and a locking recess 24b, which functions as a locking portion in which the locking projection 24a is locked, is formed in a surface of the engagement projection 23b which faces the inside of the main body portion 13. In addition, in place of this construction, a construction may be adopted in which the locking projection 24a and the locking recess 24b are omitted.

In addition, the extension portion 21 is formed in substantially an inverted V-shaped cross section which becomes concave toward the outside of the main body portion 13 when in an extended state and the thickness thereof is made thinner than the thickness Y of the base portion 10. Furthermore, an end portion of the extension portion 21, which constitutes a bend portion and which is situated closer to an external side of the main body portion 13, is situated inwards of an external surface of the base portion 10. Consequently, the extension portion 21 is constructed so as to remain accommodated in an area defined within the thickness Y of the base portion 10 both when in the extended and contracted states without protruding from the interior and exterior sides of the main body portion 13.

In addition, when a glass run 1 so formed is mounted in a sash S, as shown in FIG. 12B, the extension portion 21 is contracted so that an interior side wall portion 11 and an exterior side wall portion 12 are shifted nearer to each other in parallel, and both the engagement projections 23a, 23b are brought into engagement with each other, whereby the movement of the base portion 10 is restricted in both directions along the thickness of the base portion 10, that is, in both directions toward the inside and outside of the main body portion 13. Furthermore, since the locking projection 24a is locked in the locking recess 24b, the movement of the interior side wall portion 11 and the exterior side wall portion 12 in a direction in which the side wall portions are separated apart from each other is restricted. In addition, in this state, the surface 10e of the base portion 10 which faces the end face of the door window glass G constitutes a smooth level surface over the whole area thereof in such a state that the extension portion 21 is not exposed toward the side of the base portion 10 where the surface 10e is situated which faces the end face of the door window glass G (toward the inside of the main body portion 13). Then, with the main body portion 13 being made to maintain substantially the U-shape cross section thereof which represents its non-opened-out state, the glass run 1 is fitted into the sash S. Consequently, the extension portion 21 does not face the door window glass G in the state in which the glass run 1 is mounted in the sash S.

Consequently, a similar advantage to that of the ninth embodiment is provided. In addition, by adopting the construction, since the distal end portions (the engagement projections 23a, 23b) of both the protruding portions 22a, 22b are brought into abutment with each other before the extension portion 21 has been completely contracted, a drawback can be suppressed that an extra load is applied to the extension portion 21 to thereby trigger an improper elastic deformation of the extension portion 21. As a result, the extension portion 21 and hence the main body portion 13 are maintained in proper shapes when the former is in an extended state.

Eleventh Embodiment

Next, an eleventh embodiment of the invention will be described by reference to FIGS. 13A, 13B.

Figure 13A:
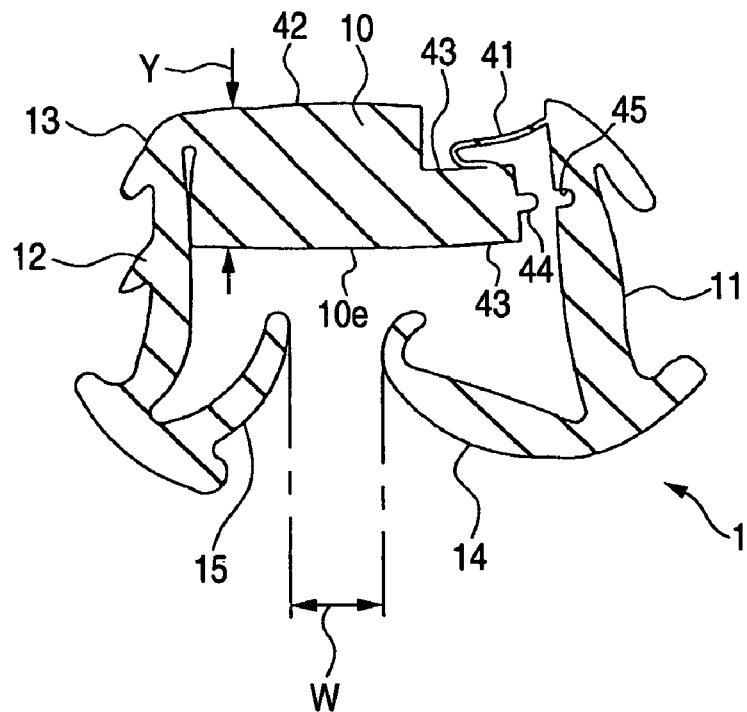
FIG. 13A is a sectional view showing a glass run according to an eleventh embodiment, which is in a state resulting before mounting
Figure 13B:
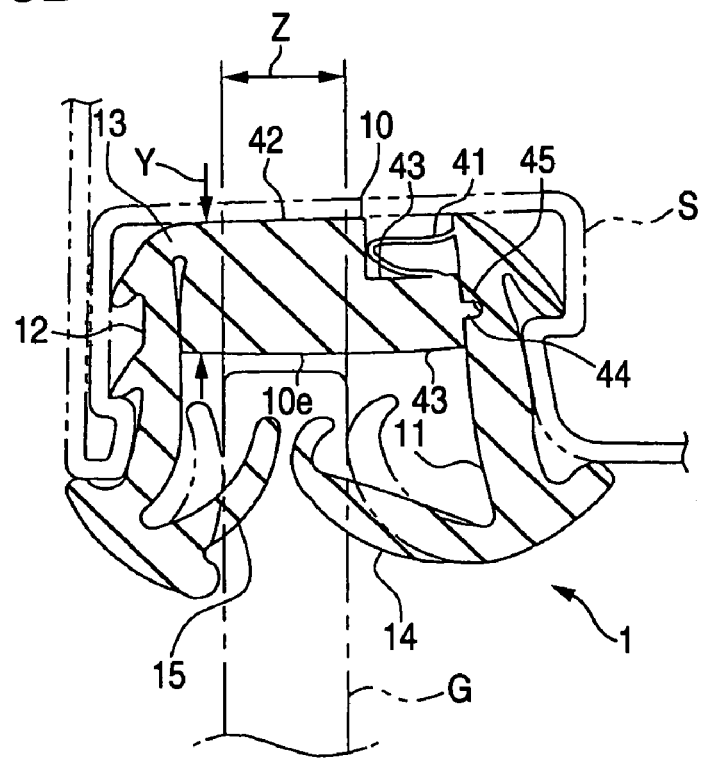
FIG. 13B is a sectional view of the glass run, which is in a state resulting after mounting.

As shown in FIGS. 13A, 13B, a glass run 1 includes a main body portion 13 having substantially a U-shaped cross section which is adapted to be mounted in a sash and which is provided with a base portion, as well as an interior side wall portion 11 and an exterior side wall portion 12 which intersect with the base portion 10 at substantially right angles and a pair of seal lips 14, 15 which extend, respectively, from distal ends of the interior side wall portion 11 and the exterior side wall portion 12 toward the inside of the main body portion 13 so as to be joined to a door window glass to thereby effect a seal therebetween.

In this embodiment, when molded, the interior side wall portion 11 and the base portion 10 are molded as being spaced apart from each other, and an extension portion 41 is provided which continuously joins the interior side wall portion 11 to the base portion 10 and which is able to extend and contract. Then, when the extension portion 41 is in an extended state, the interior side wall portion 11 and the base portion 10 are space apart from each other, whereas when the extension portion 41 is in a contracted state, the interior side wall portion 11 and the base portion 10 are brought into abutment with each other, and the main body portion 13 is allowed to extend and contract toward at least the inside and outside of the main body portion 13.

The base portion 10 is provided with a base portion main body 42 which is situated inside the vehicle and a protruding portion 43 which protrudes from the base portion main body 42 toward the inside of the vehicle along a surface 10e which faces an end face of the door window glass G. The thickness of the protruding portion 43 is made thinner than the thickness Y of the base portion main body 42. Then, a distal end portion of the protruding portion 43 constitutes an abutment portion that is to be brought into abutment with the interior side wall portion 11. In addition, most of the distal end portion of the protruding portion 43 is formed into substantially a flat plane which intersects with a surface 10e of the base portion 10 which faces the end face of the door window glass G at substantially right angles so as to be brought into surface contact with an internal wall surface of the interior side wall portion 11 when the relevant distal end portion comes into abutment with the interior side wall portion 11.

Furthermore, an engagement projection 44 is provided on the distal end portion of the protruding portion 43 so as to project toward the inside of the vehicle, and an engagement recess 45 in which the engagement projection 44 is inserted is provided in an abutment portion of the interior side wall portion 11. Of course, the engagement projection 44 may be provided on the abutment portion of the interior side wall portion 11, and the engagement recess 45 may be provided in the distal end portion of the protruding portion 43. In addition, on top of these constructions, a construction may be adopted in which a locking projection, which functions as a locking portion, may be formed on a distal end portion of the engagement projection 44, and a locking recess, which functions as a locking portion in which the locking projection is locked, may be formed in a deeper portion of the engagement recess 44.

In addition, an end portion of the extension portion 41 is continuously joined to a surface of the protruding portion 43 which is opposite to the surface thereof which faces the end face of the door window glass G (an external surface of the main body portion 13). Note that a portion where the extension portion 41 is continuously joined to the interior side wall portion 11 is situated closer to the external side of the main body portion 13 than a portion on the interior side wall portion 11 where the distal end portion of the protruding portion 43 is brought into abutment. Namely, when the extension portion 41 is in the contracted state, the base portion 10 abuts with the interior side wall portion 11 at a portion thereof which is situated closer to the surface 10e which faces the end face of the door window glass G rather than a portion thereof where the extension portion 41 is provided, so that the exposure of the extension portion 41 toward the side of the base portion 10 where the surface 10e is situated which faces the end face of the door window glass G.

Then, when a glass run 1 so formed is mounted in a sash S, as shown in FIG. 13B, the extension portion 41 is contracted so that the interior side wall portion 11 and the exterior side wall portion 12 are shifted nearer to each other in parallel, and the base portion 10 is brought into abutment with the interior side wall portion 11 while the engagement projection 44 is inserted into the engagement recess 45, so that the engagement projection 44 and the engagement recess 45 are brought into engagement with each other, whereby the movement of the base portion 10 is restricted in both directions along the thickness of the base portion 10, that is, in both directions toward the inside and outside of a main body portion 13. Then, in this state, the surface 10e of the base portion 10 which faces the end face of the door window glass G constitutes a smooth level surface over the whole area thereof in such a state that the extension portion 41 is not exposed toward the surface 10e which faces the end face of the door window glass G (toward the inside of the main body portion 13). Then, with the main body portion 13 being made to maintain substantially the U-shape cross section thereof which represents its non-opened-out state, the glass run 1 is fitted into the sash S. Consequently, the extension portion 41 does not face the door window glass G in the state in which the glass run 1 is mounted in the sash S.

Furthermore, when in the contracted state, the extension portion 41 is constructed so as to be folded double on the surface of the protruding portion 43 which is opposite to the side thereof where the surface 10e is situated which faces the end face of the door window glass G, as well as being accommodated within an area defined by the thickness Y of the base portion main body 42, whereby the extension portion 41 is prevented from being exposed to the outside of the main body portion 13, the glass run 1 being mounted in the sash S properly.

Consequently, a similar advantage to that of the first embodiment is provided. In addition, according to the construction, while the amount of protrusion of the extension portion 41 in the thickness-wise direction of the base portion 10 is suppressed, a relatively large extension amount of the extension portion 41 toward the inside or out side of the vehicle can be obtained when extended.

Twelfth Embodiment

Next, a twelfth embodiment of the invention will be described by reference to FIGS. 14A, 14B.

Figure 14A:
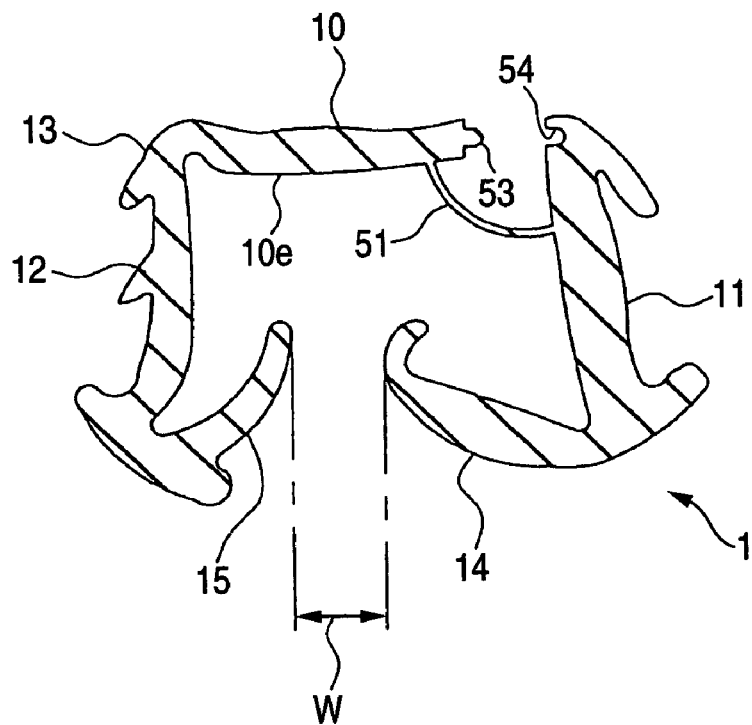
FIG. 14A is a sectional view showing a glass run according to a twelfth embodiment, which is in a state resulting before mounting
Figure 14B:
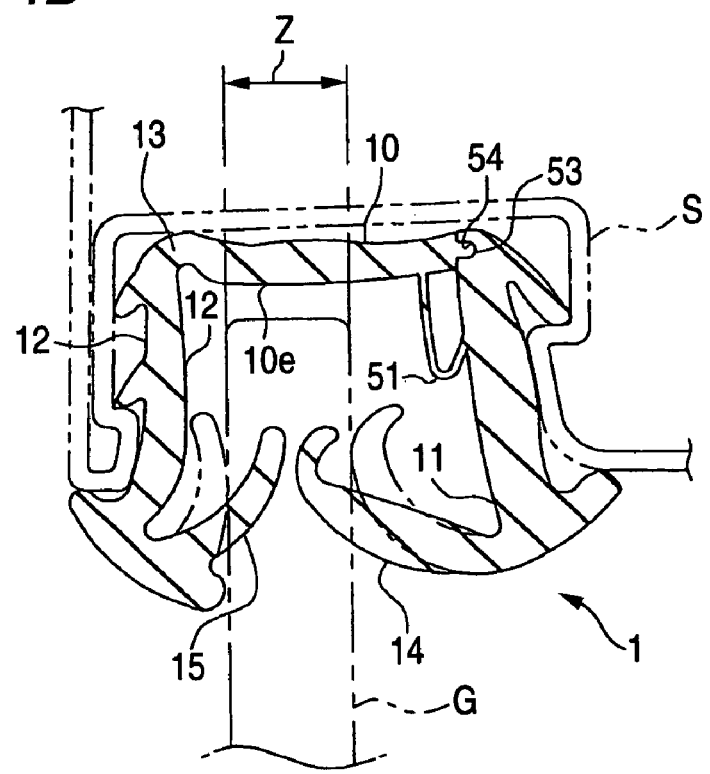
FIG. 14B is a sectional view of the glass run, which is in a state resulting after mounting.

As shown in FIGS. 14A, 14B, a glass run 1 includes a main body portion 13 having substantially a U-shaped cross section which is adapted to be mounted in a sash and which is provided with a base portion, as well as an interior side wall portion 11 and an exterior side wall portion 12 which intersect with the base portion 10 at substantially right angles and a pair of seal lips 14, 15 which extend, respectively, from distal ends of the interior side wall portion 11 and the exterior side wall portion 12 toward the inside of the main body portion 13 so as to be joined to a door window glass to thereby effect a seal therebetween.

In this embodiment, when molded, the interior side wall portion 11 and the base portion 10 are molded as being spaced apart from each other, and an extension portion 51 is provided which continuously joins the interior side wall portion 11 to the base portion 10 and which is able to extend and contract. Then, when the extension portion 51 is in an extended state, the interior side wall portion 11 and the base portion 10 are space apart from each other, whereas when the extension portion 51 is in a contracted state, the interior side wall portion 11 and the base portion 10 are brought into abutment with each other, and the main body portion 13 is allowed to extend and contract toward at least the inside and outside of the main body portion 13.

In addition, the extension portion 51 is made thinner than the thickness of the base portion 10, and an end portion thereof is continuously joined to a surface 10e of the base portion 10 which faces an end face of a door window glass G, whereas the other end portion thereof is continuously joined to an inner wall surface of the interior side wall portion 11. Consequently, the extension portion 51 is provided at a position which deviates from a position of the base portion 10 which corresponds to a section Z defined as extending from a position which intersects with an extension along an interior side of the door window glass G to a position which intersects with an extension along an exterior side of the door window glass G and to which the end face of the door window glass G is opposed. In this embodiment, the extension portion 51 is provided inwards of the position to which the end face of the door window glass G is opposed as viewed in a direction traversing the interior and exterior of the vehicle (in a transverse direction as viewed in FIG. 14A).

In addition, the internal end portion of the base portion 10 constitutes substantially a flat plane which intersects with the surface 10e of the base portion 10 which faces the end face of the door window glass G at substantially right angles so that the relevant end portion is brought into surface contact with the interior side wall portion 11 when the end portion is brought into abutment with the interior side wall portion 11.

Furthermore, an engagement projection 53 is provided on the internal end portion of the base portion so as to project toward the inside of the vehicle, and an engagement recess 54 in which the engagement projection 53 is inserted is provided in an abutment portion of the interior side wall portion 11. Of course, the engagement projection 53 may be provided on the abutment portion of the interior side wall portion 11, and the engagement recess 54 may be provided in the internal end portion. In addition, on top of these constructions, a construction may be adopted in which a locking projection, which functions as a locking portion, may be formed on a distal end portion of the engagement projection 53, and a locking recess, which functions as a locking portion in which the locking projection is locked, may be formed in a deeper portion of the engagement recess 54.

Then, when a glass run 1 so formed is mounted in a sash S, as shown in FIG. 14B, the extension portion 41 is contracted so that the interior side wall portion 11 and the exterior side wall portion 12 are shifted nearer to each other in parallel, and the base portion 10 is brought into abutment with the interior side wall portion 11 while the engagement projection 53 is inserted into the engagement recess 54, so that the engagement projection 53 and the engagement recess 54 are brought into engagement with each other, whereby the movement of the base portion 10 is restricted in both directions along the thickness of the base portion 10, that is, in both directions toward the inside and outside of a main body portion 13. Then, with the main body portion 13 being made to maintain substantially the U-shape cross section thereof which represents its non-opened-out state, the glass run 1 is fitted into the sash S.

Accordingly, an advantage similar to those obtained by the ninth embodiment can be realized. In addition, since the glass run is constructed so that nothing is exposed to the outside of the main body portion 13, the glass run 1 can be properly attached to the sash S. Further, the fear that the end face of the door glass G abuts with the extension portion 51 is reduced.

Note that the invention is not limited to the contents of the embodiments described above but may be embodied as follows. Of course, other applications and modifications than those that will be described below are, of course, possible.

(a) While, in the embodiment, the invention is embodied in the glass run 1 that is mounted in the sash S provided on a side door, the invention may be embodied in a glass run that is mounted on the body side of the vehicle.

(b) The shapes and constructions (such as orientation) of the extension portions 16 and the like in the respective embodiments are not limited to those described in the respective embodiments, but other shapes and constructions may be adopted. For example, a bellows-like extension portion may be adopted.

(c) The positions where the extension portions 16 and the like are disposed in a direction traversing the interior and exterior of the vehicle are also not limited to the position inwards of the position to which the end face of the door window glass G is opposed, but the extension portions 16 and the like may be disposed, for example, outwards of the position or may be disposed so as to coincide with the position to which the end face of the door window glass G is opposed.

(d) In the respective embodiments, the provision and omission of the locking portion and the locking portion in which the former locking portion is locked on and in the engagement projection and the engagement recess are matters of design, and it is possible to devise various combinations.

(e) In the third embodiment, the end portion of the extension portion 41 may be continuously joined not to the protruding portion 43 but to the base portion main body 42. In addition, the protruding portion 43 may be made to protrude from the base portion main body 42 not along the surface 10e of the base portion 10 which faces the end face of the door window glass G but along the surface of the base portion 10 which faces the outside of the main body portion 13, and the extension portion 41 may be continuously joined to the base portion main body 42 or the side of the protruding portion 43 which faces the surface 10e which faces the end face of the door window glass G and may be accommodated within the area corresponding to the thickness Y of the base portion main body 42 when in the contracted state.

(f) In the third and fourth embodiments, the construction is not limited to the exterior side wall portion 11 but may be applied to the exterior side wall portion 12 in which the side wall portion 11 is continuously joined to the extension portion and is spaded apart from the base portion 10.

(g) In the embodiments, while the description has been made by taking mainly the extruded portion 2 (the cross sections shown in FIGS. 11A, 11B and the like) for example, a construction may, of course, be adopted in which at least either the extruded portions 2 to 4 or the molded portions 5, 6, in particular, only the molded portions 5, 6 are positioned (engaged or locked) by the engagement projection 17 and the engagement recess 18. In addition, in the event that the engagement projection 17 and the like are provided on both the extruded portions 2 to 4 and the molded portions 5, 6, the engagement portion and the like that are provided on both the portions may be formed continuously or separately. As an example of the construction in which they are formed separately, for example, a construction is taken as an example of a specific form in which an engagement projection is continuously formed on the extruded portions 2 to 4, while on the molded portions 5, 6, at least one projection is formed as an engagement projection.

(h) In the embodiments, while the glass run 1 is formed from EPDM, the glass run 1 may be formed from other materials such as thermoplastic elastomer olefin (TPO) or soft polyvinyl chloride.

Thirteenth Embodiment

A thirteenth embodiment will be described by reference to FIGS. 15A, 15B.

Figure 15A:
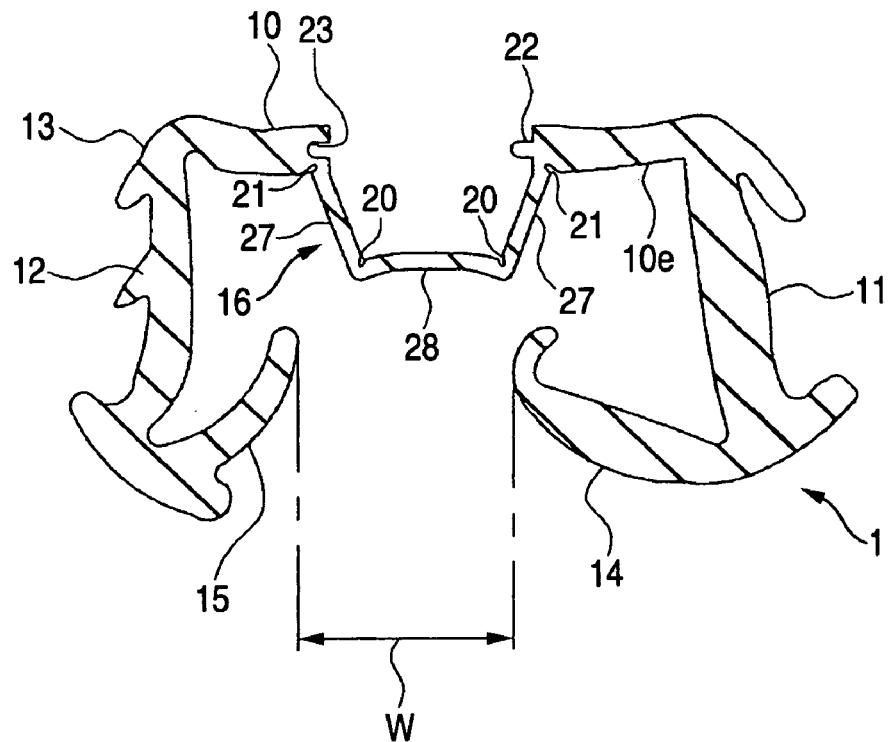
Figure 15B:
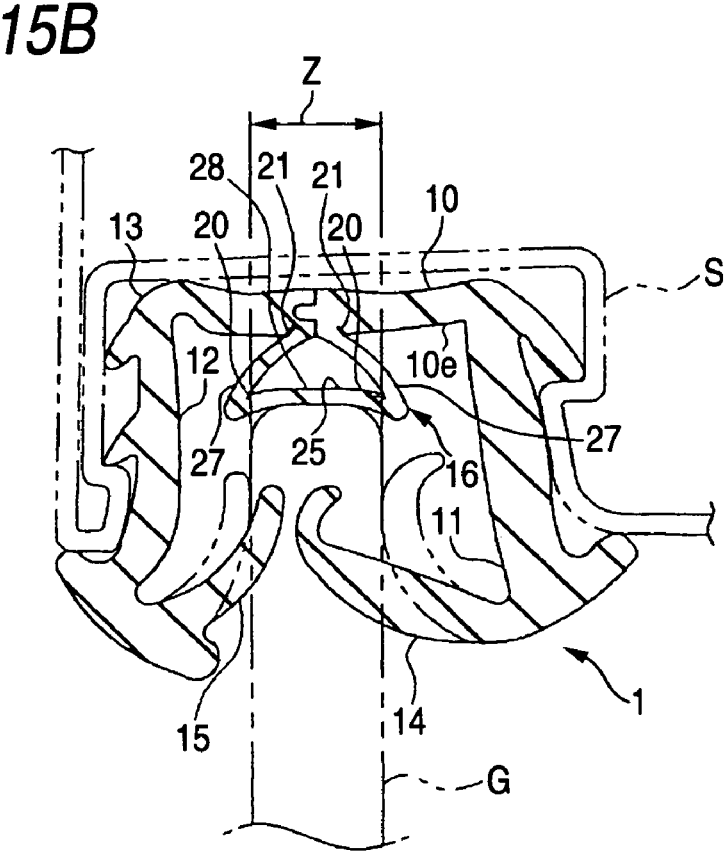

As shown in FIGS. 15A, 15B, an extension portion 16 is provided at a position of a base portion 10 which corresponds to a section Z defined as extending from a position which intersects with an extension along an interior side of the door window glass G to a position which intersects with an extension along an exterior side of the door window glass G and to which the end face of the door window glass G is opposed.

In addition, the extension portion 16 is made thinner than the thickness of the base portion 10 and is provided with a pair of support portions 27 extending, respectively, from surfaces 10*e* facing an end face of the door window glass G of portions of the base portion 10 which face each other across the extension portion 16 and a receiving portion 28 which joins distal end portions of the support portions 27 to each other. The support portions 27 extend, respectively, from the corresponding surfaces 10*a* which face the end face of the door window glass G so as to narrow a distance therebetween, and the receiving portion 28 is formed so as to become substantially parallel to the base portion 10.

Furthermore, a notched portion 20 is formed in an internal side of each corner portion between the support portion 27 and the receiving portion 28, and a notched portion 21 is formed in an internal side of each corner portion between the support portion 27 and the base portion 10. By the provisions of these notched portions 20, 21, the occurrence of a folding (bending) deformation at each of the corner portions is facilitated. In addition, the receiving portion 18 is bent or curved so as to form a recess directed toward the end face of the door window glass G. In addition, an engagement projection 22 is provided on one of the abutment portions of the base portion 10, and an engagement recess 23 with which the engagement projection 22 is brought into engagement is provided in the other abutment portion.

As shown in FIG. 15A, the glass run 1 is formed in such a state that the extension portion 16 is extended toward the inside of outside of the vehicle at both the extruded portions 2 to 4 and the molded portions 5, 6. Consequently, before the glass run 1 is mounted in the sash S, a predetermined opening W is secured between seal lips 14, 15 in such a state that an interior side wall portion 11 and an exterior side wall portion 12 are shifted apart from each other in parallel by a dimension corresponding to the extension of the extension portion 16, with the main body portion 13 maintaining substantially a U-shaped cross section which represents its non-opened-out state.

As shown in FIG. 15B, when mounting the glass run 1 in the sash S, the extension portion 16 is contracted, so that the interior side wall portion 11 and the exterior side wall portion 12 are shifted nearer to each other in parallel, whereby the main body portion 13 can easily be fitted in the sash S while maintaining substantially the U-shaped cross section which represents its non-opened-out state.

In this state, the portions of the base portion 10 which face each other across the extension portion 16 are brought into abutment with each other, and the engagement projection 22 is brought into engagement with the engagement recess 23. Then, the extension portion 16 is formed into substantially a triangular shape, whereby a hollow portion 25 is formed by the extension portion 16 on a side of the base portion 10 where the surface 10*e* thereof is situated which faces the end face of the door window glass G. Consequently, the cross section of this hollow portion 25 takes substantially a triangular shape which gradually widens downwards. Then, when the door window glass G is closed, the end face of the door window glass G is brought into abutment with the extension portion 16 (the receiving portion 18).

Thus, as has been described heretofore, the glass run 1 is molded in such a state that the extension portion 16 extends in a direction traversing the interior and exterior of the vehicle and that the main body portion 13 is formed in substantially the U-shaped cross section which represents its non-opened-out state, and the extension portion 16 is contracted in a direction traversing the interior and exterior of the vehicle, so that the glass run 1 is mounted in the sash S with the main body portion being in the non-opened-out state to thereby have substantially the U-shaped cross section. Consequently, when the glass run 1 is molded, an opening is provided between seal lips 14, 15, and a predetermined opening W is secured between the seal lips 14, 15. By adopting this construction, when attempted to be applied, a predetermined lubricant can be applied to the inner circumferential surface of the base portion and the sliding surfaces of the seal lips over which the door window glass is allowed to slide, and a risk can be reduced that the seal lips are joined together immediately after the molding of the glass run. In addition, as to the molded portion, a sufficient thickness can be given to a holding plate for holding the core of the mold unit. Furthermore, in performing a mounting operation, since there is no need to rotate the side wall portions of the molded portion from the opened-out state so as to contract them, there occurs no case where the bending angle, radius of curvature and length of circumference of the molded portion are caused to change between before and after the mounting. Consequently, the risk can be eliminated that the molded portion cannot be mounted in the sash while following the shape of the sash. In addition, in designing glass runs, since there is no need to repeat tries and errors with a view to eliminating the aforesaid change in the structural factors of the molded portion which would otherwise occur, a reduction in the number of design man hours can be realized.

In addition, an impact generated when the door window glass G is closed can be absorbed by virtue of the elastic force of the extension portion 16 having the hollow portion 25, thereby making it possible to reduce impact noise based on the impact. Namely, the extension portion 16 has an additional function as a damper unit (a damper function), whereby the improvement in functionality of the glass run 1 can be realized.

Additionally, when the door window glass G is brought into abutment with the extension portion 16, since air trapped in the hollow portion 25 is vented through a minute gap between the portions of the base portion 10 which are then in abutment with each other, the extension portion 16 deforms as designed and the door window glass G is received in a predetermined position. Furthermore, since the receiving portion 28 is curved so as to form the recess facing the end face of the door window glass G, the end face of the door window glass G is held so as to be encapsulated therein when closed. In addition, by the formation of the notched portions 20, 21, the extension portion 16 is made easy to deform. By these constructions, a drawback is made difficult to occur that the door window glass G is caused to deviate in position due to the impact generated when the door window glass G is brought into abutment with the extension portion 16, thereby making it possible to allow the door window glass G to be received in the predetermined position. As a result, a remarkable improvement in the positional stability of the door window glass G when closed can be realized. Furthermore, a process can be omitted which would otherwise be carried out after an extrusion of an extruded portion with a perfect hollow portion formed therein for specially making an air vent hole in the perfect hollow portion.

Fourteenth Embodiment

Next, a fourteenth embodiment will be described below by reference to FIGS. 16A, 16B, 17A, 17B. However, omitting the detailed description of constituent portions similar to those of the first embodiment, only an extension portion, which constitutes a specific feature of the second embodiment, and portions associated therewith will be described.

Figure 16A:
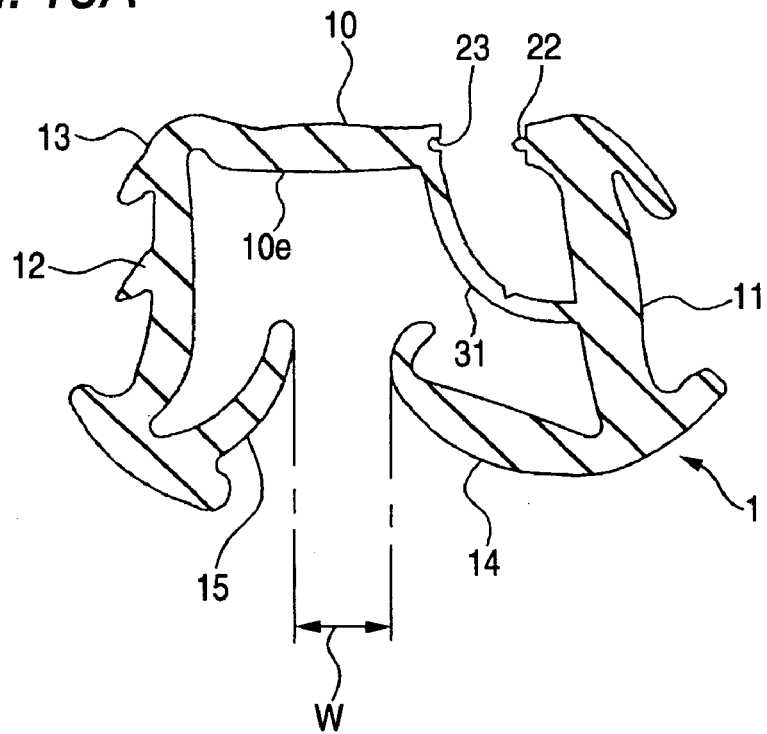
FIG. 16A is a sectional view showing a glass run according to a fourteenth embodiment, which is in a state resulting before mounting

As shown in FIG. 16A, when a glass run 1 is molded, an interior side wall portion 11 and a base portion 10 are provided as being spaced apart from each other, and an extension portion 31 is provided which continuously joins the interior side wall portion 11 to the base portion 10 and which is able to extend and contract. Then, when the extension portion 31 is in an extended state, the interior side wall portion 11 and the base portion 10 are space apart from each other, whereas when the extension portion 31 is in a contracted state, the interior side wall portion 11 and the base portion 10 are brought into abutment with each other, and a main body portion 13 is allowed to extend and contract toward at least the inside and outside of the main body portion 13.

The extension portion 31 is made thinner than the thickness of the base portion 10, and one end portion thereof is continuously joined to a surface 10e of the base portion 10 which faces an end face of a door window glass G, whereas the other end portion thereof is continuously joined to an internal wall surface of the interior side wall portion 11.

Figure 16B:
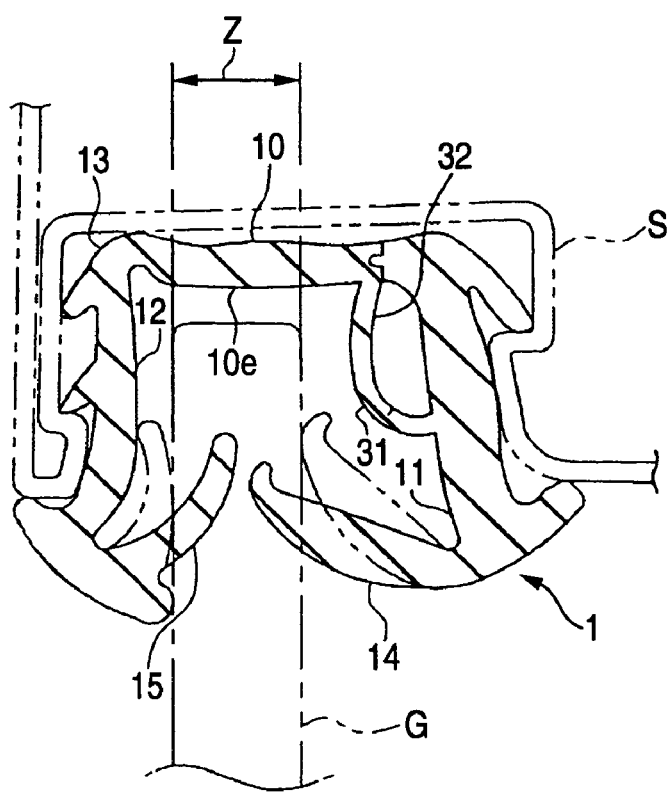
FIG. 16B is a sectional view of the glass run, which is in a state resulting after mounting.

When mounting the glass run 1 in a sash S, as shown in FIG. 16B, the extension portion 31 is contracted, so that the interior side wall portion 11 and an exterior side wall portion 12 are shifted nearer to each other in parallel, whereby the internal end portion of the base portion 10 is brought into abutment with the interior side wall portion 11. Then, the glass run 1 is fitted in the sash S, with the main body portion 13 maintaining substantially a U-shaped cross section which represents its non-opened-out state.

In this state, a hollow portion 32 is formed inside the main body 13 by the extension portion 31, and when a door window glass G is closed, this hollow portion 32 is situated on an upper side portion of the glass run 1 inwards of the door glass G in such a state that the hollow portion 32 is spaced apart from the door window glass G.

Consequently, it is not until the door window glass G is moved due to vibrations toward the inside of the vehicle that the extension portion 31 is brought into abutment with the door window glass G via a seal lip 14, whereby a positional deviation of the door window glass G toward the inside of the vehicle can be restricted. Namely, the extension portion 31 is provided with a vibration control function. In addition, since the inward movement of the door window glass G is restricted, it becomes possible in an aggressive fashion to realize a flush surface which has been in demand in recent years or to make the exterior surface of the sash flush with the exterior surface of the door window glass from the viewpoint of improvement in the quality of external appearance.

In addition, the extension portion 31 is continuously joined to the surface 10e of the base portion 10 which faces an end face of the door window glass G at the one end thereof and to the internal wall surface of the interior side wall portion 11 at the other end portion thereof. Due to this, when compared with a case where the extension portion is continuously joined to end portions of the base portion 10 and the side wall portion 11, the hollow portion 32 can relatively be enlarged, and a further improvement in the restriction effect can be realized.

Note that on vertical side portions (extruded portions 3, 4) of the glass run 1, it is not until the door window glass G is moved toward the inside of the vehicle while ascending or descending that the hollow portion 32 in the extension portion 31 is brought into abutment with a rear side of the internal seal lip 14, whereby a positional deviation of the door window glass G toward the inside of the vehicle may be restricted. As this occurs, since the extension portion 31 is not brought into abutment with the internal seal slip 14 during the normal ascending or descending of the door window glass G, there is no change in the magnitude of force applied to the door window glass G by the seal lip 14, and hence there is no case where the ascending or descending load applied to the door window glass G is increased, thereby making it possible to allow the door window glass G to ascend and descend in a smooth fashion.

Figure 17A:
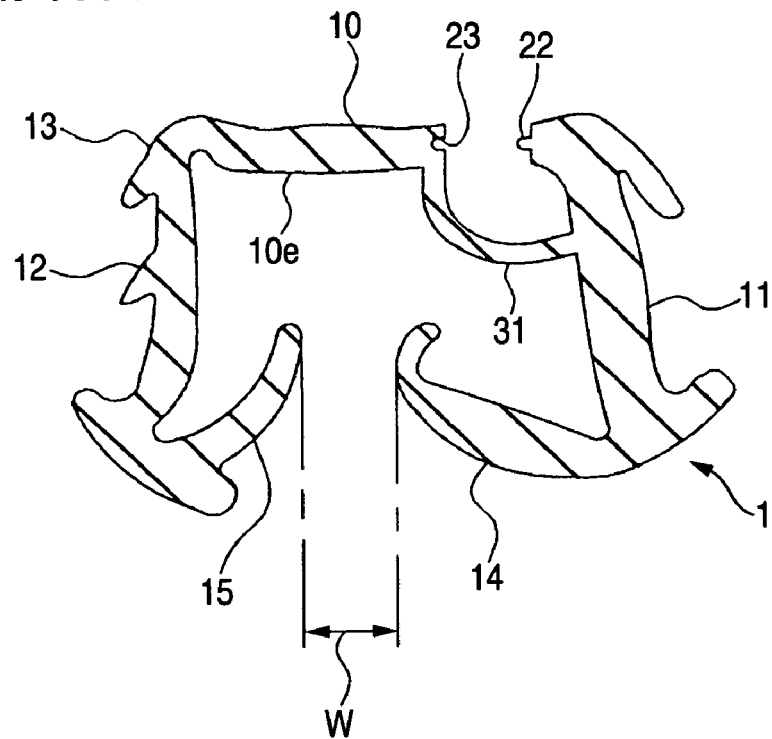
FIG. 17A is a sectional view showing a glass run according to the fourteenth embodiment, which is in a state resulting before mounting
Figure 17B:
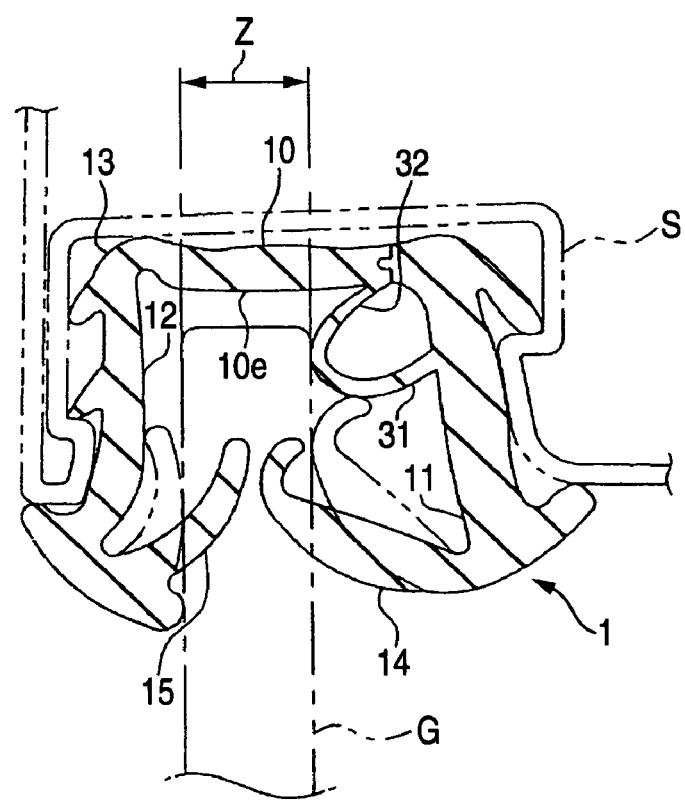
FIG. 17B is a sectional view of the glass run, which is in a state resulting after mounting.

In addition, as shown in FIGS. 17A, 17B, when the extension portion is contracted, the extension portion 31 may be constructed so as to be brought into elastic abutment with the interior side of the door window glass G so as to apply stress toward the exterior side of the door glass G. According to this construction, the extension portion 31 is intentionally brought into contact with the door window glass G so as to restrict the movement of the door window glass G, thereby realizing the improvement of such a functionality of the glass run that the sliding or abutment position of the door glass G is highly stabilized. As this occurs, a lubricant may be applied to the extension portion 31 so as to increase the sliding properties of the door window glass.

Fifteenth Embodiment

Next, a fifteenth embodiment of the invention will be described by reference to FIGS. 18A, 18B.

Figure 18A:
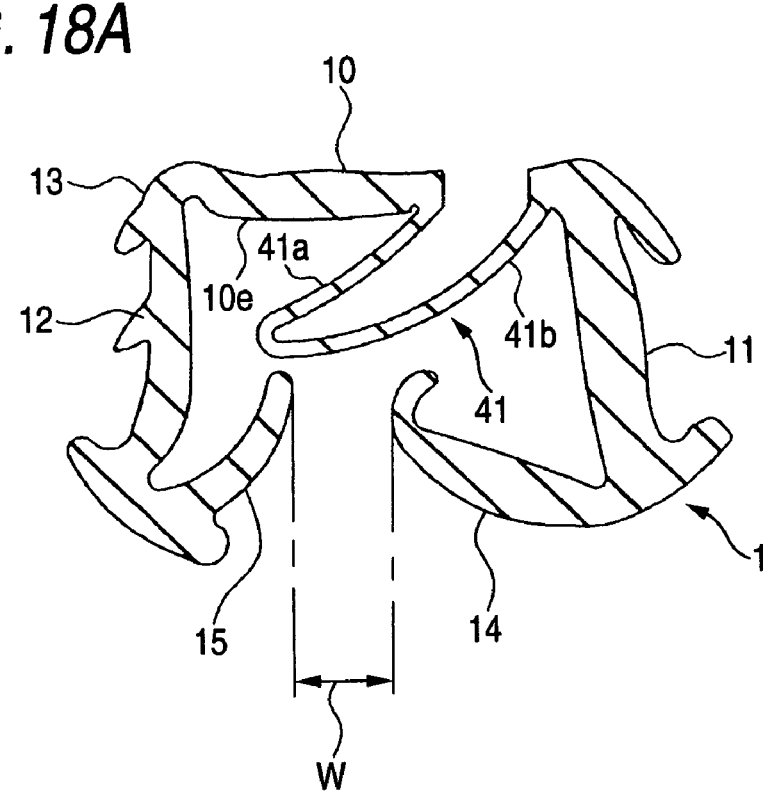
FIG. 18A is a sectional view showing a glass run according to a fifteenth embodiment, which is in a state resulting before mounting
Figure 18B:
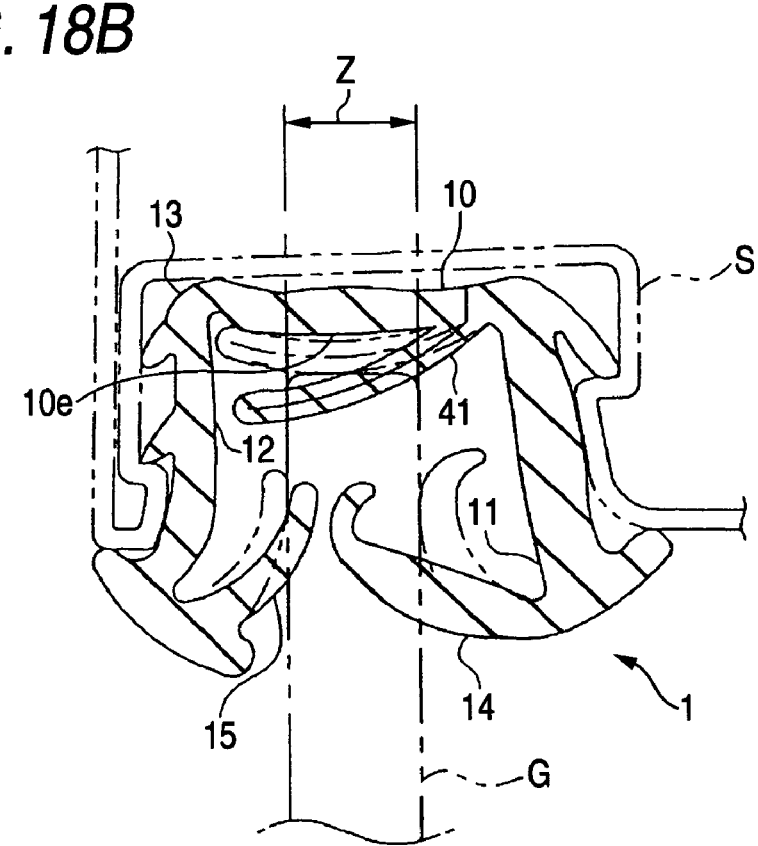
FIG. 18B is a sectional view of the glass run, which is in a state resulting after mounting.

As shown in FIGS. 18A, 18B, on the upper side portion of the glass run 1, an expandable and contractible portion 41 is formed in a base portion 10 so as to be continuously joined thereto inwards of a position thereof (a section Z) to which an end face of a door window glass G is opposed and to extend in a direction traversing the interior and exterior of the vehicle.

The extension portion 41 is provided with an inner movable portion 41a which is continuously joined to the vicinity of the position on a base portion 10 to which the end face of the door window glass G is opposed and an outer movable portion 41b which is continuously joined to a portion on the base portion 10 which is spaced farther apart from the relevant position, is formed in substantially a V-shaped cross section which takes a convex shape which protrudes toward the inside of the main body portion 13, as well as the outside of the vehicle (a seal lip 15) when in an extended state and protrudes toward the inside of the main body 13 from a surface 10e of the base portion 10 which faces the end face of the door window glass G. In addition, the extension portion 41 is made thinner than the thickness of the base portion 10.

As shown in FIG. 18B, when mounting the glass run 1 in a sash S, the extension portion 41 is contracted, so that an interior side wall portion 11 and an exterior side wall portion 12 are shifted nearer to each other in parallel, whereby a main body portion 13 is fitted in the sash S while maintaining substantially a U-shaped cross section which represents its non-opened-out state.

In this state, in the extension portion 41, the inner movable portion 41a and the outer movable portion 41b are folded so as to be superposed on each other so that the movable portions protrude toward the inside of the main body portion 13 in the form of lips. Then, the extension portion 41 is disposed between the end face of the door window glass G and the surface 10e of the base portion 10 which faces the end face of the door window glass G. Consequently, when the door window glass G is closed, the end face of the door window glass G is brought into abutment with the extension portion 41.

According to this construction, the extension portion 41 can absorb an impact generated when the door window glass G is closed, whereby impact noise based on the impact can be reduced. Namely, the extension portion 41 has an additional function as a damper function, the improvement in the functionality of the glass run 1 being thereby realized.

Sixteenth Embodiment

Next, a sixteenth embodiment of the invention will be described by reference to FIGS. 19A, 19B.

Figure 19A:
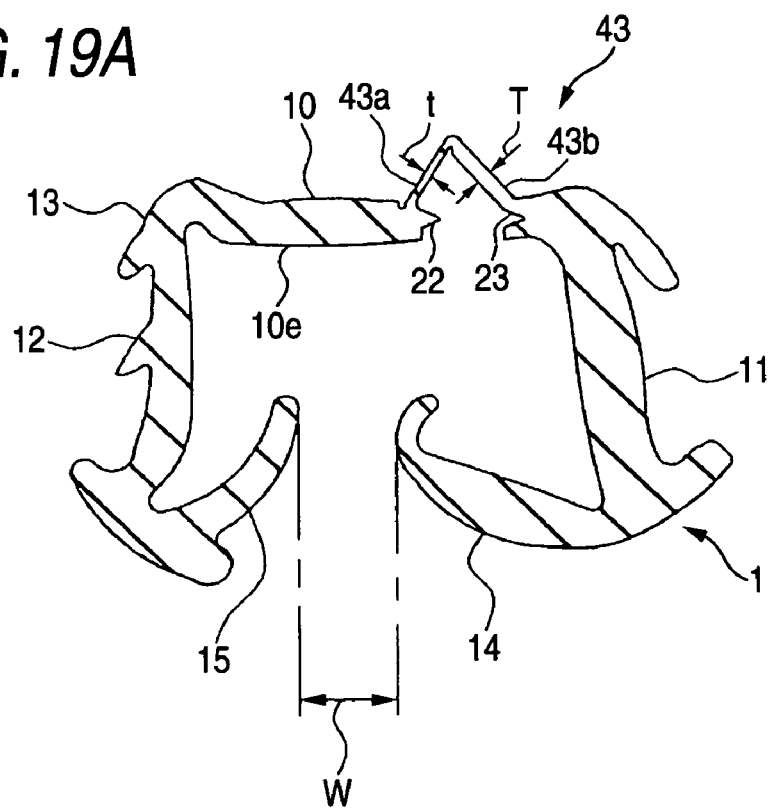
FIG. 19A is a sectional view showing a glass run according to a sixteenth embodiment, which is in a state resulting before mounting
Figure 19B:
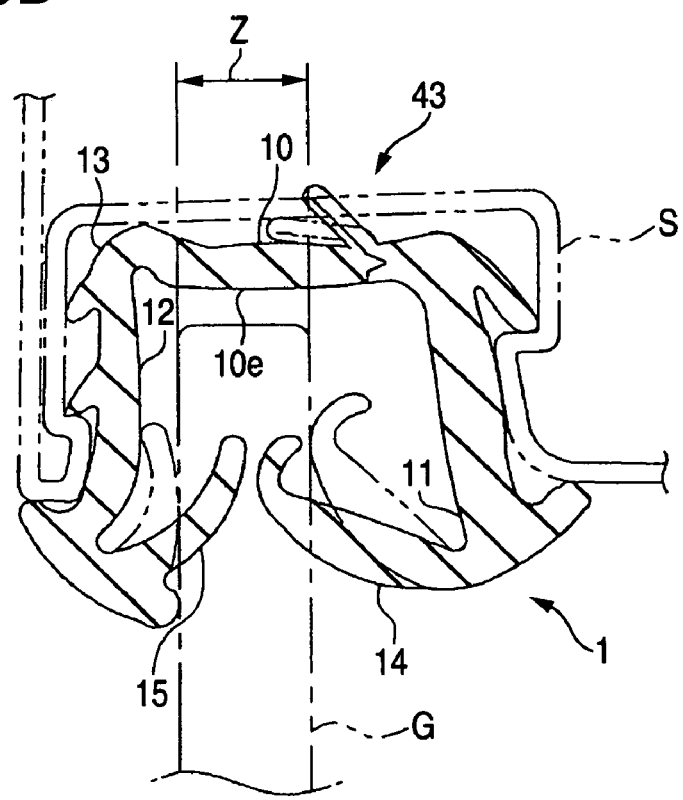
FIG. 19B is a sectional view of the glass run, which is in a state resulting after mounting.

As shown in FIGS. 19A, 19B, on the upper side portion of the glass run 1, an expandable and contractible portion 43 is formed in a base portion 10 so as to be continuously joined thereto inwards of a position thereof (a section Z) to which an end face of a door window glass G is opposed and to extend in a direction traversing the interior and exterior of the vehicle.

The extension portion 43 is provided with an inner movable portion 43a positioned near to a position to which the end face of the door window glass G is opposed and a outer movable portion 43b positioned far apart from the same position, is formed in substantially an inverted V-shaped cross section which takes a convex shape which protrudes toward the outside of a main body portion 13 when in an extended state and protrudes toward the outside of the main body 13. In addition, the extension portion 43 is made thinner than the thickness of a body of the base portion 10, and the thickness T of the inner movable portion 43a is made thinner than the thickness T of the outer movable portion 43b.

As shown in FIG. 19B, when mounting the glass run 1 in a sash S, the extension portion 43 is contracted, so that an interior side wall portion 11 and an exterior side wall portion 12 are shifted nearer to each other in parallel, whereby the main body portion 13 is fitted in the sash S while maintaining substantially a U-shaped cross section which represents its non-opened-out state.

When the extension portion 43 contracts, due to a difference in thickness between the respective movable portions 43a, 43b, the inner movable portion 43a elastically deforms prior to the outer one, whereby the extension portion 43 inclines toward the outside of the vehicle (toward the leftward direction as viewed in FIG. 19B). Then, in this state, the inner movable portion 43a and the outer movable portion 43b are folded so as to be superposed on each other so that the movable portions protrude toward the outside of the main body portion 13 in the form of lips. Consequently, the extension portion 43 is brought into abutment with the sash S in such a state that the glass run 1 is mounted in the sash S. By adopting this construction, wind noise generated in a gap between the sash S and the glass run 1 can be suppressed. Namely, the extension portion 43 has an additional function such as a wind noise controlling function, the improvement in the functionality of the glass run 1 being thereby realized.

Seventeenth Embodiment

Next, a seventeenth embodiment of the invention will be described by reference to FIGS. 20A, 20B.

Figure 20A:
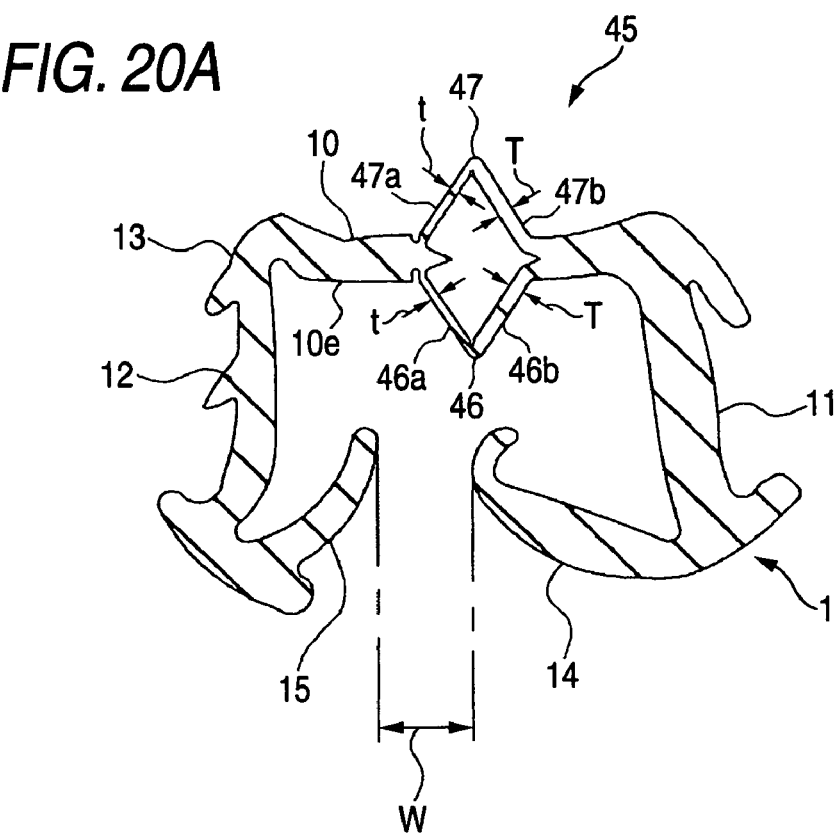
FIG. 20A is a sectional view showing a glass run according to a seventeenth embodiment, which is in a state resulting before mounting
Figure 20B:
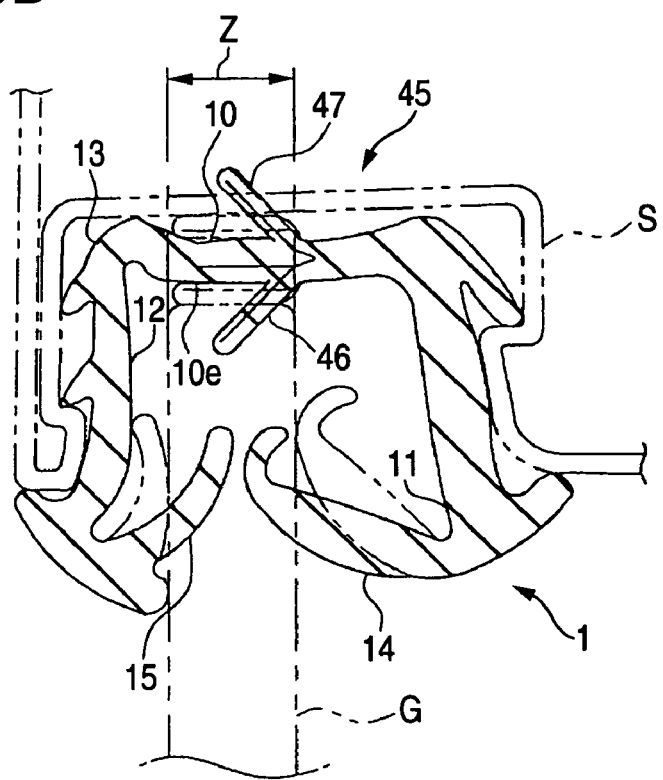
FIG. 20B is a sectional view of the glass run, which is in a state resulting after mounting.

On an upper side portion of a glass run 1, as shown in FIGS. 20A, 20B, an expandable and contractible portion 45 is formed in a base portion 10 so as to extend in a direction traversing the interior and exterior of the vehicle.

The extension portion 45 is provided with an internal constituent portion 46 which protrudes toward the inside of a main body portion 13 and an external constituent portion 47 which protrudes toward the outside of the main body portion 13.

The internal constituent portion 46 is provided with an inner movable portion 46a positioned near to a position to which an end face of a door window glass G is opposed and a outer movable portion 46b positioned far apart from the same position, is formed in substantially a V-shaped cross section which takes a convex shape which protrudes toward the inside of the main body portion 13 when in an extended state and protrudes toward the inside of the main body 13. In addition, the internal constituent portion 46 is made thinner than the thickness of a body of the base portion 10, and the thickness T of the inner movable portion 46a is made thinner than the thickness T of the outer movable portion 46b.

Similarly, the external constituent portion 47 is provided with an inner movable portion 47a positioned near to the position to which the end face of the door window glass G is opposed and a outer movable portion 47b positioned far apart from the same position, is formed in substantially an inverted V-shaped cross section which takes a convex shape which protrudes toward the outside of the main body portion 13 when in an extended state and protrudes toward the outside of the main body 13. In addition, the external constituent portion 47 is made thinner than the thickness of the body of the base portion 10, and the thickness T of the inner movable portion 47a is made thinner than the thickness T of the outer movable portion 47b.

According to the construction, the extension portion 45 is constructed so as to be formed, as a whole, into substantially a pantograph-like shape (substantially a quadrangular shape). Note that air vents are provided in the inner movable portions 46a, 47a for venting air trapped in substantially the pantograph-like shape when the extension portion 45 is deformed.

As shown in FIG. 20B, when mounting the glass run 1 in a sash S, the extension portion 45 is contracted, so that an interior side wall portion 11 and an exterior side wall portion 12 are shifted nearer to each other in parallel, whereby the main body portion 13 is fitted in the sash S while maintaining substantially a U-shaped cross section which represents its non-opened-out state.

In the internal constituent portion 46 and the external constituent portion 47 of the extension portion 45 contracts, when contracted, due to a difference in thickness between the inner movable portions 46*a*, 47*a* and the outer movable portions 46*b*, 47*b*, the inner movable portions 46*a*, 47*a* elastically deform prior to the outer ones, whereby the extension portion 45 inclines toward the outside of the vehicle (toward the leftward direction as viewed in FIG. 20B).

Then, in this state, the respective constituent portions 46, 47 are folded, respectively, such that the inner movable portion 46*a* and the outer movable portion 46*b* are superposed on each other, whereas the inner movable portion 47*a* and the outer movable portion 47*b* are superposed on each other so that the respective pairs of movable portions protrude toward the inside and outside of the main body portion 13 in the form of lips.

Consequently, the external constituent portion 47 is brought into abutment with the sash S in such a state that the glass run 1 is mounted in the sash S, whereby wind noise generated in a gap between the sash S and the glass run 1 can be suppressed. In addition, when the door window glass G is closed, the internal constituent portion 46 is disposed between the end face of the door window glass G and the surface 10*e* of the base portion 10 which faces the end face of the door window glass G, whereby the internal constituent portion 46 can absorb an impact generated when the door window glass G is closed, thereby making it possible to reduce impact noise based on the impact.

Note that the invention is not limited to the contents of the embodiments described above but may be embodied as follows. Of course, other applications and modifications than those that will be described below are, of course, possible.

(a) While, in the embodiment, the invention is embodied in the glass run 1 that is mounted in the sash S provided on a side door, the invention may be embodied in a glass run that is mounted on the body side of the vehicle.

(b) The shapes and constructions (such as orientation) of the extension portions 16 and the like in the respective embodiments are not limited to those described in the respective embodiments.

(c) The shapes and constructions of the engagement projections 22 and the like and the engagement concavities 23 and the like in the respective embodiments are not limited to those described therein. Of course, a construction may be adopted in which the engagement projections 22 and the like and the engagement concavities 23 and the like are omitted. In addition, a construction may also be adopted in which a locking portion is provided on one of engagement portions which are brought into abutment with each other, and a locking portion in which the former locking portion is locked is provided on the other engagement portion.

(d) In the embodiments, while the glass run 1 is formed from EPDM, the glass run 1 may be formed from other materials such as thermoplastic elastomer olefin (TPO) or soft polyvinyl chloride.

(e) In the thirteenth embodiment, the extension portion 16 is constituted by the support portion 27 and the receiving portion 28 and the receiving portion 28 is formed substantially in parallel with the base portion 10, and in the contracted state, the extension portion 16 is configured to have the hollow portion 25 having the triangular cross-section. The invention is not limited in this feature. For example, extension portion may have no bent portion between a connection portion of one base portion 10 and a connection portion of another base portion 10 so that the hollow portion has a circular cross-section without bent portion.

Further, the receiving portion 18 is curved so as to form recess with respect to the end face of the door glass G in the above embodiments. The invention is not limited by this feature. The receiving portion 18 may be formed in a flat surface.

(f) In the sixteenth and seventeenth embodiments, by the difference in thickness between the inner movable portion 43*a* etc. and the outer movable portion 43*b* etc., the glass run is configured such that the inner movable portion 43*a* elastically deforms more, so as to be inclined toward the outside of the vehicle. Instead of that or in addition to that, the deformation of the inner movable portion 43*a* etc. may be facilitated by forming a notch having a concave cross-section in a vicinity of the root of the inner movable portion 43 a as described in the first embodiment.

Eighteenth Embodiment

An eighteenth embodiment of the invention will be described by reference to FIGS. 21 to 23.

An extension portion 16 is formed in a base portion 10 so as to extend in a direction traversing the interior and exterior of the vehicle. As shown in FIG. 22, the extension portion 16 is provided at a position which is offset inwards of a position (a range) Y with or along which an end face of a door window glass G is brought into abutment or slides. In this embodiment, the extension portion 16 is provided in a base portion 10 in the vicinity of a position where the base portion is continuously joined to an interior side wall portion 11. Namely, the extension portion 16 is formed at the position which does not disturb the abutment or slide of the door window glass G.

The extension portion 16 is made thinner than the thickness of the base portion 10, is formed into a curved shape which protrudes toward the inside of the main body portion 13 and is contracted so as to form a hollow portion 25 when mounted in the sash S.

Next, the construction of the extension portion 16 resulting before mounted in the sash S will be described in detail by taking the extruded portion 2 and the molded portion 5 as examples. FIG. 21 is a perspective view showing a rear corner portion of the glass run 1 before mounted in the sash S.

As shown in the same drawing, a joined portion 26 which extends along a longitudinal direction is made to exist over most of the extruded portion 2 in the longitudinal direction by joining together portions of the base portion 10 which face each other across the extension portion 16 so that the extension portion 16 is maintained in the contracted state. Note that since the extension portion 16 contracts in a direction traversing the interior and exterior of the vehicle in a convex fashion, the extension portion 16 contracts in such a state that the joined portion 26 is exposed to the outside of the main body portion 13.

Note that this joined portion 26 is formed using either a process in which the relevant portion is extruded as being joined together or a sizing process in which relevant portions are brought into contact with each other immediately after extruded from an extrusion mold so as to be formed into a joined portion. In any case, the joined portion 26 is such as to maintain the contracted state of the extension portion 16 irrespective of the mount in the sash S.

Figure 23:
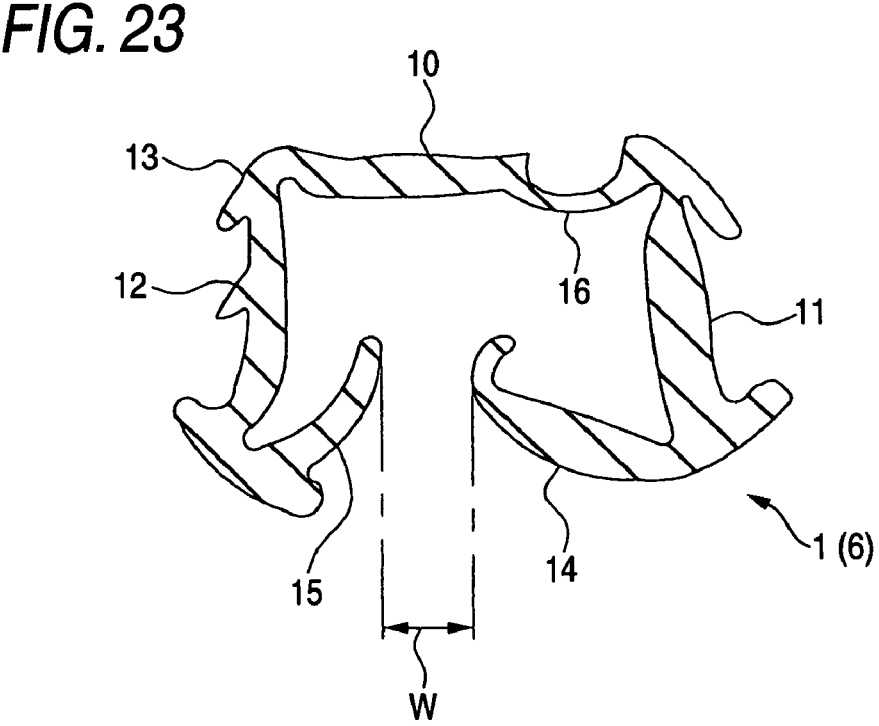
FIG. 23 is a sectional view taken along the line J-J in FIG. 1.

On the other hand, in the molded portion 5, before mounted in the sash S, the extension portion 16 extends in a direction traversing the interior and exterior of the vehicle (refer to FIG. 23). Namely, the main body portion 13 maintains substantially the U-shaped cross section, and the interior side wall portion 11 and the exterior side wall portion 12 are shifted apart from each other in parallel by a dimension coinciding with the extension of the extension portion 16, when compared with the extruded portion 2, whereby a predetermined opening W is secured which is good enough to impart a sufficient thickness to the holding plate for holding a core, which will be described later on.

Figure 21:
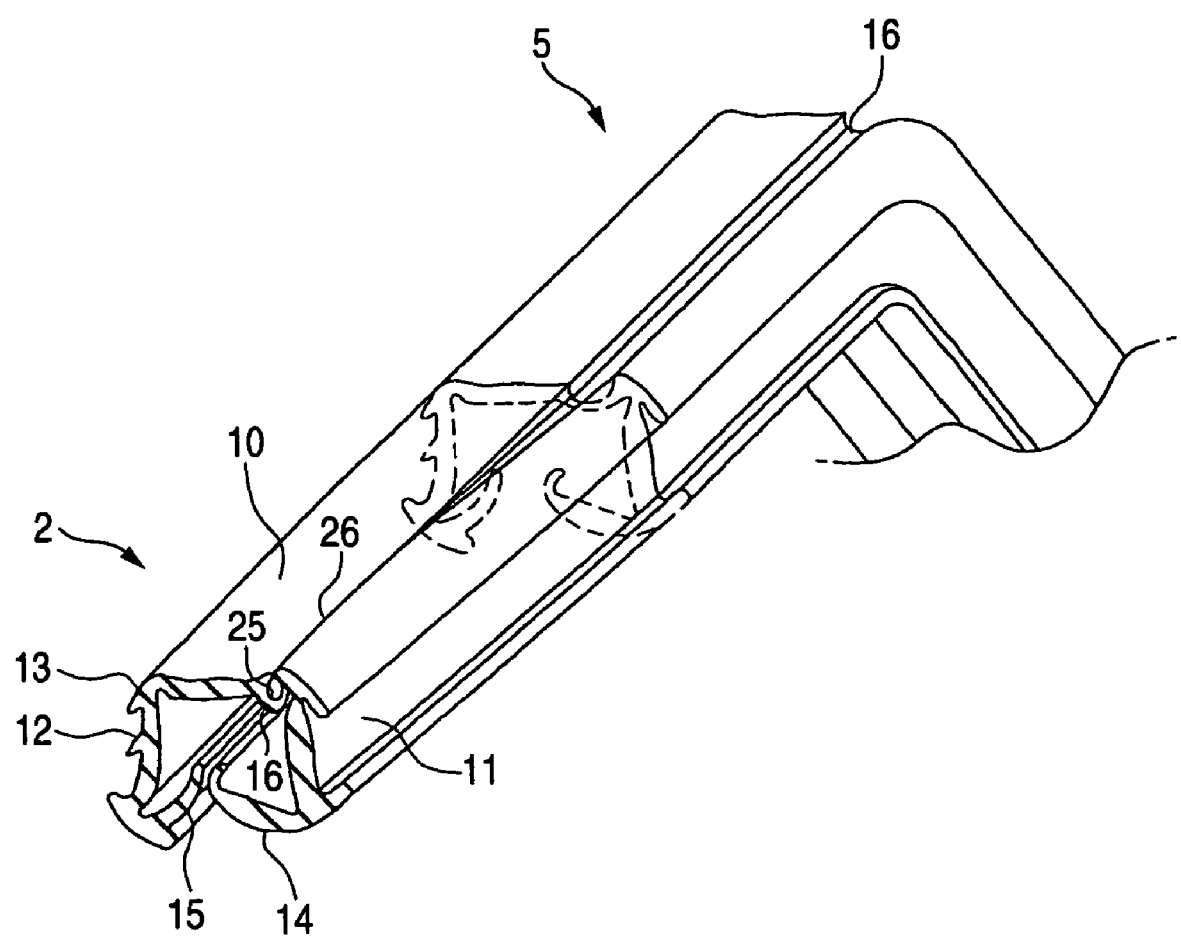
FIG. 21 is a perspective view showing a corner portion of a glass run according to an eighteenth embodiment, which is in a state resulting prior to mounting.
Figure 22:
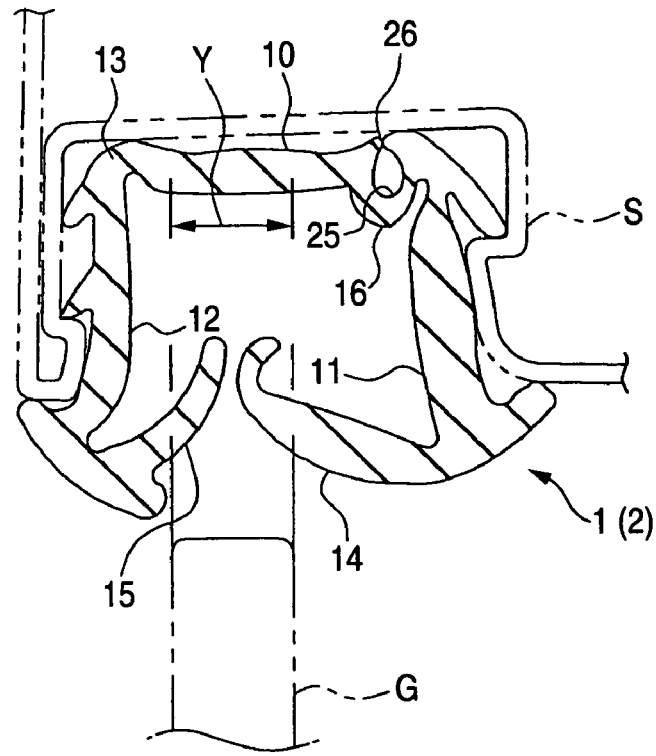
FIG. 22 is a sectional view taken along the line K-K in FIG. 1.

In addition, as shown in FIG. 21, the extension portion 16 is allowed to extend due to the joined portion 18 being separated over a predetermined section from an end portion of the extruded portion 2 which is joined to the molded portion 5, so that the sectional shape of the end portion of the extruded portion 2 and the sectional shape of a molded portion 5 to be molded can be made to coincide with each other when the extruded portion 2 is set in a mold unit.

Note that the joined portion, which is formed through the contact in the sizing process, is easy to be separated, and hence the joined portion can be torn apart manually without using a tool. In a case where a joined portion is extruded as so joined, a joined portion so formed can be torn apart using a tool such as a knife.

As has been described heretofore, in the glass run 1 according to the embodiment, the main body portions 13 of both the extruded portion 2 and the molded portion 5 are formed in substantially the U-shaped cross section which represents their non-opened-out states even before the glass run 1 is mounted in the sash S. Then, when mounting the portions of the molded portion 5 and the extruded portion 2 which are in the vicinity of the end portions thereof in the sash S, the main body portions 13 can easily be fitted in the sash S only by contracting the extension portion 16 so that the interior side wall portion 11 and the exterior side wall portion 12 are shifted nearer to each other in parallel.

Note that the extension portion 16 is maintained as contracted over most of the extruded portion 2, the main body portion 13 can easily be fitted in the sash S as it is.

Next, a method for manufacturing the glass run 1 constructed as has been described heretofore will be described. However, as a matter of convenience in description, the peripheral position (the rear corner portion) of the molded portion S will mainly be described (other portions of the molded portion 5 are manufactured in the same manner). Firstly, the aforesaid extruded portions 2, 3, 4 are formed by extruding the relevant portions using an extrusion machine, not shown, through a known extrusion and cutting the extruded portions to predetermined lengths. As this occurs, as has been described above, in the extruded portions 2, 3, 4, the main body portion 13 is formed in such a state that the extension portion 16 is contracted.

Following this, the joint of the joined portions 18 in the vicinity of the end portions of the extruded portion 2 and the extruded portion 4 connected to the molded portion 5 is released. In this case, since the thickness of the joined portions 18 is sufficiently thin, a required separation can easily be attained manually or using a knife or the like.

Next, end portions of the respective extruded portions 2, 4 are placed in placed in a mold unit (not shown) in such a manner as face a cavity therein for molding a molded portion 5. As this occurs, the extruded portions 2, 4 are connected together at the same time. The mold unit used for this molding includes a stationary mold, a plurality of movable molds and a core for defining an internal circumferential surface of a main body portion 13 or the like, and a holding plate for holding the core is formed so as to extend from the core. Then, when molding a molded portion 5, firstly, the end portions of the extruded portions 2, 4, in which the joined portions 18 are separated and the extended portions 16 are allowed to extend, are set in the mold unit in such a state that the respective molds are opened. Following this, the respective molds are disposed at predetermined positions and are then clamped together. At this point in time, a molded portion molding cavity is formed by the respective molds. Then, unvulcanized EPDM is injected into the cavity and thereafter vulcanization is carried out. Thereafter, the respective molds are opened, whereby a glass run 1 is obtained in which the extruded portions 2, 4 are connected to a molded portion 5 so molded.

Then, the glass run 1 so molded is fitted in the sash S. As this occurs, the extension portions 16 in the molded portion 5 and the like may be in abutment or a minute gap may be provided.

Thus, as has been described heretofore, in this embodiment, the glass run 1 is molded which is provided with the extruded portions 2 to 4 in which the extension portions 16 are contracted in a direction traversing the interior and exterior of the vehicle in advance and the molded portions 5, 6 in which the extension portions 16 are extended in a direction traversing the interior and exterior of the vehicle. Consequently, when mounting the glass run 1 so molded in the sash S, an assembly worker does not have to carry out fitting work to fit the glass run 1 in the sash S while maintaining the extension portions 16 in the contracted state over the full length of the glass run 1. Namely, he or she only has to carry out such fitting work on the positions corresponding to the molded portions 5, 6 and the portions in the vicinity thereof. As a result, the mounting work of the glass run 1 can be simplified, thereby making it possible to realize a remarkable improvement in workability.

In addition, according to the glass run 1 of this embodiment, before the molded portions 5, 6 are mounted in the sash S, the extension portions 16 are in the extended state, and the main body portions 13 take substantially the U-shaped cross section. Due to this, when actually mounting the glass run 1 in the sash S, since both the side wall portions 11, 12 of the molded portions 5, 6 do not have to be rotated from the extended state so as to be contracted, there is no case where the angle, radius of curvature and circumferential length of the molded portions 5, 6 change between before and after the mounting. Consequently, the risk can be eliminated that the glass run 1 cannot be mounted in the sash S in such a state that the glass run 1 conforms to the contour of the sash S. In addition, in designing glass runs, since there is no need to repeat tries and errors in anticipation of the change, the reduction in the number of design man hours can be realized.

In addition, at the time of molding, the opening W is secured between the seal lips 14, 15. Due to this, even in the event that the molded portions 5, 6 are taking substantially the U-shaped cross section which represents the non-opened-out state thereof, a sufficient thickness can be imparted to the holding plate for holding the core.

In addition, the extruded portions 2 to 4 are extruded in such a state that the portions of the base portion 10 which face across the extension portions 16 are joined to each other. Consequently, even at the time of mounting the glass run 1 in the sash S, the contracted state of the extension portions are maintained, whereby a further improvement in workability can be realized.

Additionally, the joined portion 26 is made relatively thin by the formation of the hollow portion 25 by the extension portion 16. Furthermore, in the releasing process, the joined portion 18 can relatively easily be separated via the hollow portion 25 (by inserting a knife there into). Moreover, the joined portion 26 is exposed to the outside of the main body portion 13. As a result, the separation work is made relatively easy, a further improvement in workability being thereby realized.

Note that the invention is not limited to the contents of the embodiments described above but may be embodied as follows. Of course, other applications and modifications than those that will be described below are, of course, possible.

(a) While, in the embodiment, the invention is embodied in the glass run 1 that is mounted in the sash S provided on a side door, the invention may be embodied in a glass run that is mounted on the body side of the vehicle.

(b) The shapes and constructions (such as orientation) of the extension portions 16 and the like in the respective embodiments are not limited to those described therein. For example, a construction may be adopted in which no hollow portion 25 is formed when in the extended state. In addition, a bellows-like extension portion may be adopted. A construction may of course be adopted in which the extension portion 16 protrudes toward the outside of the main body portion 13.

In addition, the position where the extension portion 16 is disposed is not limited to the position which is offset inwards of the position (the range) Y with or along which the end face of the door window glass G is brought into abutment or slides, but may be such as to be offset toward the outside of the vehicle therefrom or to coincide with the position (the range) Y with or along which the end face of the door window glass G is brought into abutment or slides.

Nineteenth Embodiment

A nineteenth embodiment of the invention will be described by reference to FIGS. 24 to 28.

Figure 24:
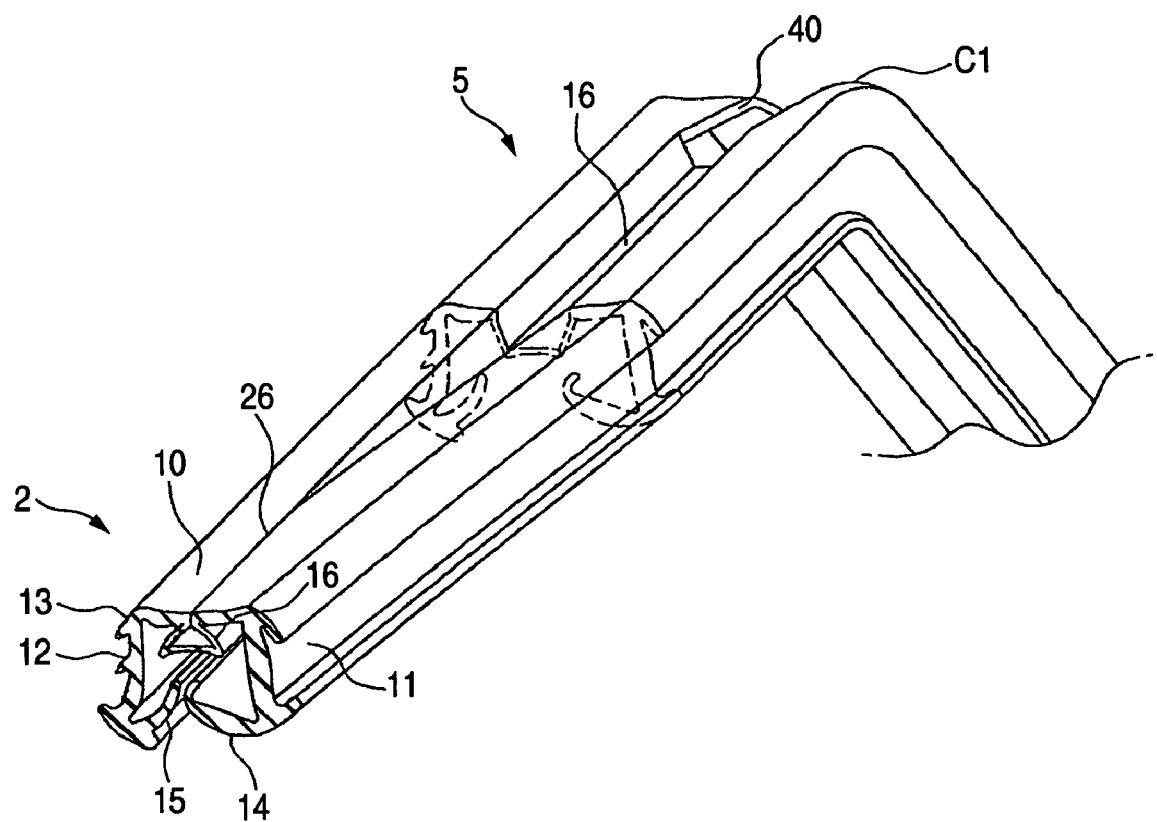
FIG. 24 is a perspective view showing a corner portion of a glass run according to a nineteenth embodiment, which is in a state resulting prior to mounting.
Figure 25A:
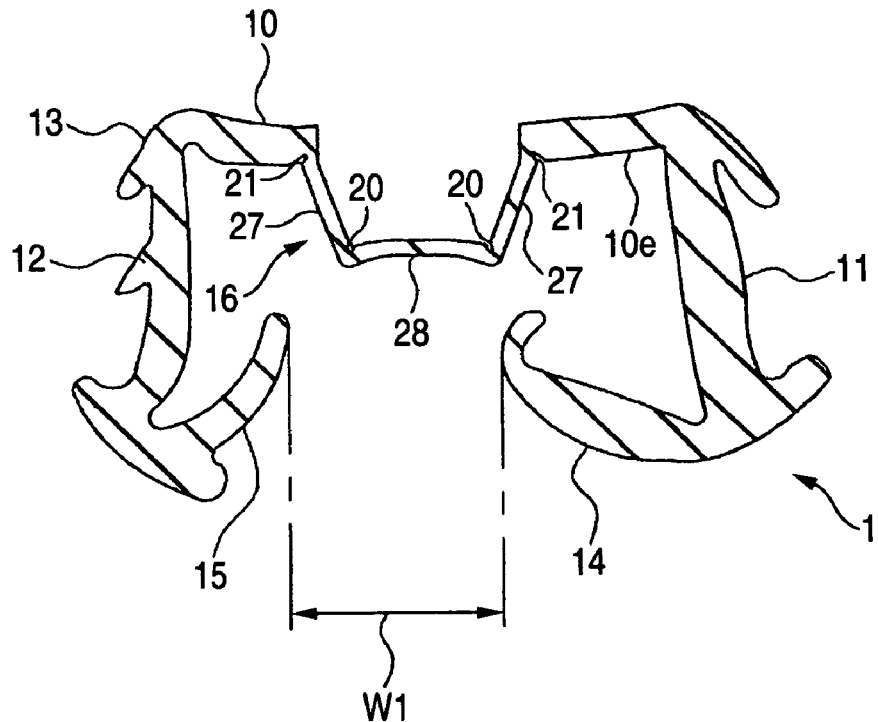
FIG. 25A is a sectional view showing an extruded portion constituting an upper side portion, which is in an extended state.
Figure 25B:
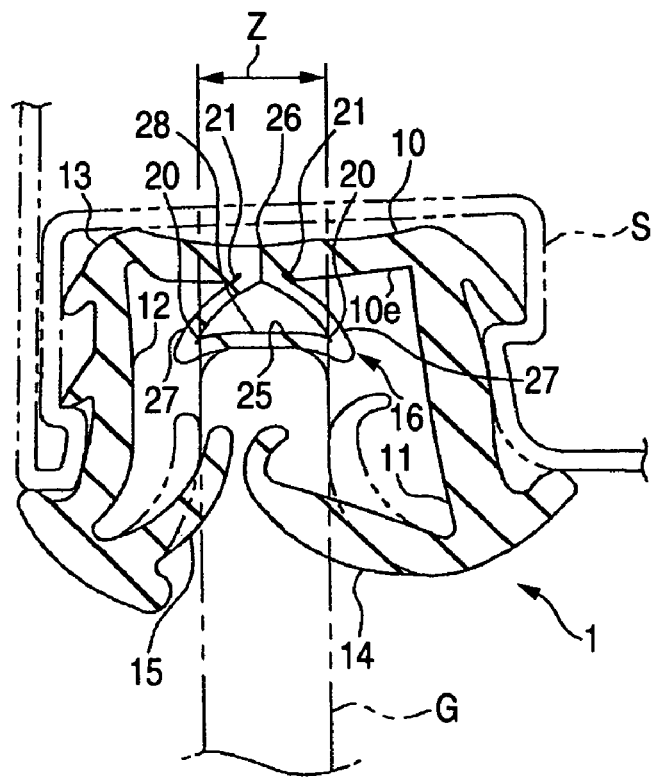
FIG. 25B is a sectional view taken along the line K-K in FIG. 1, which shows the extruded portion constituting the upper side portion, which is in a contracted state.

As shown in FIGS. 24, 25A, 25B, an extension portion 16 is provided in a base portion 10 of an extruded portion 2 corresponding to an upper side portion of a glass run 1 so as to extend in a direction traversing the interior and exterior of the vehicle (in a transverse direction as viewed in FIGS. 25A, 25B). To be more specific, the extension portion 16 is provided at a position on the base portion 10 which corresponds to a section Z defined as extending from a position which intersects with an extension along an interior side of the door window glass G to a position which intersects with an extension along an exterior side of the door window glass G and to which the end face of the door window glass G is opposed.

In addition, the extension portion 16 is made thinner than the thickness of the base portion 10 and is provided with a pair of support portions 27 extending, respectively, from surfaces 10e facing an end face of the door window glass G of portions of the base portion 10 which face each other across the extension portion 16 and a receiving portion 28 which joins distal end portions of the support portions 27 to each other. The support portions 27 extend, respectively, from the corresponding surfaces 10a which face the end face of the door window glass G so as to narrow a distance therebetween, and the receiving portion 28 is formed so as to become substantially parallel to the base portion 10.

Furthermore, a notched portion 20 is formed in an internal side of each corner portion between the support portion 27 and the receiving portion 28, and a notched portion 21 is formed in an internal side of each corner portion between the support portion 27 and the base portion 10. By the provisions of these notched portions 20, 21, the occurrence of a folding (bending) deformation at each of the corner portions is facilitated. In addition, the receiving portion 18 is bent or curved so as to form a recess directed toward the end face of the door window glass G.

Then, when mounted in the sash S, as shown in FIG. 25B, portions of the base portion 10 which face each other across the extension portion 16 are brought into abutment with each other, and the extension portion 16 is formed into substantially a triangular shape, whereby a hollow portion 25 is formed by the extension portion 16 on a side of the base portion 10 where the surface 10e thereof is situated which faces the end face of the door window glass G. Consequently, the cross section of this hollow portion 25 takes substantially a triangular shape which gradually widens downwards.

In addition, when the door window glass G is closed, the end face of the door window glass G is brought into abutment with the extension portion 16 (the receiving portion 18), whereby an impact generated when the door window glass G is closed can be absorbed, thereby making it possible to reduce impact noise based on the impact so generated.

Note that a joined portion 26 which extends along a longitudinal direction is made to exist over most of the extruded portion 2 in the longitudinal direction by joining together the portions of the base portion 10 which face each other across the extension portion 16 so that the extension portion 16 is maintained in the contracted state. Since the extension portion 16 contracts, as has been described above, in the inside of a main body portion 13, the extension portion 16 contracts in such a state that the joined portion 26 is exposed to the outside of the main body portion 13. The joined portion 26 is formed using either a process in which the relevant portion is extruded as being joined together or a sizing process in which relevant portions are brought into contact with each other immediately after extruded from an extrusion mold so as to be formed into a joined portion. In any case, the joined portion 26 is such as to maintain the contracted state of the extension portion 16 irrespective of the mount in the sash S.

On the other hand, the extension portion 16 is allowed to extend due to the joined portion 26 being separated over a predetermined section P1 (refer to FIG. 27) from an end portion of the extruded portion 2 which is situated at an end where it is joined to the molded portion 5, so that the sectional shape of the end portion of the extruded portion 2 and the sectional shape of an end portion of a molded portion 5 to be molded can be made to coincide with each other when the extruded portion 2 is set in a mold unit. Note that the joined portion, which is formed through the contact in the sizing process, is easy to be separated, and hence the joined portion can be torn apart manually without using a tool. In a case where a joined portion is extruded as so joined, a joined portion so formed can be torn apart using a tool such as a knife.

Figure 26A:
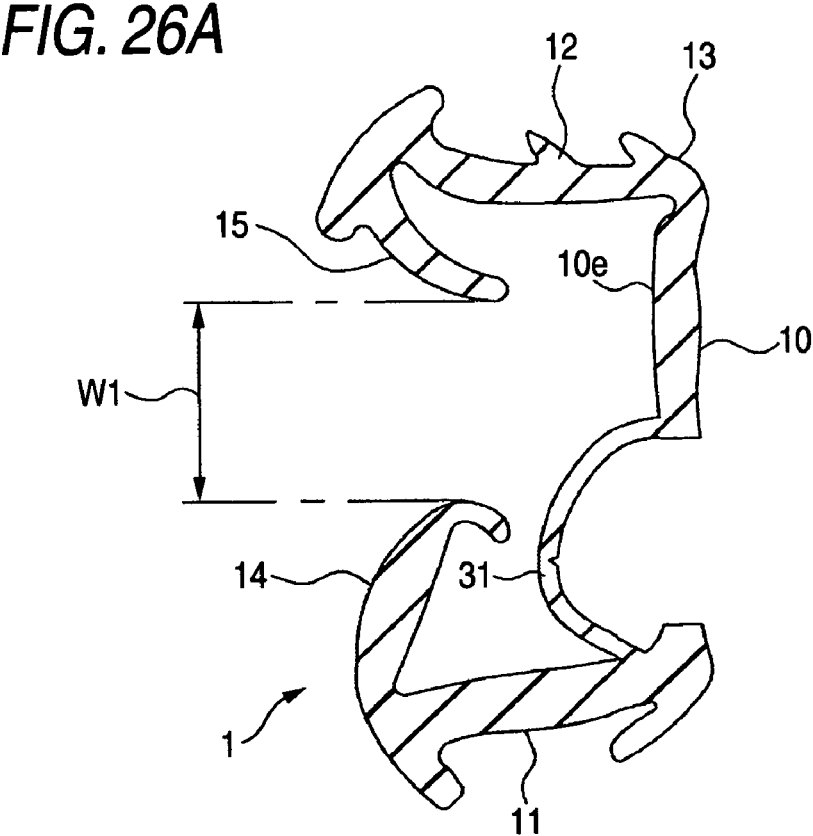
FIG. 26A is a sectional view showing an extruded portion constituting a vertical side portion, which is in an extended state.

Incidentally, an extension portion 31 is formed, as shown in FIG. 26A, in a base portion 10 of an extruded portion 4 which corresponds to a vertical side portion of the glass run 1 so as to extend and contract in a direction traversing the interior and exterior of the vehicle The extension portion 31 is provided at a position which is offset inwards of a position (a section Z) to which the end face of the door window glass G is opposed as viewed in a direction traversing the interior and exterior of the vehicle. In this embodiment, the extension portion 31 is provided inwards of substantially a central portion on the base portion 10 as viewed in the direction traversing the interior and exterior of the vehicle.

The extension portion 31 is made thinner than the thickness of the base portion 10, and one end portion thereof is continuously joined to a surface 10e of the base portion 10 which faces an end face of a door window glass G, whereas the other end portion thereof is continuously joined to an internal wall surface of the interior side wall portion 11. The extension portion 31 is formed into a curved shape which protrudes toward the inside of the main body portion 13, so that a hollow portion 32 (refer to FIG. 26B) is formed when mounted in the sash S.

In addition, when the door window glass G is closed, the hollow portion 32 in the extension portion 31 is situated inwards of the door window glass G in the upper side portion of the glass run 1 in such a state that the relevant hollow portion is spaced apart from the door window glass G. It is not until the door window glass G is moved due to vibrations toward the inside of the vehicle that the extension portion 31 is brought into abutment with the door window glass G via an internal seal lip, whereby a positional deviation of the door window glass G toward the inside of the vehicle can be restricted. Namely, the extension portion 31 is provided with a vibration control function. In addition, since the inward movement of the door window glass G is restricted, it becomes possible in an aggressive fashion to realize a flush surface which has been in demand in recent years or to make the exterior surface of the sash flush with the exterior surface of the door window glass from the viewpoint of improvement in the quality of external appearance.

Note that the extension portion 31 is extruded in advance so as to maintain its contracted state in the longitudinal direction, as with the extrude portion 2, and a joined portion 36 which extends along the longitudinal direction is made to exist over most of the extruded portion 4 in the longitudinal direction by joining together the portions of the base portion 10 which face each other across the extension portion 31. Since the extension portion 31 contracts, as has been described above, in the inside of the main body portion 13, the extension portion 31 contracts in such a state that the joined portion 36 is exposed to the outside of the main body portion 13. The joined portion 36 is, as with the joined portion 26, formed using the sizing process or the like. In any case, the joined portion 36 is such as to maintain the contracted state of the extension portion 31 irrespective of the mount in the sash S.

On the other hand, the extension portion 31 is allowed to extend due to the joined portion 36 being separated over a predetermined section P5 (refer to FIG. 27) from an end portion of the extruded portion 4 which is situated at an end where it is joined to the molded portion 5, so that the sectional shape of the end portion of the extruded portion 4 and the sectional shape of an end portion of a molded portion 5 to be molded can be made to coincide with each other when the extruded portion 4 is set in a mold unit.

Next, constructions inherent in the molded portion 5 will be described by reference to FIG. 27. FIG. 27 is an exemplary view of the glass run 1, which is developed to show the base portion 10 as viewed from the top for the sake of clarity of constructions of the molded portion 5 and portions in the vicinity thereof.

Incidentally, after the molding, that is, before mounted in the sash S, the molded portion 5 has the same cross section as the cross section of the end portion of the extruded portion 2 over a predetermined section P2 from the end of the extruded portion 2, and the extension portion 16 is formed in the base portion 10. Then, the extension portion 16 extends in a direction traversing the interior and exterior of the vehicle (refer to FIG. 25A). Namely, compared with most of the extruded portion 2 where the main body portion 13 maintains substantially the U-shaped cross section and the extension portion 16 is in the contracted state, the interior side wall portion 11 and the exterior side wall portion 12 are shifted apart from each other in parallel to the sides by a dimension corresponding to the extension of the extension portion 16 (substantially the same width as the extended width of the extension portion 16), whereby a predetermined opening W1 is secured which is good enough to impart a sufficient thickness to a first holding portion 60 for holding a core main body 59, which will be described later on. Namely, the thickness of the first holding portion 60 is the same as the opening W1.

On the other hand, the molded portion 5 has the same cross section as the cross section of the end portion of the extruded portion 4 over a predetermined section P4 from the end of the extruded portion 4, and the extension portion 31 is formed in the base portion 10. Then, the extension portion 31 extends in a direction traversing the interior and exterior of the vehicle (refer to FIG. 26A). Namely, as with the section P2, compared with most of the extruded portion 4 where the main body portion 13 maintains substantially the U-shaped cross section and the extension portion 31 is in the contracted state, the interior side wall portion 11 and the exterior side wall portion 12 are shifted apart from each other in parallel to the sides by a dimension corresponding to the extension of the extension portion 31 (substantially the same width as the extended width of the extension portion 31), whereby the predetermined opening W1 is also secured in this section P4.

In addition, in a predetermined section P3 which includes a corner portion Cl of the glass run 1, in place of both the extension portions 16, 31, an opening 40 (a shaded portion in FIG. 27) is provided so as to penetrate the base portion 10, whereby in this section P3, the molded portion 5 is made to be separated in a direction traversing the interior and exterior of the vehicle, and the interior side wall portion 11 and the exterior side wall portion 12 are shifted apart from each other in parallel to the sides by the dimension (substantially the same width as the extended width of the extension portions 16, 31). Consequently, the opening W1 is also secured in this section P3. Note that the opening 40 is defined by a second holding portion 61 for the core mold 57, which will be described later on.

The opening 40 has the same width (the opening W1) as the extended width of both the extension portions 16, 31 relative to the direction traversing the interior and exterior of the vehicle, the position of the opening 40 in the base portion 10 relative to the direction traversing the interior and exterior of the vehicle gradually changes along the longitudinal direction of the glass run 1. In this embodiment, the position of the opening 40 gradually changes from substantially a central portion of the base portion 10 to the inside of the vehicle relative to the direction traversing the interior and exterior of the vehicle as it extends from the section P2 side to the section P4 side. Namely, the section P3 where the opening 40 is formed corresponds to the gradual change section according to the embodiment.

Next, a method for manufacturing the glass run 1 constructed as has been described above will be described. However, as a matter of convenience in description, the peripheral position (the rear corner portion) of the molded portion 5 will mainly be described (other portions of the molded portion 5 are manufactured in the same manner).

Firstly, the aforesaid extruded portions 2, 4 are formed by extruding the relevant portions using an extrusion machine, not shown, through a known extrusion and cutting the extruded portions to predetermined lengths. This step corresponds to a cutting step in this embodiment.

As this occurs, as has been described above, in the extruded portions 2, 4, the main body portions 13 are molded in such a state that the extension portions 16, 31 are contracted. Namely, the extruding step corresponds to an extruding process for forming the extruded portions 2, 4 while maintaining the state in which the extension portions 16, 31 are contracted in a direction traversing the interior and exterior of the vehicle.

Following this, the joint of the joined portions 26, 33 situated in the vicinity of the end portions of the extruded portions 2, 4 which connect to the molded portion 5 side is released, so that the extension portions 16, 31 are allowed to extend. In this case, since the thickness of the joined portions 26, 33 is sufficiently thin, the joined portions can easily be separated manually or using a knife or the like. This step corresponds to a releasing step in this embodiment.

Next, the end portions of the extruded portions 2, 4, in which the extension portions 16, 31 are allowed to extend, are set in a mold unit for molding a molded portion 5. This step of setting the extruded portions 2, 4 corresponds to a setting step in this embodiment.

Figure 28A:
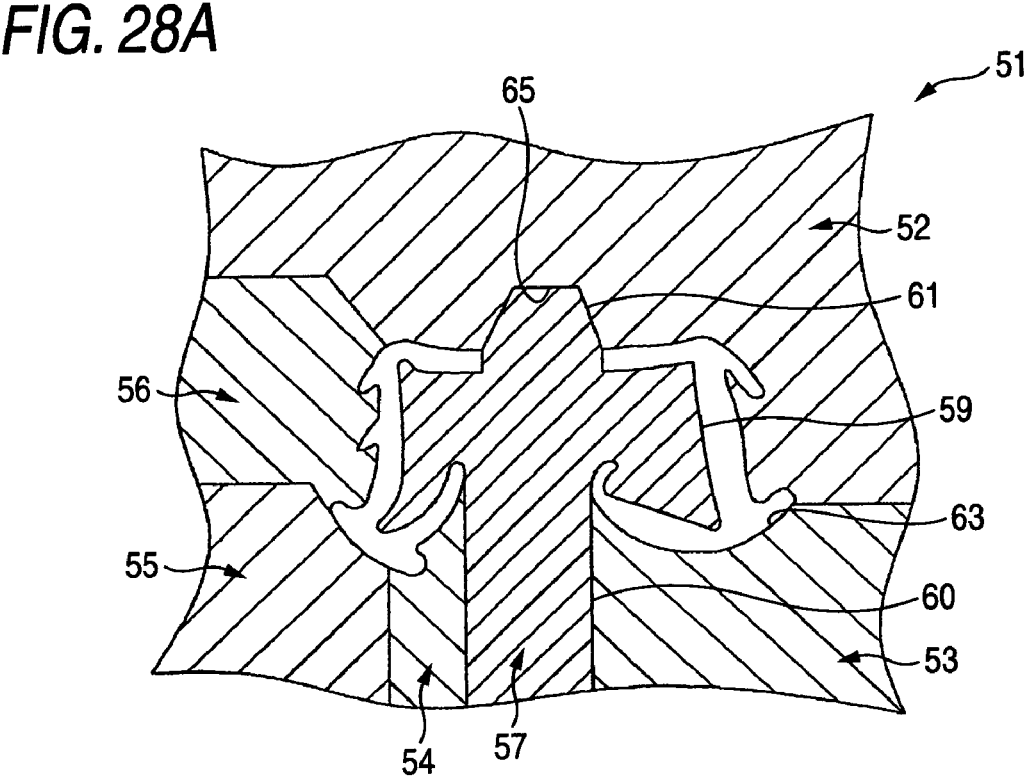
FIG. 28A is a sectional view showing a mold for molding a molded portion.

Here, a mold unit (a glass run molding mold unit) 51 for use for molding a molded portion 5 will be described by reference to FIGS. 28A, 28B. FIG. 28A is a sectional view illustrating the mold unit 51. The mold unit 51 includes a stationary mold 52 as a stationary mold member (a mold member) positioned at an upper portion of the drawing and a plurality of movable molds (a first movable mold 53, a second movable mold 54, a third movable mold 55, a fourth movable mold 56) as movable mold members. In addition, a core mold 57 is provided between the first movable mold 53 and the second movable mold 54. The first to fourth movable molds 53 to 56 are provided so as to be moved relative to the stationary mold 52 by means of a cylinder, not shown, or the like.

The core mold 57 includes a core main body 59 for defining inner circumferential surfaces of the main body portion 13 and the seal lips 14, 15, a first holding portion 60 which protrudes from a side of the core main body 59 which defines the inner circumferential surfaces of the seal lips 14, 15 and a second holding portion 61 which protrudes from a side of the core main body 59 which defines an inner circumferential surface of the base portion 10. The position of the second holding portion 61 relative to the widthwise direction (in the transverse direction as viewed in FIGS. 28A, 28B) of the core mold 57 changes gradually along the longitudinal direction (in the longitudinal direction as viewed in FIGS. 28A, 28B) so as to follow the shape of the opening 40.

Molding surfaces are formed, respectively, on the stationary mold 52 and the respective movable molds 53 to 56 which correspond to a complete external shape of the molded portion 5 all together. In addition, the core mold 57 is placed at the center of a space surrounded by the stationary mold 52 and the respective movable molds 53 to 56. Then, a cavity for molding a molded portion 5 is formed by these molding surfaces and an external surface of the core main body 59. Furthermore, a receiving portion 65 is provided in the surface of the stationary mold 52 which defines the inner circumferential surface of the base portion 10 in such a manner that the second holding portion 61 fits in when the respective molds 52 to 57 are clamped together. Of course, the constructions of the respective molds are not limited what has been described above. For example, a construction may be adopted in which any of the movable molds is made to be a stationary mold, whereas the stationary mold 52 is made to be a movable mold.

Then, a molded portion 5 is molded as follows by means of the mold unit 51. Firstly, end portions of the extruded portions 2, 4, in which the joined portions 26, 36 are separated so that the extension portions 16, 31 are allowed to extend, are fitted, respectively, on longitudinal end portions of the core main body 59 of the core mold 57 in such a state that the respective molds 52 to 57 are opened relative to one another, so that the end portions of the respective extruded portions 2, 4 are set in the mold unit 51, and the movable molds 53 to 56 and the core mold 57 are set at predetermined positions relative to the stationary mold 52 and are then clamped together, whereby the extruded portions 2, 4 are mounted and fixed in place relative to the mold unit 51, and a cavity 63 is formed as shown in FIG. 28A.

Figure 28B:
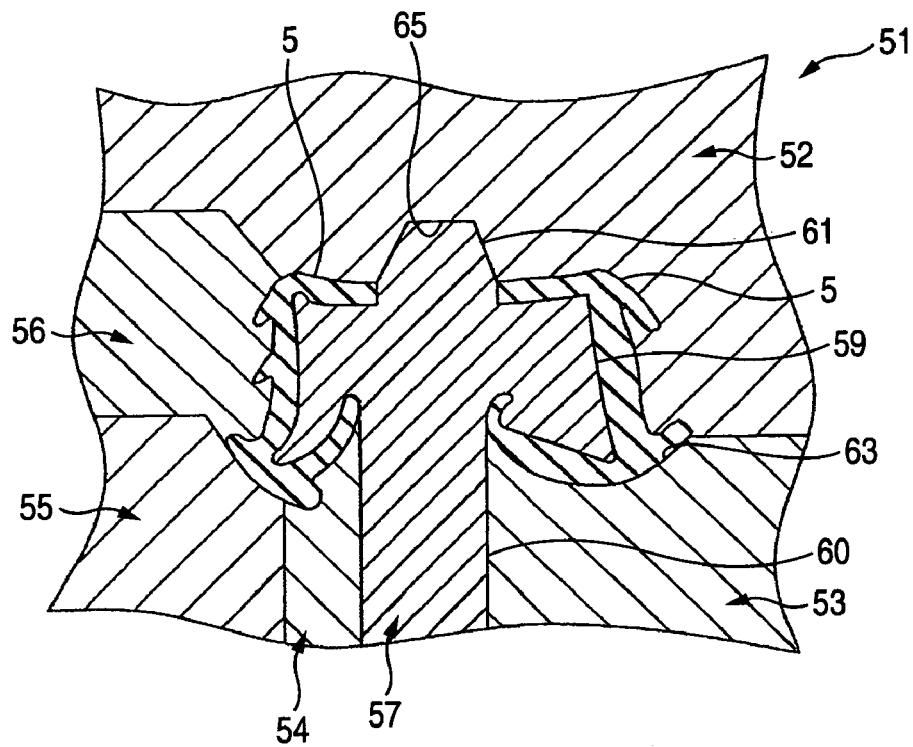
FIG. 28B is a sectional view showing a mold unit in which a rubber material is filled in a cavity.
Figure 29A:
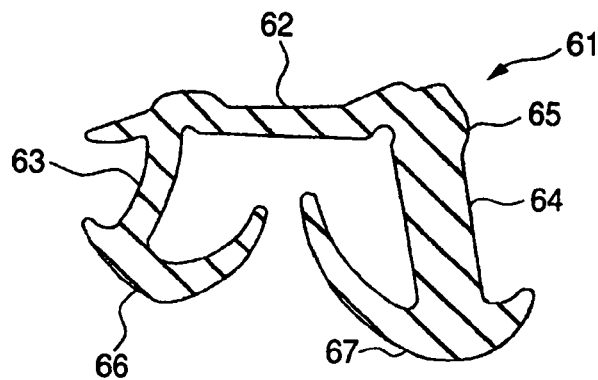
FIG. 29A is a sectional view showing a glass run according to the related art, which is in a state before mounting.
Figure 29B:
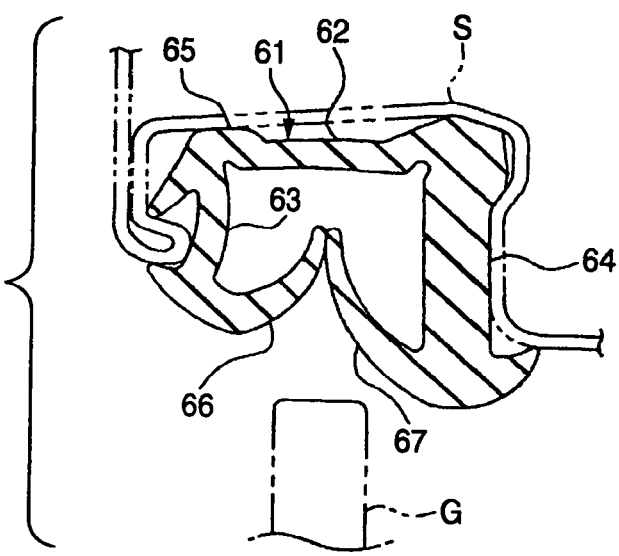
FIG. 29B is a sectional view showing the glass run according to the related art, which is in a state after mounting.
Figure 29C:
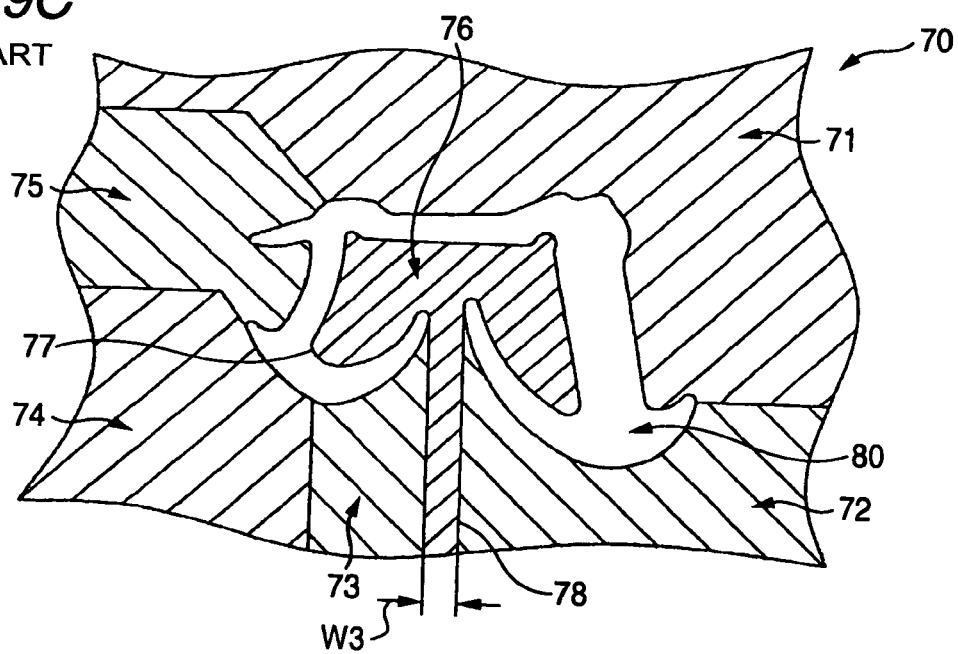
FIG. 29C is a sectional view showing a mold unit according to the related art which is used for molding a molded portion.

In this state, as shown in FIG. 28B, EPDM, which is in a plastified state, as a material (a rubber material) is injected into the cavity 63 from a gate, not shown, to thereby fill the cavity 63. Thereafter, the EPDM so injected and filling the cavity 63 is then vulcanized and solidified. After the completion of solidification, the movable molds are opened sequentially, so that a molded portion 5 is removed from the mold unit 51 together with the core mold 57. Thus, a glass run 1 is obtained in this way in which the extruded portions 2, 4 are joined to the molded portion 5. the series of steps of molding the molded portion 5 correspond to a molding step in this embodiment.

Figure 26B:
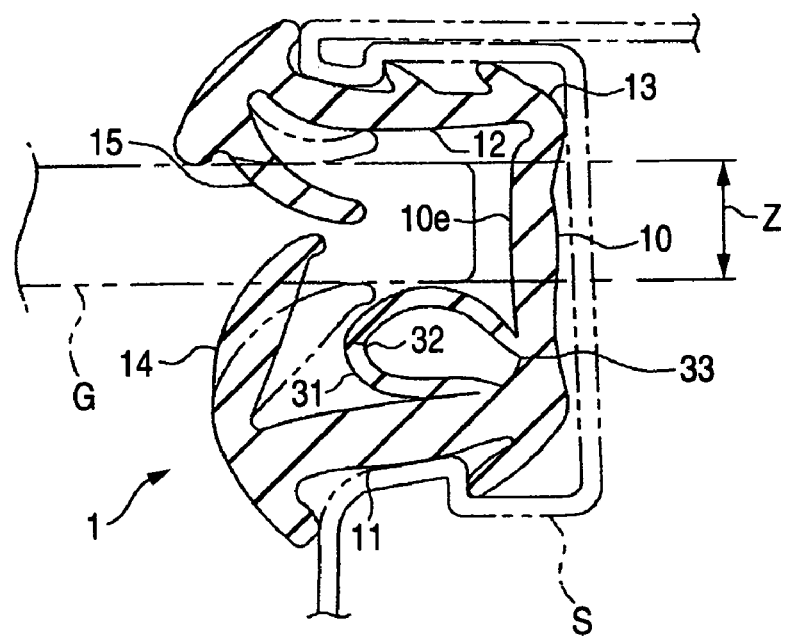
FIG. 26B is a sectional view taken along the line L-L in FIG. 1, which shows the extruded portion constituting the vertical side portion, which is in a contracted state.

Incidentally, with the glass run 1 molded in the manner described above, when mounting the glass run 1 in the sash S, the extension portions 16, 31 are, as shown in FIGS. 25B, 26B, contracted so that the interior side wall portion 11 and the exterior side wall portion 12 are shifted nearer to each other in parallel, whereby the main body portions 13 can easily be fitted in the sash S in such a state that the main body portions 13 maintain substantially the U-shaped cross sections, which represent their non-opened-out states. Furthermore, in the extruded portions 2, 4, since most of the relative portions are maintained in such a state that the extension portions 16, 31 are contracted, the main body portions 13 can fitted in the sash S as they are.

Thus, as has been described in detail heretofore, at the time of molding, the molded portion 5 is molded in such a manner that an opening is provided between the seal lips 14, 15 in such a state that the molded portion 5 is separated or extended in a direction traversing the interior and exterior of the vehicle by the extension portions 16, 31 and the opening 40 and the main body portion 13 takes substantially the U-shaped cross section which represents its non-opened-out state, whereby a sufficient thickness (the opening W1 between the two seal lips 14, 15) can be imparted to the first holding portion 60 which holds the core main body 59. Consequently, should an injection pressure of EPDM which exceeds the anticipated be applied to the core main body 59, the core main body 59 can be supported on sides thereof so that the core main body 59 can be maintained at the predetermined position in a more ensured fashion. As a result, a glass run in a proper shape can be molded.

Furthermore, the receiving portion 65 is provided in the surface of the stationary mold 52 which defines the inner circumferential surface of the base portion 10 so that the second holding portion 61 fits therein when the respective molds 52 to 57 are clamped together, whereby the second holding portion 61 is allowed to be supported on the stationary mold 52 (the receiving portion 65) in an engaged fashion, thereby the aforesaid function and advantage being enhanced.

In addition, in a state in which the glass run 1 is not mounted in the sash S, the extension portions 16, 31 thereof are in the extended stats, and the main body portions 13 take substantially the U-shaped cross section. Due to this, when mounting the glass run 1 in the sash S actually, since there is no need to rotate the side wall portions 11, 12 of the molded portion 5 and the like from the opened-out state so as to contract them, as has been done conventionally but the side wall portions only have to be shifted in parallel, there is no case where the angle, radius of curvature and circumferential length of both the side wall portions 11, 12 so molded change between before and after the mounting. Consequently, the risk can be avoided that the glass run 1 cannot be mounted in the sash S so as to follow the shape of the sash S. In addition, in designing glass runs, since there is no need to repeat tries and errors in anticipation of the change, the number of design man hours can be reduced. As a result, a remarkable enhancement in workability can be realized, and an increase in the number of design man hours can be suppressed by suppressing the irregular deformation of the molded portion.

In addition, in this embodiment, the glass run 1 is molded which is provided with the extruded portions 2, 4 and the like in which the extension portions 16, 31 are contracted in a direction traversing the interior and exterior of the vehicle and the molded portions 5 and the like in which the extension portions 16, 31 are extended in a direction traversing the interior and exterior of the vehicle. Consequently, when mounting the glass run 1 so molded in the sash S, the assembly worker does not have to carry out the fitting work in which the glass run 1 is fitted in the sash S while maintaining the contracted state of the extension portions 16, 31 over the full length of the glass run 1. Namely, such work only has to be carried out only on those positions corresponding to the molded portions 5 and the like and the portions in the vicinity thereof. As a result, the simplification of mounting work of the glass run 1 can be realized, thereby making it possible to realize the remarkable improvement in workability.

In addition, since the opening 40 is provided in 15 the corner portion Cl of the glass run 1 so that the extension portions 16, 31, which are different in position relative to the direction traversing the interior and exterior of the vehicle, are not formed continuously, when the glass run (the extension portions 16, 31) is contracted by shifting the interior side wall portion 11 and the exterior side wall portion 12 in parallel, a risk can be reduced that the extension potions 16, 31 are not contracted in the corner portion Cl of the glass run 1 but are collapsed, whereby the respective portions of the glass run 1 do not deform uniformly.

Furthermore, since the position of the opening 40 relative to the direction traversing the interior and exterior of the vehicle is made to change gradually, the extruded portions 2, 4 in which the extension portions 16, 31 are provided at the positions which differ relative to the direction traversing the interior and exterior of the vehicle can be joined together without any inconvenience. As a result, extension portions such as the extension portions 16, 31 which are different in functionality can be provided in the respective extruded portions 2, 4.

(a) The shape and construction of the extension portions 16, 31 are not limited to those described in the embodiments. For example, a construction may be adopted in which the hollow portions 25 and the like are not formed when the extension portions 16, 31 are contracted. In addition, a bellows-like extension portion may be adopted. Of course, a construction may be adopted in which the extension portions 16, 31 protrude toward the outside of the main body portions 13.

In the embodiment, the opening 40 is provided only in the predetermined section P3 which includes the corner portion C1 of the glass run 1. However, the section in which the opening is provided is not limited thereto. For example, in place of the extension portions 16, 31, the opening may be formed over substantially the whole area of the molded portion 5 along the longitudinal direction thereof, that is, the sections P2, P3, P4. By adopting the construction, the second holding portion 61 of the core mold 57 can be provided relatively longer, whereby the holding force for holding the core mold 57 can be enhanced. Of course, in a case where the opening is provided over substantially the whole area of the molded portion 5 in the longitudinal direction thereof, the gradual change section like the opening 40 may be formed in the opening so provided over at least one of the sections arranged in the longitudinal direction. In addition, the provision of the gradual change section is not limited to the section P3, but the gradual change section may be formed over substantially the whole area of the molded portion 5 in the longitudinal direction thereof, that is, the sections P2, P3, P4. For example, the gradual change section may be formed such that the position thereof relative to the direction traversing the interior and exterior of the vehicle changes from substantially a central portion of the base portion 10 to the inside of the vehicle as it extends from the section P1 side to the section P5 side. However, when the opening is provided, even in the event that the opening is closed with an adhesive or the like when the glass run (the extension portions) are contracted, since there is a risk that rain water or the like enters from a minute gap, when considering such a problem, it is preferable that the opening is provided only in a predetermined section as occurring in the embodiment. As a result, the deterioration in sealing properties can be suppressed.

In addition, in place of the extension portions 16, 31, the opening may be formed in a plurality of positions (a plurality of sections) over substantially the whole area (sections P2, P3, P4) of the molded portion 5 in the longitudinal direction thereof.

(e) In the embodiment, while the extension portions 16, 31 are provided at the positions which differ relative to the direction traversing the interior and exterior of the vehicle, the invention is not limited thereto but a construction may be adopted in which the extension portions 16, 31 are provided at the same position, and the opening 40 does not change in position gradually relative to the direction traversing the interior and exterior of the vehicle.

In the embodiment, while the extension portions 16, 31, which differ in shape (function), are provided, respectively, in the extruded portions 2, 4, the extension portions which are provided in the extruded portions 2, 4 (the molded portion 5) may have the same shape.

What is claimed is:

1. A method for manufacturing a glass run having an extruded portion formed by extrusion and a molded portion molded by molding so as to be continuously joined to the extruded portion, wherein the glass run includes:

a main body portion, which is adapted to be mounted in a sash provided on a body or door in a vehicle, including substantially a U-shaped cross section provided with a base portion and interior and exterior side wall portions extending from opposite ends of the base portion;

a pair of seal lips extending from distal ends of the interior and exterior side wall portions toward an inside of the main body portion so as to perform a sealing of a door window glass; and an extension portion formed in the base portion so as to extend and contract in a direction traversing the interior and exterior of the vehicle, wherein the extension portion is located at a position deviated from a center of the base portion in a vertical side portion of the body or the door, and the extension portion is located at a position of the base portion to which an end face of the door window glass is opposed in an upper side portion of the body or the door, the method comprising:

an extruding step for forming an extruded portion by extrusion while maintaining a state in which the extension portion is contracted in the direction traversing the interior and exterior of the vehicle;

a cutting step for cutting the extruded portion so formed to a predetermined length; and a molding step for setting an end portion of the extruded portion that has been so cut in a mold in such a state that the extension portion is made to extend by partially releasing the maintained contracted state of the extension portion at the end portion of the extruded portion, and connecting molding a molded portion having the same cross section as that of the end portion of the extruded portion while including an extension portion therein such that the extension portion in the vertical side portion and the extension portion in the upper side portion are continuous through the extension portion in the molded portion.

2. A method for manufacturing the glass run according to claim 1, wherein the extruded portion is extruded in such a state that positions of the extension portion which face each other or portions of the base portion which face each other across the extension portion are joined together so that the extension portion can maintain the contracted state in the extruding process, and comprising:

a releasing step for releasing a joined state of the joined portion when allowing the extension portion at the end portion of the extruded portion to extend by releasing the joined state of the extension portion.

3. A method for manufacturing the glass run according to claim 1, wherein the extension portion in the extruded portion is formed while maintaining the contracted state in the direction traversing the interior and exterior of the vehicle and is connection molded to the molded portion at the end portion thereof in such a state that the extension portion is released from the contracted state so as to be allowed to extend, wherein the extension portion is formed in such a state that the extension portion is extended in the molded portion, and wherein when mounted in the sash, the extension portion at the end portion of the extruded portion and the extension portion of the molded portion are both so mounted while maintained in the contracted state.

4. A method for manufacturing a glass run having an extruded portion formed by extrusion and a molded portion molded by molding so as to be continuously joined to the extruded portion, wherein the glass run includes:

a main body portion, which is adapted to be mounted in a sash provided on a body or door in a vehicle, including substantially a U-shaped cross section provided with a base portion and interior and exterior side wall portions extending from opposite ends of the base portion;

a pair of seal lips extending from distal ends of the interior and exterior side wall portions toward an inside of the main body portion so as to perform a sealing of a door window glass; and an extension portion formed in the base portion so as to extend and contract in a direction traversing the interior and exterior of the vehicle, the method comprising:

an extruding step for forming an extruded portion by extrusion while maintaining a state in which the extension portion is contracted in a direction toward the inside and outside of a vehicle;

a cutting step for cutting an extruded portion so formed to a predetermined length; and a molding step for setting an end portion of the extruded portion that has been so cut in a mold in such a state that the extension portion is made to extend by partially releasing the maintained contracted state of the extension portion at the end portion of the extruded portion. and connection molding a molded portion having the same cross section as that of the end portion of the extruded portion while including an extension portion therein, wherein the molded portion is molded by a mold unit comprising a plurality of mold members by molding so as to be continuously joined to end portions of the extruded portions, the method further comprising a filling step for filling a material in a cavity in the mold unit for molding a molded portion so as to continuously join the molded portion and the end portion of the extruded portion in such a state that a core mold member comprising a core main body portion for defining inner circumferential surfaces of the main body portion and the seal lips, a first holding portion which protrudes from a side of the core main body portion which defines the inner circumferential surfaces of the seal lips and a second holding portion which protrudes from a side of the core main body portion which defines an inner circumferential surface of the base portion are set at predetermined positions in the mold unit, wherein an opening having substantially the same width as an extended width of the extension portion relative to the direction traversing the interior and exterior of the vehicle is formed in place of the extension portion over at least a predetermined section on the molded portion in a longitudinal direction thereof by the second holding portion, whereby the molded portion is molded in such a state that the molded portion is separated in the direction traversing the interior and exterior of the vehicle over the predetermined section.

* * * * *